(12) United States Patent
Dennison et al.

(10) Patent No.: US 6,324,404 B1
(45) Date of Patent: *Nov. 27, 2001

(54) CELLULAR TELEPHONE SYSTEM THAT USES POSITION OF A MOBILE UNIT TO MAKE CALL MANAGEMENT DECISIONS

(75) Inventors: Everett Dennison, Canfield, OH (US); Timothy J. Duffy, West Middlesex, PA (US); Gregory T Pauley, Canfield, OH (US); Scott L. Jones, Sharon, PA (US); Albert H. Pharis, Jr., Canfield; Warren P. Williamson, IV, Loveland, both of OH (US)

(73) Assignee: Sycord Limited Partnership, Zephyr Cove, NV (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/848,082

(22) Filed: Mar. 21, 1996

Related U.S. Application Data

(63) Continuation-in-part of application No. 08/813,494, filed on Mar. 7, 1997, now Pat. No. 6,006,106, which is a continuation-in-part of application No. 08/555,884, filed on Oct. 23, 1995, which is a continuation-in-part of application No. 08/402,976, filed on Mar. 13, 1995, which is a continuation of application No. 08/057,833, filed on May 7, 1993, which is a continuation of application No. 07/813,494, filed on Dec. 26, 1991, now Pat. No. 5,235,633.

(51) Int. Cl.[7] .................................................. H04Q 7/20
(52) U.S. Cl. ......................... 455/456; 455/406; 455/432
(58) Field of Search ................................... 455/422, 432, 455/436, 440, 456, 405–409, 445

(56) References Cited

U.S. PATENT DOCUMENTS

| 5,235,633 | * | 8/1993 | Dennison et al. | 455/456 |
| 5,303,297 | * | 4/1994 | Hillis | 455/406 |
| 5,546,445 | * | 8/1996 | Dennison et al. | 455/456 |

FOREIGN PATENT DOCUMENTS 2-210923 * 2/1989 (JP).

* cited by examiner

Primary Examiner—Dwayne D. Bost
Assistant Examiner—Nay Maung
(74) Attorney, Agent, or Firm—Terry M Gernstein

(57) ABSTRACT

A cellular telephone system has call management decisions made based on the exact geographic location of the mobile unit. These call management decisions include billing and taxing decisions, cell site selection, frequency selection and even cellular system selection. The decisions are continuously updated during a call whereby decisions can be made and changed regardless of where a call originated. Cell site location, and even cellular system selection, can be made in a specific manner to best serve the needs of the mobile user, the cellular system as well as the public. It is even possible for a cellular system to locate one or more of its cell sites in the geographic area served by another cellular system. In some cases, cellular systems might even share cell sites.

41 Claims, 21 Drawing Sheets

CELLULAR TELEPHONE SYSTEM THAT USES POSITION OF A MOBILE UNIT TO MAKE CALL MANAGEMENT DECISIONS

TECHNICAL FIELD OF THE INVENTION

The present invention relates to the general art of wireless over-the-air communication, which includes cellular mobile radiotelephone (CMR) technology, and to the particular field of managing communication processes in a wireless over-the-air communication system. The present application is a continuation-in-part of pending U.S. Application Ser. No. 08/555,884, filed Oct. 23, 1995 which is a continuation-in-part of U.S. application Ser. No. 08/402,976, filed Mar. 13, 1995, which was a CIP of U.S. application Ser. No. 08/813,494, filed Mar. 7, 1997 now U.S. Pat. No. 6,006,106, issued on Dec. 21, 1999, now U.S. Pat. No. 5,235,494 which is a continuation of U.S. application Ser. No. 08/057,833, filed May 7, 1993 which is a continuation of U.S. application Ser. No. 07/813,494, filed Dec. 26, 1991 and issued as U.S. Pat. No. 5,235,633. The disclosures of each of these applications is fully incorporated herein by reference. Therefore, as used hereinafter, the term "prior art" refers to art that is relevant prior to the invention dates associated with this incorporated material.

BACKGROUND OF THE INVENTION

The present invention is concerned with wireless over-the-air communication using a plurality of transmit/receive cell sites or relay points. It should be understood that the transmit/receive relay points can be either land based or non-land based, such as satellite based, and that as used herein, the term "cell site" or its equivalent refers to one of the relay points of the system. CMR (Cellular Mobile Radio) is an example of one type of wireless over-the-air communication system that can be included in the present disclosure. It is understood that the term CMR is not intended to be limiting, but is merely used as an example for the purposes of discussion. It is also to be understood that the term "cellular telephone system" or its equivalents is intended to be shorthand notation for the term "wireless over-the-air communications system" and no limitation is intended by the use of the term "cellular." Also, as used herein, the terms "CD (Communication Device)" and "MU (Mobile Unit)" are intended to include any device used to communicate in the wireless over-the-air communication system. Also, the term "cellular telephone system" is used for purposes of discussion but can include any form of wireless over-the-air communication system. It is also noted that many forms of communication are and will be conducted over the wireless over-the-air networks. Therefore, the present disclosure will refer to a "communication process" which is intended to cover calls as well as other forms of communication that can be conducted in this manner.

CMR is a rapidly growing telecommunications system. The typical CMR system includes a multiplicity of cells. A particular geographic area can be subdivided into a multiplicity of subareas, with each of the subareas being serviced by a stationary transmitter/receiver setup. The cells are set up to carry signals to and from mobile units in the range of the cell. If one cell site becomes too crowded, it can be divided into smaller cells, by a process known as cell site splitting. Any particular geographic area can become quite complicated with cells overlapping each other, and overlapping cells of other neighboring cellular systems. Further, null zones with inadequate coverage, or even no coverage, can result. It is noted that the term "cellular" is intended to be a term of convenience, and is not intended to be limiting. The present disclosure is intended to encompass any communication system in which an overall area can be divided into one or more subareas, and also to any communication system having at least some portion of the communications occurring over the air.

A typical CMR set up is indicated in FIGS. 1 and 2, and will be described so an understanding of the problem to which this invention is directed can be obtained.

Shown is a typical cellular telephone unit having a unique mobile identification number stored in a suitable location such as an electrically erasable programmable read-only memory (not shown). Telephone units of this kind are known to those skilled in this art, and thus will not be described in detail.

The telephone unit includes a handset 4 having a keypad 5 as well as a speaker 6 and a microphone 7. A transceiver 8, ordinarily built into the telephone unit, exchanges signals via an antenna 10 with a mobile telecommunications switching office or MTSO 12 via a cell site 14. A duplexer 15 connects the antenna to the transceiver. The cell site 14 includes an antenna 16 connected to a control terminal 17 via a transceiver 18. The cell site 14 is connected to the MTSO via a transmission link 20. The Mobile Telephone Switching Office has historically been known as the center of the wireless over-the-air communications system. It is where the communication process management decisions are made, billing records are produced and where maintenance activities are initiated for wireless over-the-air communications systems. The MTSO is not a specific piece of equipment, but is comprised of many individual pieces. The MTSO will contain a telephone switch, peripheral processors, adjunct processors, and various other information gathering equipment used in the operation and management of a wireless over-the-air communications system. Each of the different pieces of equipment may directly or indirectly be involved providing the highest quality connection possible. The makeup of the MTSO therefore comprises many different pieces of equipment and many components, which can be supplied by different vendors. Therefore, communication process management decisions made at the MTSO can actually be made outside of a switch and can be made in a cluster of nodes housed along the network or even in separate cell sites. Therefore, as used herein the term MTSO really refers to all of the systems, nodes, modules, equipment and components that combine to define a wireless over-the-air communication process management network, regardless of the physical or system location of these elements. The term MTSO therefore is not intended to be limiting to the "switching off ice" as it may have been viewed in the prior art. The term is intended to be much broader than that and to include any combinations of equipment, etc that may be connected within the communication processing network of the service provider. The term MTSO is one of convenience and is intended to include all the information processing hardware and software associated with the wireless over-the-air communication process management process within a wireless over-the-air system, no matter where the hardware or software is located in the system. It is also noted that the term "intrasystem" refers to actions and components within a particular system; whereas, the term "intersystem" refers to actions and components located outside a particular system.

Referring to FIGS. 1 and 2, the operation of the CMR can be understood. The mobile unit M moves about the geographic areas covered by the various cells. As that mobile unit moves about, it decodes the overhead message control signals generated by various cell site control channels. The mobile unit locks onto the cell site that is emitting the strongest signal. The mobile unit rescans channels periodically to update its status. If, for example, a fixed-position land-based telephone T is used to call the mobile unit, a signal is sent via landlines L, to the central office CO of a public/switched telephone system (PTSN) 12A. This system then utilizes the switching network SN associated therewith to call the MTSO 12 via a transmission link L1. The MTSO then utilizes its own switching network and generates a page request signal to cell sites via transmission links, such as the transmission link 20. The cell site which has been notified of the presence of the mobile unit M sends a signal back to the MTSO via the landlines or wireless links alerting the MTSO of the presence of the mobile unit. The MTSO then orders the mobile unit, via the notifying cell site, to tune to an assigned channel and receive the communication process.

On the other hand, during communication process origination, the mobile unit rescans the control channels to determine which is the best server based on signal strength. Upon selecting the best server, the mobile unit transmits cell site information on the control channel receive frequency and then receives a voice channel to tune to if the mobile unit is authorized to place a communication process.

As the mobile unit moves, the signal strength between that mobile unit and the originating cell site changes, and perhaps diminishes. Since signal strength is an inverse function of the square of the distance between the mobile unit and the cell site, signal strength can change rapidly and drastically as the mobile unit moves with respect to the cell site and therefore must be monitored closely. The MTSO has a signal strength table, and signal strength from the mobile unit is constantly compared to acceptable signal strength levels in the table. Such a table can be located in each cell site if desired.

Should signal strength diminish below a preset range, the MTSO generates a "locate request" signal to all cell sites that neighbor the original cell site. Each of such neighboring cell sites receiving a signal from the mobile unit signals the MTSO, and the signal strengths from such neighboring cell sites are checked against the signal strength table. The MTSO makes a decision as to which cell site should control the communication process, and notifies the original cell site to order the mobile unit to retune to a voice channel of the new cell site.

As soon as the mobile unit retunes, the mobile unit completes the communication process via the new cell site channel. This transfer of control is known as a handoff.

Typically, governments grant rights to provide wireless communication services to a specified land area based on geographic boundaries. Since wireless propagation does not end at exact geographic boundaries, many conflicts have arisen between service providers as to which service provider should provide service at the location from where the Communication Process (CP) is being originated or received. Today, there are no methods or procedures to resolve these issues. A Communication Process (CP) can be defined as the exchange of information between communication devices, such as, but not limited to, Analog or Digital radiotelephones, digital data communications, analog or digital video, and the like.

When the initial wireless systems were built, they were constructed around major metropolitan areas. This created service voids between major metropolitan markets. In these early systems, boundary service problems did not arise because there were areas of "no service" buffering competing systems. Today, as rural systems fill in the patchwork of nationwide coverage, network service provision boundary disputes are becoming common. Prior to the Dennison, et al patent, U.S. Pat. No. 5,235,633 and the patents and applications depending therefrom as continuations and continuations-in-part, the disclosures of which are fully incorporated hereinto by reference, and the invention disclosed herein, it was impossible to honor the exact geographic boundaries. Attempts are currently made to control coverage boundaries by installing directional antennas and adjusting cell site receive and transmit parameters. The methods used to match the system boundaries to the geographic boundaries are not entirely successful due to the variations in terrain, environment and limitations of antenna design and wireless propagation. A common result of these problems is inadequate wireless signal strength or null coverage and border disputes around the geographic boundaries and hence poor service.

The incorporated material, including the Dennison et al patent disclose that cell sites sometimes have overlapping coverage due to the aforementioned variations in terrain and environment, and propose a solution. While the proposed solution works well, there is still room for further improvement in the areas of cost, subscriber service, billing and taxing.

Furthermore, wireless propagation, such as but not limited to the cellular operating band of 800–900 MHz, is generally line-of-site transmission. This presents substantial challenges when choosing sites in which to place wireless transmit/receive antennas. Boundaries assigned to service providers are based on maps depicting the geographic borders of service boundaries. The question arises in a disputed territory of who will get to service the Communications Process (CP). In the past, it has been the cell site that can provide the highest signal strength from the CD (Communications Device), not the provider that owns the legal territorial rights to the Communication Process (CP) that has serviced the Communication Process (CP). Until the invention disclosed herein, the service provider that could receive the best signal would handle the communication process (CP), and depending on whether the Communication Process (CP) was handed off and/or depending on the agreement made between the wireless communication systems, possibly keep all of the revenue from the communication process CP. Additionally, with real estate values being very high in established communities, cell sites are harder to construct and more expensive to build. Each cell site must be optimized for the maximum effective coverage area to overcome the real estate problems encountered when constructing a cell site. This in turn creates problems with overlapping coverage between wireless systems and thus disputes over which wireless system handles the communication process. Further, due to business considerations, it may be economically advantageous for one wireless system to own a cell site which is geographically located in the geographic area of another wireless system.

Cell sites are very expensive to install and maintain, so there is a very real savings for a service provider if fewer cell sites could be constructed while also improving coverage. Another area that would be affected by this is problems of quality service. This is because the service provider has conflicting requirements. To provide good coverage next to borders the provider would like to have high signal strength. To allow for hand-offs between cell sites and networks the signal strength needs to "fade out" at just the right level near the border to invoke a low threshold to start a hand-off process. It would be ideal to have high signal strength right up to a geographic boundary and then drop off beyond that boundary. However, at the present time, presently available systems do not permit this type of coverage.

Some areas inherently have wireless propagation problems, such as service areas next to bodies of water or in steep valleys. Wireless propagation can provide some very undesirable results for a number of reasons, some of which have been mentioned above and in the incorporated material. Therefore, there is a need to provide each network information as to which system has a right to handle a Communications Process (CP). For instance, a communications device (CD) might attempt to select a geographically incorrect service provider. Therefore, there is a need for a system that will permit a service provider to redirect the communication process to the geographically correct service provider, especially in a manner that is transparent to the Communications Device (CD) user.

Since cellular system geographic borders can be nonlinear and can have irregular shapes, problems can arise. Problems associated with irregular boundaries are indicated in FIG. 3. FIG. 3 graphically shows the problem of obtaining coverage for areas that have irregular boundaries. In this figure, areas A and C are serviced by Carrier X, and area B is serviced by Carrier Y. It is noted that areas A and C are intrasystem with respect to Carrier X and area B is intrasystem with respect to Carrier Y, while areas A and C are intersystem with respect to Carrier Y and area B is intersystem with respect to Carrier X. It is also noted that areas A and B could be covered by just one cell site each but the overlap into adjacent territories would be difficult to resolve. Today, areas such as these would be split into two or more cell sites. For instance, Carrier X might elect to install three cell sites A1, A3 and A4 which provides a minimum of overlap into area B. Overlap is indicated at the shaded areas. Therefore, there is a need for a system what would allow Carrier X to install a cell site with a larger coverage area such as A2 (shown in dotted lines).

FIG. 4 shows a prior art attempt of providing sectored cells. Using prior art technology requires installation of directional antennas to minimize the overlap into neighboring territory in order to resolve a border issue. Since these antenna patterns cannot be made to follow curved geographic borders, sectors are installed and directed for the best geographic coverage possible. This often involves obtaining a cell site location close to the border and "shooting back" toward the wireless communication system's own territory. This can leave null zones where cells back onto each other in an effort to keep signals from overlapping into neighboring territory. These null zones will have either poor quality service or even no service at all, thereby resulting in poor service. Therefore, there is a need to overcome this problem as well.

FIGS. 5A and 5B illustrate a problem of how geographic terrain can affect prior art systems. In FIGS. 5A and 5B, a small rural network A is located just across the river from a large city C, which is part of a neighboring network B. The river defines the geographic and legal border between these two systems. The city C is in another state just across the river. In some river towns, there is a bluff on each side of the river. The network A can place their cell sites very near the border atop the bluff providing overlapping coverage into the city C. Network A will get all the service of the neighboring community D further away from the city C. Network A now has better line of cell site reception into the river valley with its corresponding traffic at river level than does network B who legally "owns" the territory. Network B would have to install additional cell sites in the river valley to obtain the same coverage. Due to the stronger signal level provided by Network A, Network A will process a communications process (CP). The result is that subscriber's Communication Process (CP) may not be processed by the correct service provider.

Note in FIG. 5A that there are two service providers X and Y. The intersystem boundary is shown as a dashed line down the middle of the river. With a bluff on either side of the river, the cells can only service the opposite bluff. This is shown where Y1 cell site cannot "see" the subscriber CD' hidden below. cell site Y1 can however find CD3 in service provider X's territory. This issue denies revenue to the wireless communication system that has legal right to serve the subscribers within its licensed geographic service boundaries. Prior art systems are incapable of determining the geographic location of both the communications devices and their service boundaries and thus compromise quality of coverage. Therefore, there is a need to resolve this issue.

There is also need for providing a wireless over-the-air communication system with the ability to adjust its coverage and billing as the mobile unit moves. This will permit the system to determine taxes based on where the communication process is actually being made as opposed to the criteria used with the prior art. Still further, there is a need to permit a wireless over-the-air communication system to change frequencies as the mobile unit moves whereby a single wireless service provider can provide service to its subscribers regardless of frequency.

Still further, due to various business reasons, a single cell site may advantageously be used by more than one system. It will be necessary to determine which wireless communication system bills the communication process. Prior art systems cannot fully account for this.

Still further, if there is a service problem with a mobile unit, prior art systems are not able to accurately identify the exact geographic location of the unit when the problem arose. This makes it difficult for the network to pinpoint coverage problems. Therefore, there is a need for a wireless over-the-air communication system that permits a wireless communication system to exactly and precisely identify the exact geographic location of a mobile unit when a communication problem occurs.

Still further, with the advent of emergency response networks that use telephones, such as the E-911 systems, there is a need for a wireless over-the-air communication system that can precisely locate a mobile unit and pass that information on to an emergency response system.

The location of an over-the-air system mobile unit making a communication process can also be of use to law enforcement agencies. However, signal strength from one cell site does not provide such location information with sufficient accuracy to be of the best assistance to law enforcement agencies. Therefore, there is a need for an over-the-air communications network that can provide geographic location of a mobile unit during a communication process with accuracy sufficient to satisfy law enforcement agencies. This information should be rapidly updatable so a mobile unit can be tracked.

Since the CMR industry is growing rapidly, competition is growing. Therefore, it is in the best interest of a system to be able to provide the best service possible to its subscribers. One way of achieving this objective is to customize the service to the exact needs of each subscriber. This can be achieved by, among other things, customizing and varying a billing rate plan for each subscriber. That is, the subscriber may be able to pay a lower rate when he is at work than he pays when he or she is at home. Therefore, there is need for a wireless over-the-air communication system that can vary rate plans and vary rates in a manner that will permit offering the best rate plan to each subscriber based on that particular subscriber's use and needs. Still further, some communication processes must be handled in a special manner to account for environmental conditions, or system needs, such as down time for a specific cell. Therefore, even if a communication process should be handled by a certain cell site, there may be times when that communication process must be handled by another cell site. Therefore, there is need for a wireless over-the-air communication system that can account for special circumstances associated with a communication process, and alter the system response when the mobile unit meets the criteria for those circumstances, even if the communication process is already in progress when the criteria are met.

OBJECTS OF THE INVENTION

It is a main object of the present invention to provide a wireless over-the-air communications system that will permit a wireless communication system to determine the most efficient and accurate service to a mobile unit.

It is another object of the present invention to provide a wireless over-the-air communications system that will permit a wireless communication system to accurately bill a subscriber.

It is another object of the present invention to provide a wireless over-the-air communications system that will permit a wireless communication system to accurately determine taxes for a subscriber for that subscriber's use of the system.

It is another object of the present invention to provide a wireless over-the-air communications system that will be able to handle all communication processes legally permitted it.

It is another object of the present invention to provide a wireless over-the-air communications system that will be able to handle all communication processes legally permitted it and to forward communication processes that rightfully belong to another wireless communication system while retaining billing and taxing of any portion of the communication process that belongs to it.

It is another object of the present invention to provide a wireless over-the-air communications system that will be able to handle all communication processes legally permitted it based on geographic constraints.

It is another object of the present invention to provide a wireless over-the-air communications system that can bill a subscriber based on the geographic location of communication process origination, and then can update and alter that billing as the mobile unit moves.

It is another object of the present invention to provide a wireless over-the-air communications system that can co-operate with other wireless networks in handling a communication process.

It is another object of the present invention to provide a wireless over-the-air communications system that can share cell sites with other networks while retaining its ability to bill and service its own subscribers.

It is another object of the present invention to provide a wireless over-the-air communications system that can provide the most efficient and effective service to its subscribers and users.

It is another object of the present invention to provide a wireless over-the-air communications system that can update any communication process management parameter to account for instantaneous geographic location of a mobile unit.

It is another object of the present invention to provide a wireless over-the-air communications system that can assign and re-assign a communication process according to the location of the mobile unit during the communication process.

It is another object of the present invention to provide a wireless over-the-air communications system that can share geographic boundaries with other wireless over-the-air service providers without border issues.

It is another object of the present invention to provide a wireless over-the-air communications system that can change and update its operating frequencies during a communication process.

It is another object of the present invention to provide a wireless over-the-air communications system which can have the highest possible signal strength at its borders.

It is another object of the present invention to provide a wireless over-the-air communications system which can identify the location of a mobile unit when a service problem arises.

It is another object of the present invention to provide a wireless over-the-air communications system that can efficiently work with emergency service providers.

It is another object of the present invention to provide a wireless over-the-air communications system that can efficiently implement and utilize special rate plans.

It is another object of the present invention to provide a wireless over-the-air communications system that can efficiently implement and utilize special requirements for a communication process.

It is another object of the present invention to provide a wireless over-the-air communications system that can establish parameters for updating mobile unit information based on the particular needs of the mobile unit.

It is another object of the present invention to provide a wireless over-the-air communications system that can establish time and/or distance parameters for updating mobile unit information based on the particular needs of the mobile unit.

SUMMARY OF THE INVENTION

These, and other, objects are achieved by a CMR system that allows the Exact Geographic Location (EGL) of a communications device to be tracked and compared to geographic land data and information data and to continuously update this information during the communication process whereby the proper and most efficient service is provided, including proper communication process management and billing decisions. Within the scope of this invention is the ability to solve the above-mentioned problems and achieve the above-mentioned objects. By knowing the exact geographic location of a mobile unit during a communication process, competing service providers can locate their cell sites anywhere where the wireless reception will allow them to provide the best wireless coverage of their territory. The cell sites can even have overlapping coverage, or be inside an adjacent wireless communication system's coverage area. By knowing the location of the calling device at all times during the communication process, the wireless over-the-air communication system can configure the system to work together with other systems and wireless communication systems to process a communication process correctly. Service can be provided by the proper licensed wireless communication system because the exact location of the mobile unit is known at all times during the communication process. Propagation patterns and the like are not needed.

By way of background, the operation of a cellular system 20 is shown in FIGS. 6, 7 and 7A. The cellular system 20 uses positional data associated with the mobile unit M' to make communication process management decisions. To this end, the cellular system 20, while similar in all other respects to the cellular system illustrated in FIGS. 2 and 3, includes means for accurately and precisely determining the exact position of the mobile unit M', and then further includes means for using this positional information to determine which cell site is best suited to handle a communication process associated with that mobile unit M'.

The means for accurately determining the precise position of the mobile unit includes a Global Positioning System. The GPS includes satellites, such as satellite 22 in geostationary orbit about the earth. Each mobile unit further includes a GPS receiver 24 located between the duplexer and the logic circuitry 25 of the mobile unit. The GPS receiver communicates with the satellite 22 and the exact longitude and latitude of the mobile unit are determined. This information is sent to the MTSO via a cell site, and the MTSO uses a look-up table such as disclosed in FIG. 9, to determine which cell site is most appropriate for use by the mobile unit. The mobile unit communicates with cell sites using unused bits of the aforediscussed overhead messages to send its positional information to the MTSO when the mobile unit is first activated. This positional information is relayed to the MTSO by the first cell site to communicate with the mobile unit. The MTSO then selects the cell site most appropriate for the mobile unit and hands that mobile unit off to that cell site. The cell sites transmit system service boundaries in their overhead messages that are interpreted by mobile units. The mobile units use the location information supplied by the GPS receiver as opposed to signal strength to determine which system to originate on. Communication process termination can utilize the paging process as is currently utilized. A response from a mobile unit includes the location information, and the designated control channel instructs the mobile unit to tune to one of its channels. A communication process in progress utilizes the overhead message of the voice channel to communicate location information. Once a mobile unit that is processing on a particular cell site crosses a cell site boundary, it is instructed to perform a handoff to the cell site that is to service the new location. It is understood that the GPS is used as an example of the preferred source of positional data; however, other sources similar to the GPS can be used without departing from the scope of the present invention. All that is required is that the source of positional data be able to generate precise and accurate locational data on a fixed or a rapidly moving object. It is also helpful, but not absolutely required, that in some circumstances, such as triangulation, the CMR be only passively involved in the determination of the positional data.

The handoff process is similar to the present handoff processes, except it will be controlled according to position of the mobile unit instead of signal strength. This position information is used to determine communication process rating and taxing for billing purposes and communication process routing to make sure that the proper services for that location are provided.

A "locate request" signal is not used, since the exact location of the mobile unit is known to the MTSO. However, a signal strength method can also be used in making communication process management decisions if suitable. Such a process would be used if the mobile unit moves into a prior art cellular system.

The hereinafter disclosed system has many advantages over the prior art systems. Multiple layers of information can be generated and used. The system using the invention disclosed herein and in the incorporated material may use many levels of mapping such as cell site selection, taxing, billing, special rate plans, and the mapping of E-911 calls to an appropriate service provider.

BRIEF DESCRIPTION OF THE DRAWING FIGURES

DETAILED DESCRIPTION OF THE PREFERRED EMBODIMENT OF THE INVENTION

Figure 8:
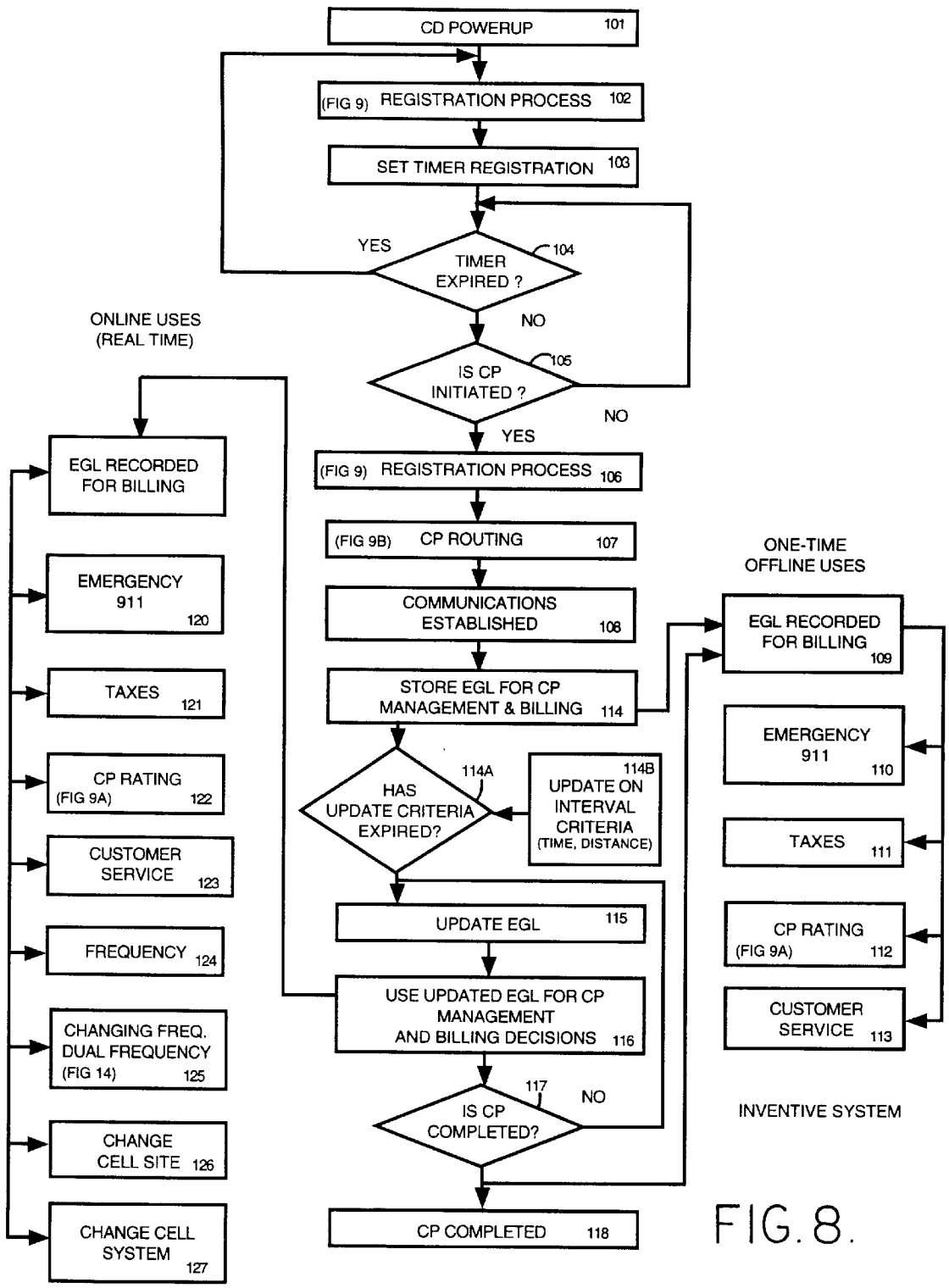
FIG. 8 is a block diagram illustrating a flow chart for the wireless over-the-air communications system embodying the present invention.
Figure 9:
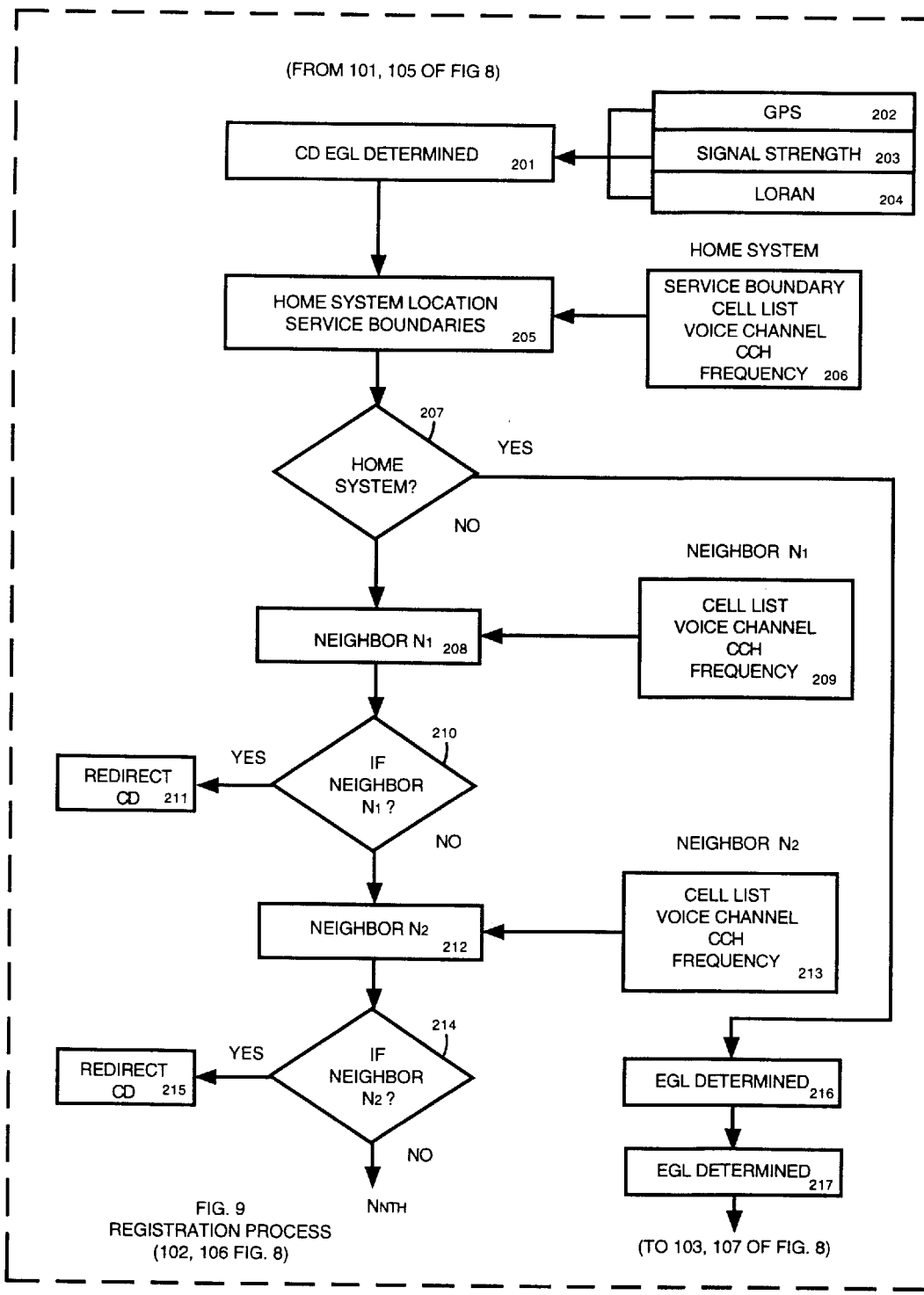
FIG. 9 is a block diagram showing a registration process used in the present invention.
Figure 10:
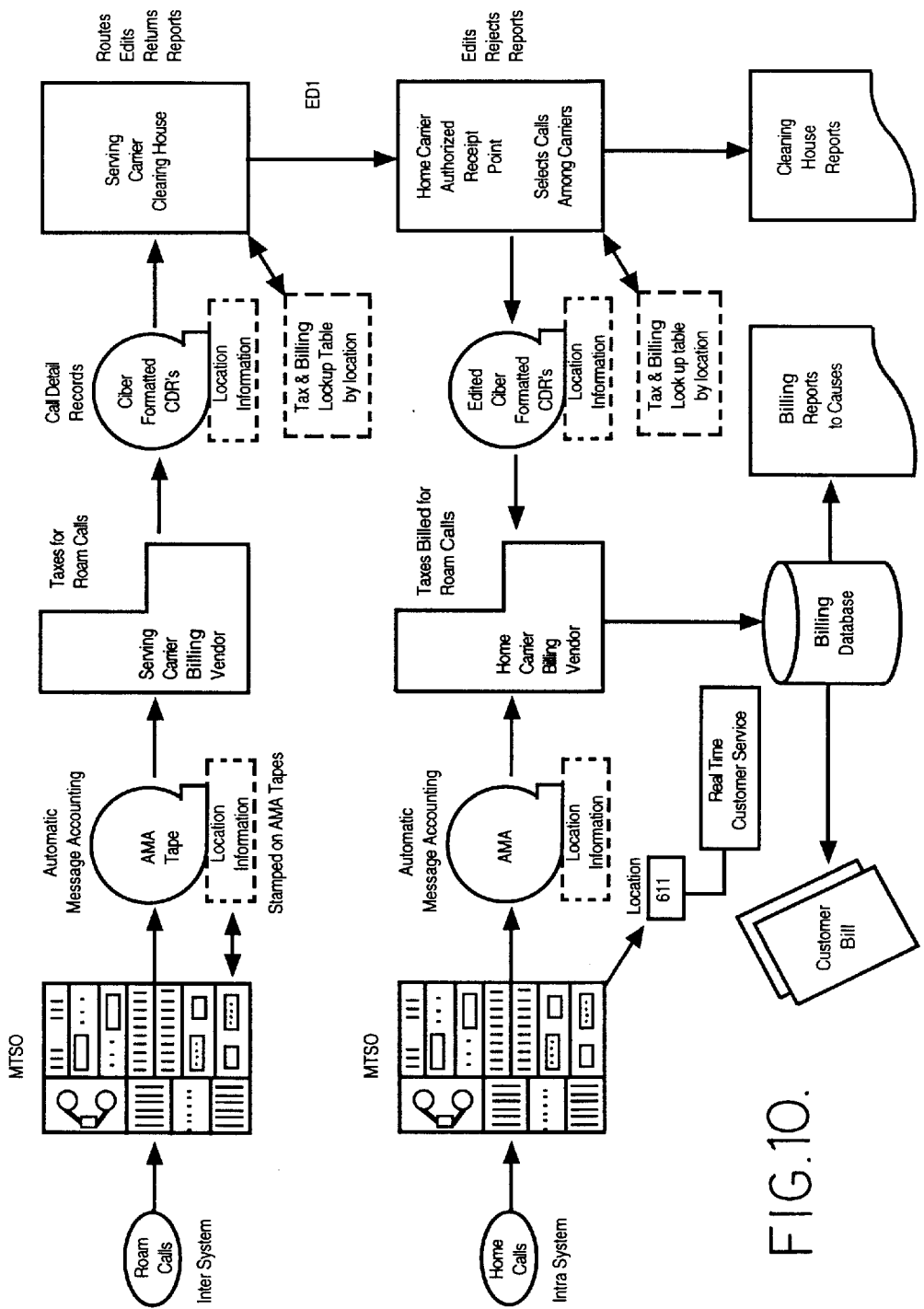
FIG. 10 is a diagram showing a billing process used in the present invention.

A representation of the logical flow that may occur in a wireless communications system incorporating the use of exact geographic location (EGL) for the communication process management decisions is shown in FIGS. 8–10. The communication process management decisions are based on information provided by the communication device (CD) towards the fixed system and to the communications device from the fixed system. The description of a sample communications process (CP) begins upon the powering up of the communicating device and continues until that communications process is completed.

When a communications device is powered up, block 101, the registration process, block 102 is initiated. The registration process is detailed in FIG. 9. The first step in the registration process, block 102 is to determine the exact geographic location, block 201 of the communications device via either GPS, block 202, signal strength, block 203, Loran, block 204, triangulation or other similar location means. The information is used by the initial (Home) serving system and the exact geographic location (EGL) is compared to the service boundaries, block 205 for that home system. A determination is made as to whether or not the Communications Device (CD) is located within the serving system's boundaries via the means of communication data filed in the serving system, block 206. The communication data may include computerized latitude and longitude tables which are then compared to geographic location tables of service allocation. In the absence of comparative tables, algorithms may be run to determine the mapping of exact geographic location (EGL) to service boundaries. If the Communications Device (CD) is located within the serving system's boundaries, the exact geographic location (EGL) is re-established, block 216 and recorded, block 217 for billing or other purposes. If the Communications Device (CD) is determined to be located outside of the serving system's boundaries, then the exact geographic location (EGL) is compared to the neighboring system boundaries, block 208 and block 212 on an interactive basis until the system that is authorized to serve the Communications Device (CD) at the current exact geographic location (EGL) is determined. In addition to the reference tables that assign the service provider, the communication data, blocks 209, 213 also identifies the means of transferring control of the Communications Device (CD) from one system to another. Once the correct system is identified, the Communications Device (CD) is commanded to establish communications with the proper cell site within the correct system 211, 215. An example of this would be commanding the Communications Device (CD) to tune to the neighboring system's control channel. A registration increment timer 103 is then sent to the Communications Device (CD) informing it of the intervals 104 at which re-registration is required. This registration process is continued through the period that the Communications Device (CD) is not in a Communication Process (CP) active state.

Figure 9A:
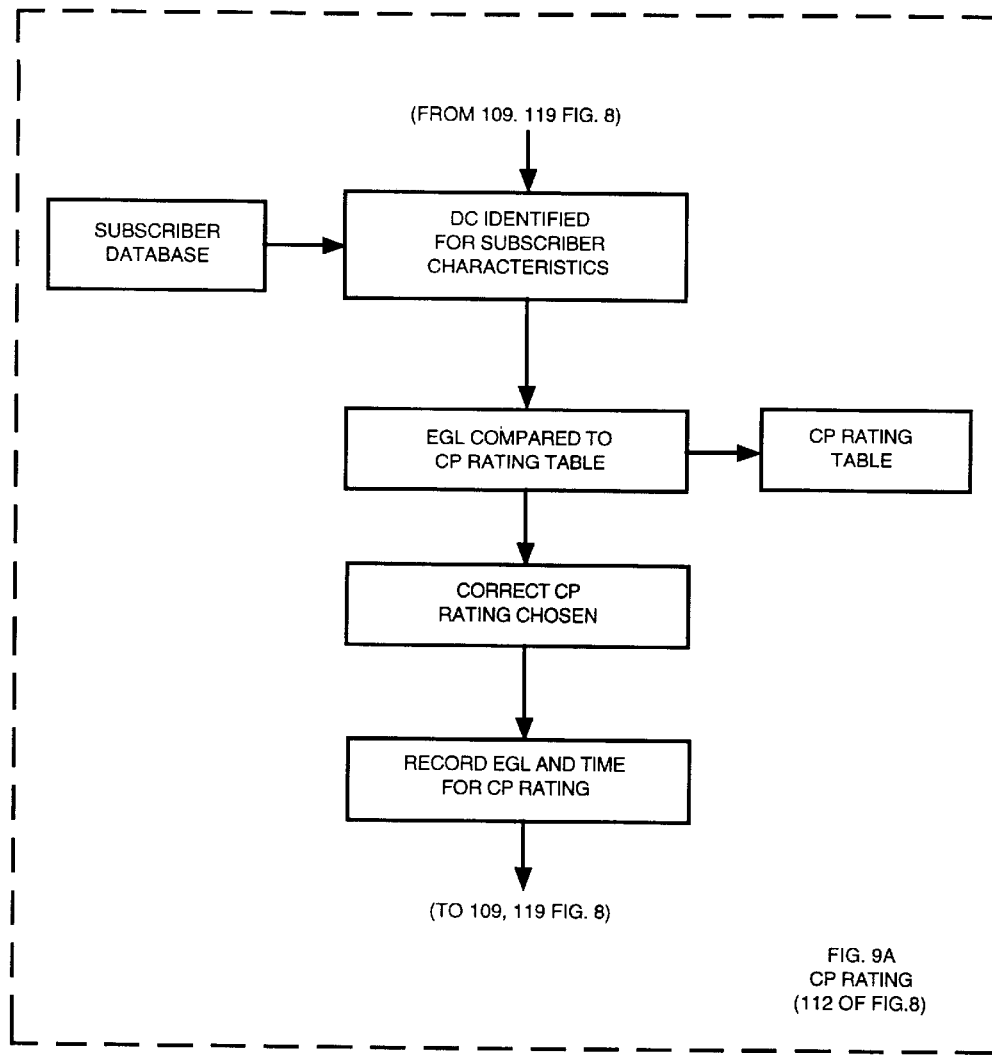
FIG. 9A is a block diagram showing a communication process rating procedure used in the present invention.
Figure 9B:
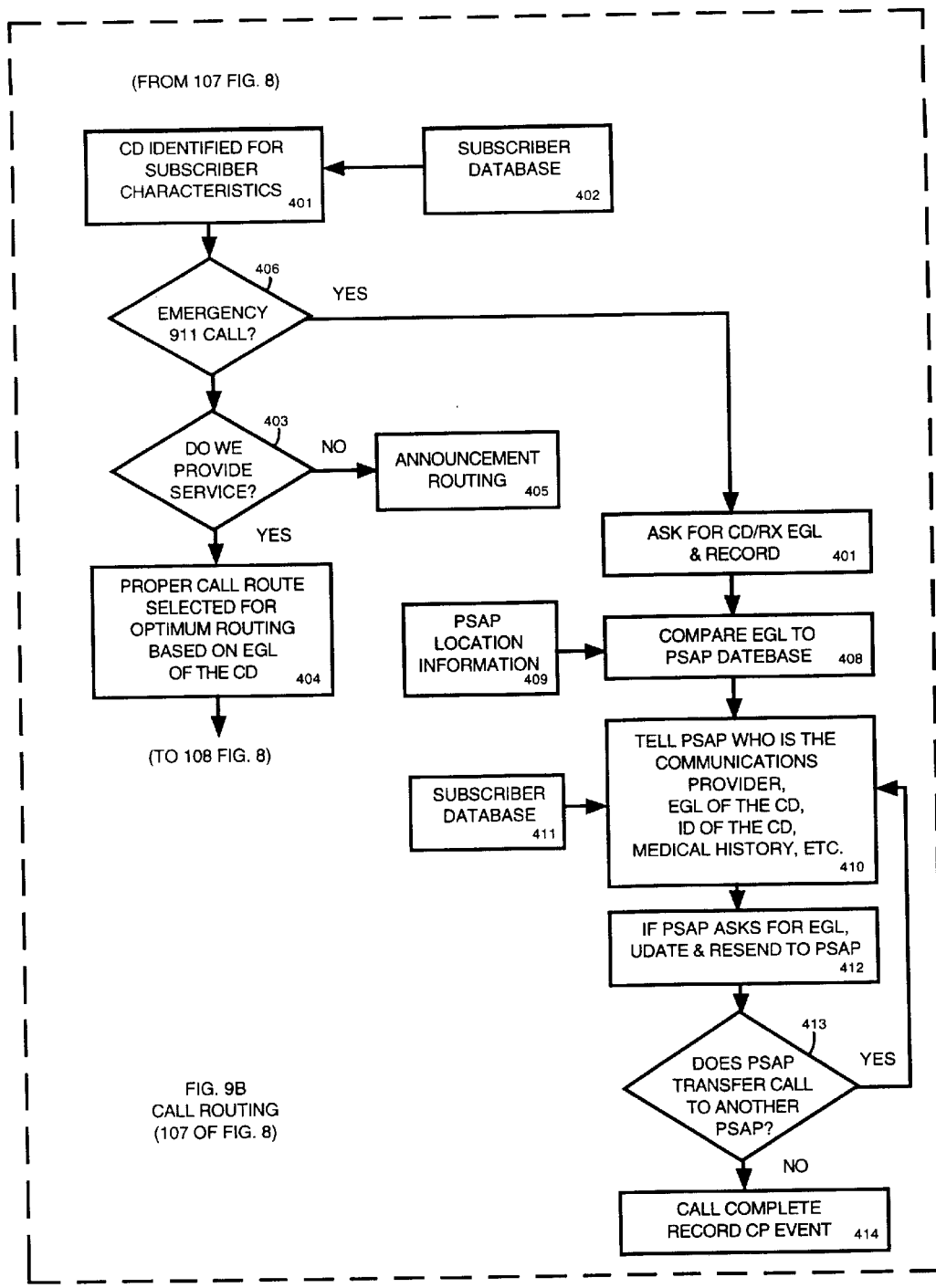
FIG. 9B is a block diagram of a communication process routing process used in the present invention.

If a Communication Process (CP) were initiated then the registration process, block 106, FIG. 9, would take place to update the exact geographic location (EGL). Once the exact geographic location (EGL) is established the routing selection for the Communication Process (CP) is begun, block 107. FIG. 9B shows that the first step is to identify the Communications Device (CD), block 401 so that the service characteristics, block 402 can be identified. A determination is then made as to whether or not service is to be provided, block 403. If service is to be provided proper routing is selected, with the most appropriate communications path to connect point A to point B is selected for the specific communication process based on the exact geographic location (EGL) of the Communications Device (CD), block 404. This may include activities and decision to route communication processes through land based networks, microwave, fiberoptic links and the like to allow for cost effective or expeditious connections to be established. If service is to be denied, the wireless communication system can direct the communication process to the appropriate announcement, block 405 and if the Communication Process (CP) being initiated is determined not to be a 911 emergency call, block 406. If a communication process is determined to be a 911 emergency call, then the system identifies the proper routing of the emergency communication process, blocks 407, 408 and 409, and the communication process will be directed to the proper emergency response system. The routing of this emergency call should be accompanied by all of the information that is pertinent and available, blocks 410 and 411. If the exact geographic location (EGL) continues to change, updates should be sent to the serving emergency response system, block 412. If another emergency response system needs to gain control of the call, the system will be able to establish a connection with the new emergency response system, block 413. This event is then recorded upon completion, block 414.

With communications established (FIG. 8), block 108, the exact geographic location (EGL) may be stored for Communication Process (CP) management, billing purposes, and other identification needs, block 114. The stored exact geographic location (EGL) is then recorded for establishing the origination point for billing purposes, block 109, emergency 911 call accounting, block 110, taxing purposes, block 111, rating the Communication Process (CP), block 112, or post communication process subscriber service, block 113. The Communication Process (CP) rating process shown in FIG. 9A identifies the subscriber characteristics, blocks 301 and 302. The recorded exact geographic location (EGL) is then compared to the Communication Process (CP) rating table, blocks 303 and 304 to select the correct rating, block 305 for that communication process (CP). This information is then recorded for later processing which may include application of taxes, Communication Process (CP) billing rates, or any other information which could be matched to the exact geographic location (EGL) of the communication process (CP). As the Communication Process (CP) continues, the exact geographic location (EGL) is constantly updated, block 115 or alternately updated at various intervals, block 114a, which intervals can be changed based on the time and/or distance traveled by the mobile unit to meet system needs for efficient communication process management, and these updated Communications Device (CD) locations are used for Communication Process (CP) management, block 116, billing decisions, block 119, and other real time processing uses, such as 911 emergency calls made while a non-emergency communication process was in progress, block 120, taxing, block 121, Communication Process (CP) rating, block 122, subscriber service, block 123, and frequency selection, block 124. The intervals at which the updating occurs can be determined on a preset time, such as every minute, or can be determined according to distance traveled by the mobile unit, such as every twenty miles, or the interval can be set according to the nearest border so that the mobile unit will be monitored whenever it reaches a location that would cross over the border if the mobile unit traveled toward that border. In this manner, the billing information, the tax information and the frequency of the communication process can be based on the location of the communication process origination, but can also be continuously updated and changed as the mobile unit moves during the communication process whereby the exact rates and frequencies at any instant during the communication process can be applied to the communication process. As was discussed above, this will even permit separate networks to share cell sites as even though a single cell site handles a communication process, the location of the mobile unit will determine which system receives credit for the communication process and will handle the billing and taxing of the communication process. Alternatively, this will permit separate cellular systems to locate their own cell sites within the geographic area of another cellular system, and may even permit several different systems to share a single cell site.

The cell site can re-direct a communication process to another cell site under certain circumstances. For example, even though a particular cell site is chosen to handle a communication process, there may be special circumstances associated with a particular location that dictate all communication processes from that location be handled by a certain cell site. Special environmental conditions may be one such special circumstance, cell sites under repair may be another special circumstance or other business reasons may dictate such re-directing of communication processes. This redirecting can also occur for cellular systems. That is, if a selected cell site is not owned by the cellular system having rights to the communication process made by the mobile unit at that particular location, the communication process could be redirected to another cellular system. In this manner, customization of cellular service can be maximized with billing, taxing, frequency and the like all being selected according to the exact needs of the mobile unit during the communication process, and changed as the needs of the mobile unit change during the communication process. As discussed above, the preferred means for establishing the exact geographic location of the mobile unit includes a satellite communications system; however, other means can also be used.

All of this data collection and monitoring continues until the Communication Process (CP) is completed, block 117. When the communication Process (CP) is complete, and exact geographic location (EGL) of the mobile unit is recorded for various data processing uses prior to the data record closure, block 118.

FIG. 10 shows how the billing information is passed along through an external billing system. The MTSO first generates Automatic Message Accounting (AMA) files, usually in magnetic tape format, which holds all the detailed records for communication processes processed from a particular MTSO during that billing period. The AMA records are then processed (formatted into database readable media) at the wireless communication system's billing center which emerge as Call Detail Records (CDR). Call Detail Records are the detailed accounting of all the communication processes assigned to a subscriber's account. The roaming and home reports are combined which are then processed as subscriber bills. It is here in the prior art system that any taxes may be applied by the service provider or by the wireless communication system. Ideally, taxes should be assessed based on the location of the mobile unit when service is provided. This is not the case with prior art systems. For example, home communication processes are taxed according to either the billing address of the subscriber or the zip code or business address of the service provider and roam communication processes, that is communication processes made using a cell site that is not in the mobile unit's home area, are taxed based on the billing address of the roam network or where the cell site is located that services the communication process. Any tax based on the cell site location has the possibility of being in error, especially if the cell site is located adjacent to a border. The prior art has failed to teach the distinction between fixed location of hardware and exact geographic location (EGL) of the Communications Device (CD) for billing.

In the present system, the wireless communication system will obtain the instant location of the Communications Device (CD) at the registration process (FIG. 9). In a system where bills are processed externally, billing information combined with the location of on the Call Detail Records can then be compared to lookup tables or algorithms that will assess the proper tax or billing rate depending on the location (origination, termination, duration, instantaneous location, or the like) of the communication process.

If needed, the billing location codes could be recorded at some given interval (perhaps, for example, every minute, or after the mobile unit has traveled a certain distance) that would allow for updates and changes to the billing code as the Communications Device (CD) moves through different territories or beyond interval distances which can be calculated directly in a GPS system or indirectly via vector calculations in other systems.

One of the additional features that can be provided by the system of the present invention is real time subscriber service (FIG. 8, block 123). Knowing the location of the Communications Device (CD) is important to the wireless service provider to help solve some service problems associated with the wireless network.

Figure 17:
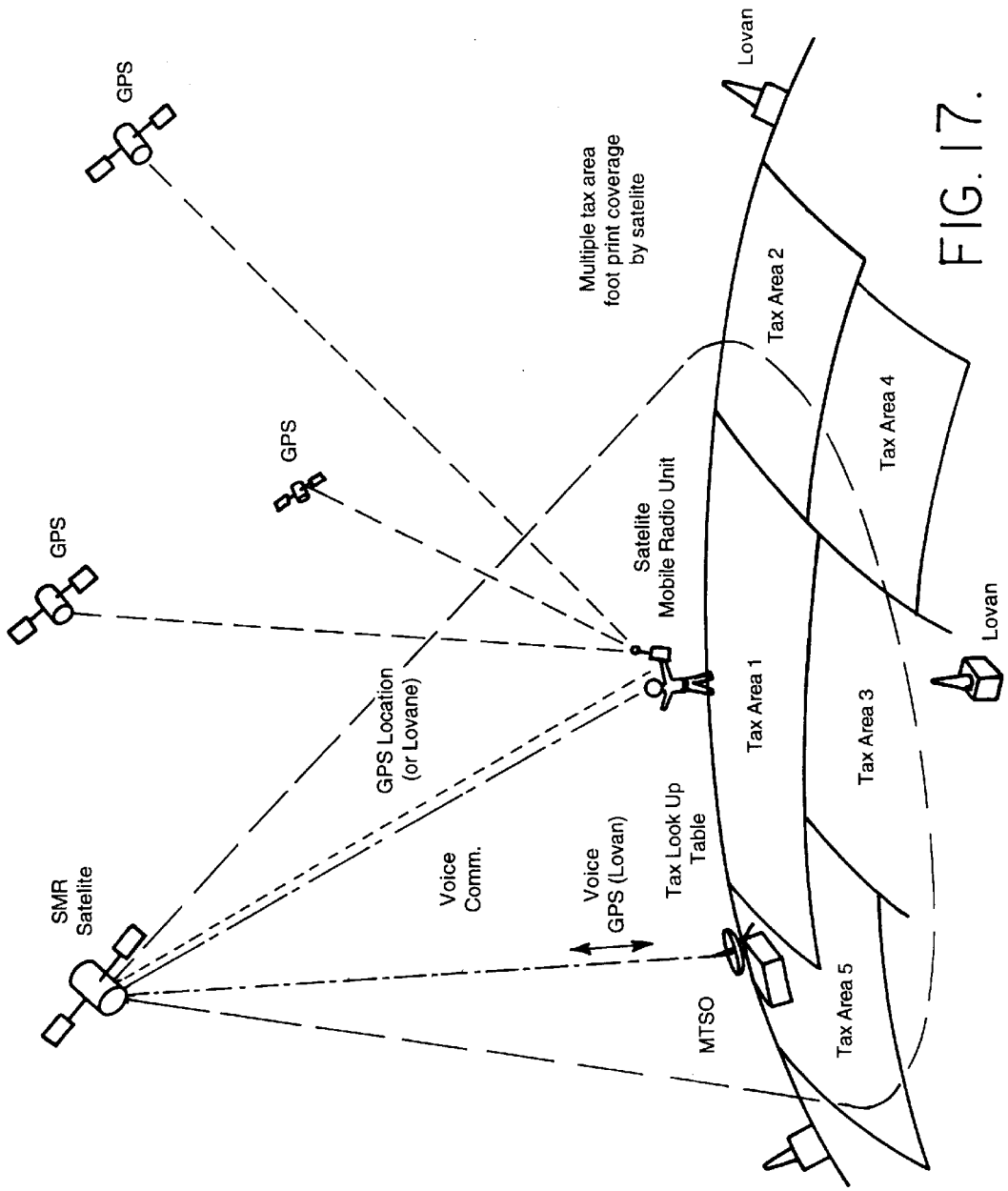
FIG. 17 illustrates the application of the present invention to a geographic area which includes several countries.

Although billing and taxing issues are important to current land based wireless communications systems service providers, these issues will be even more important for satellite systems (see FIG. 17) because the footprint of a satellite can cover many states or even different small countries such as in the European Community, with enormous tax generating capacity. With GPS location devices or Loran-C or any other type of location technology used to locate the satellite mobile phones, the problem can be avoided using the system disclosed herein. The exact geographic location of each subscriber unit will be carried along with voice transmission to allow location of the billing unit to be determined for tax assessment billing.

The advantages realized by the present invention can also be understood by comparing FIGS. 3–5 to FIGS. 11–16.

Figure 4:
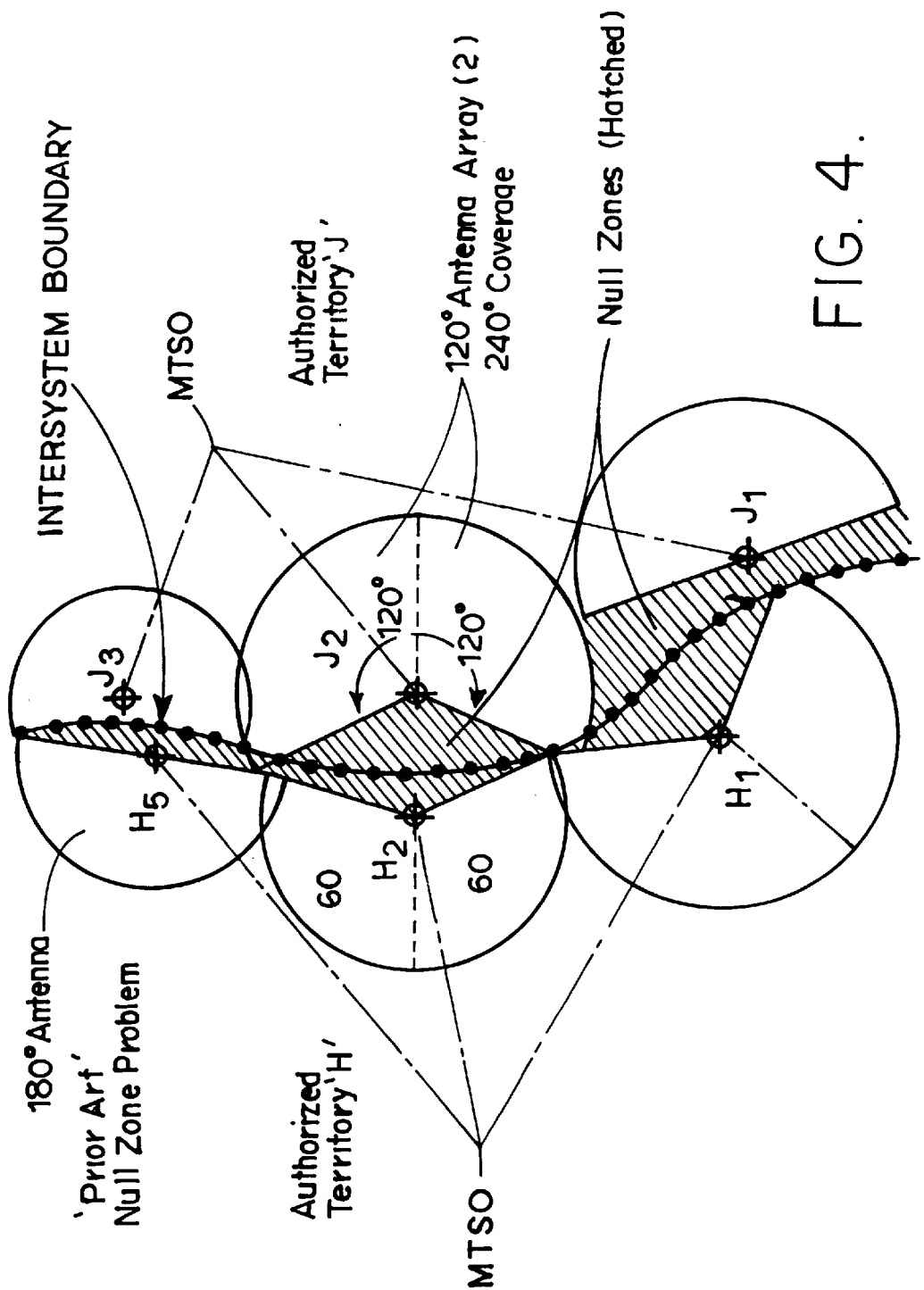
FIG. 4 illustrates a null zone problem associated with prior art systems.
Figure 5A:
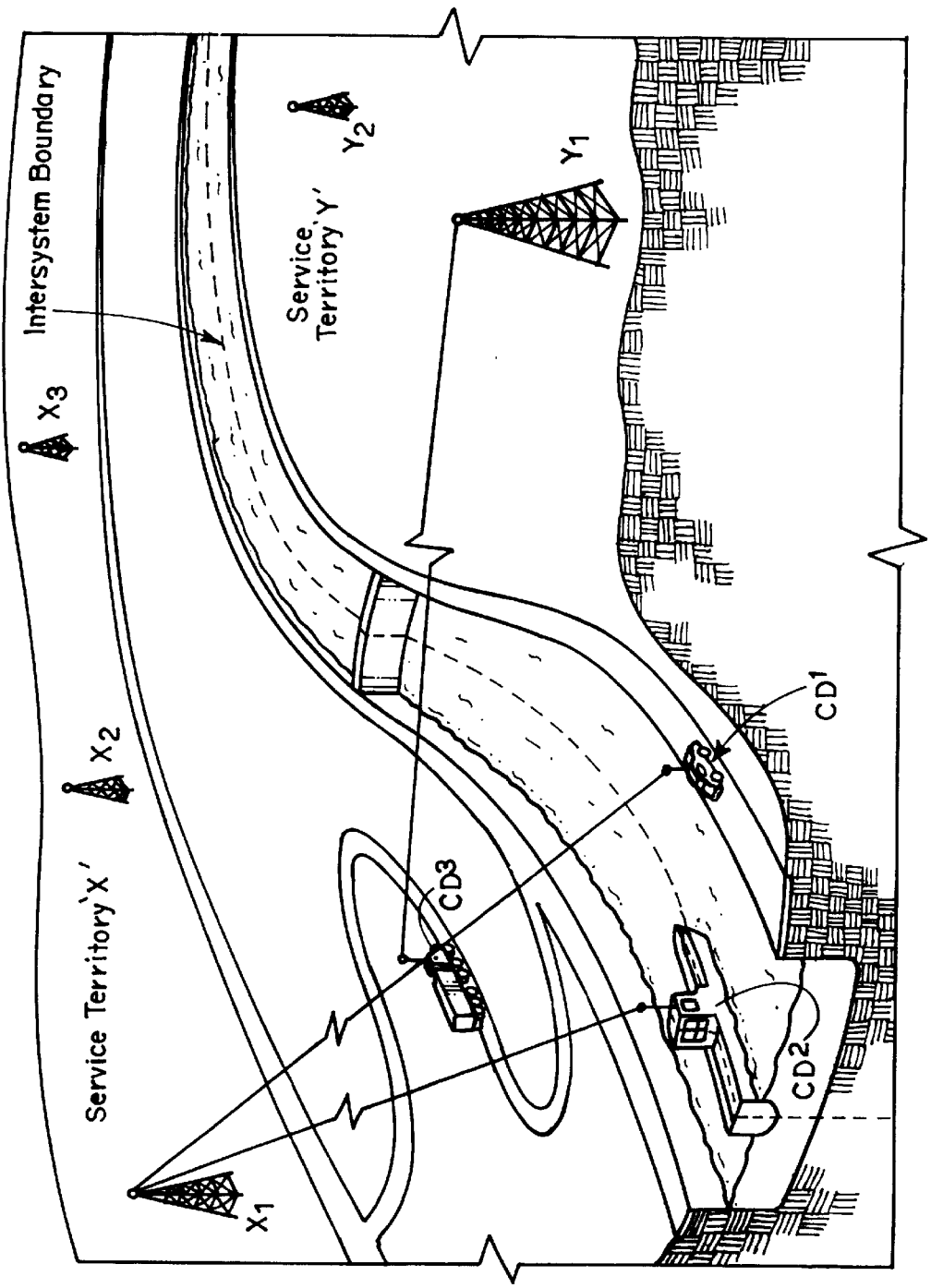
FIGS. 5A and 5B illustrate boundary issue problems between two prior art systems separated by a natural boundary, such as a river.
Figure 5B:
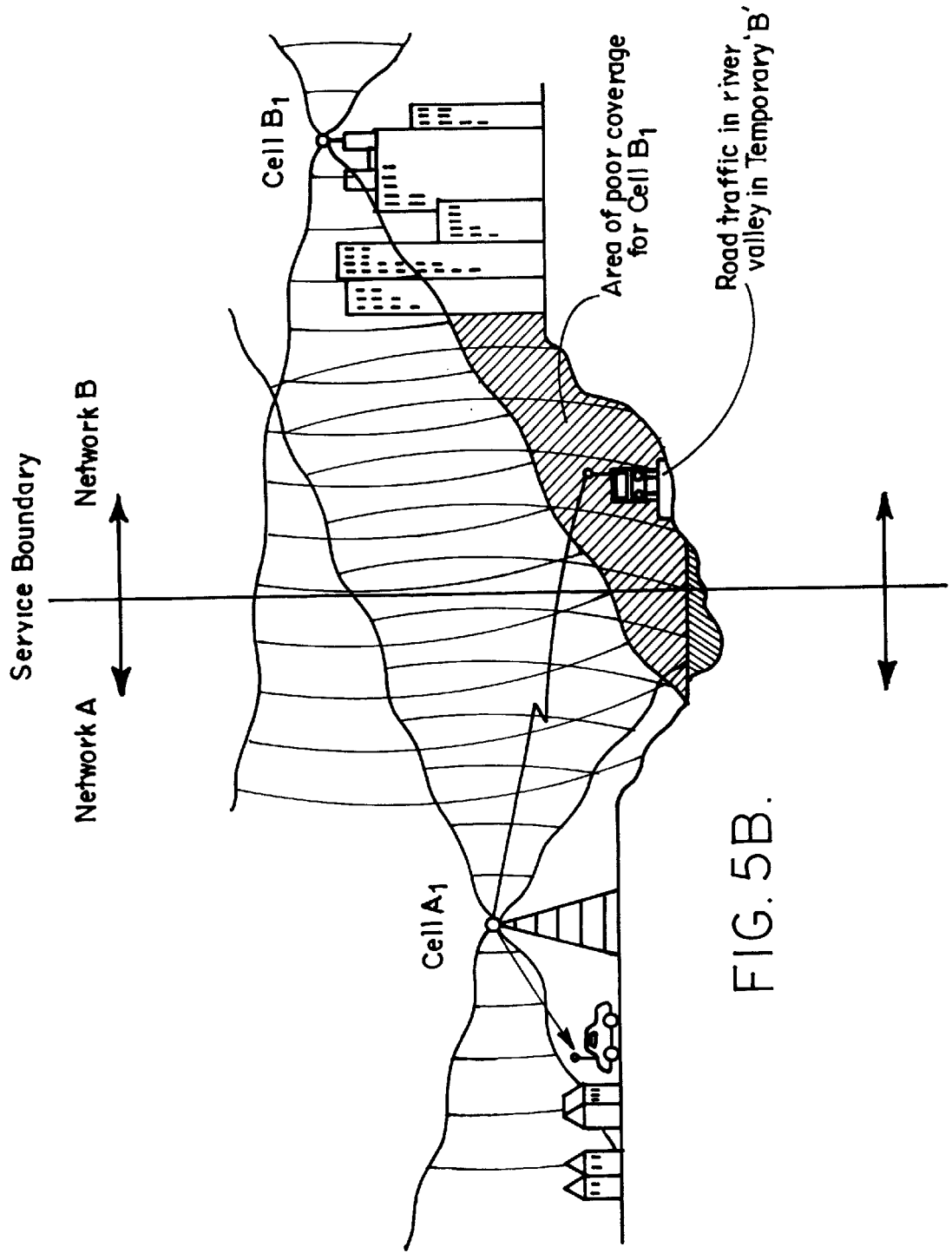
Figure 6:
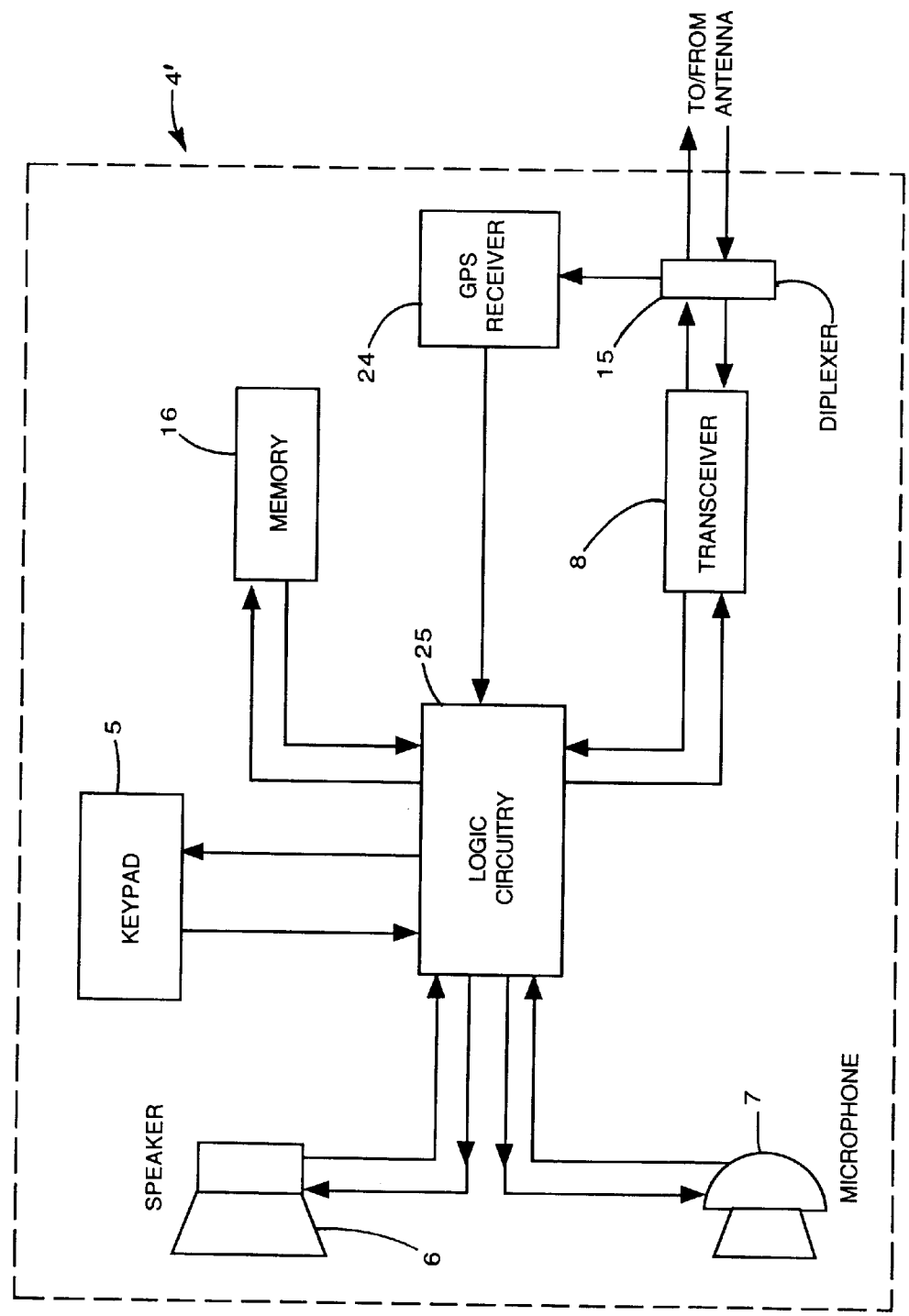
FIG. 6 is a block diagram of a mobile unit of a wireless over-the-air communications system which incorporates a GPS location determining system embodying the present invention.
Figure 7:
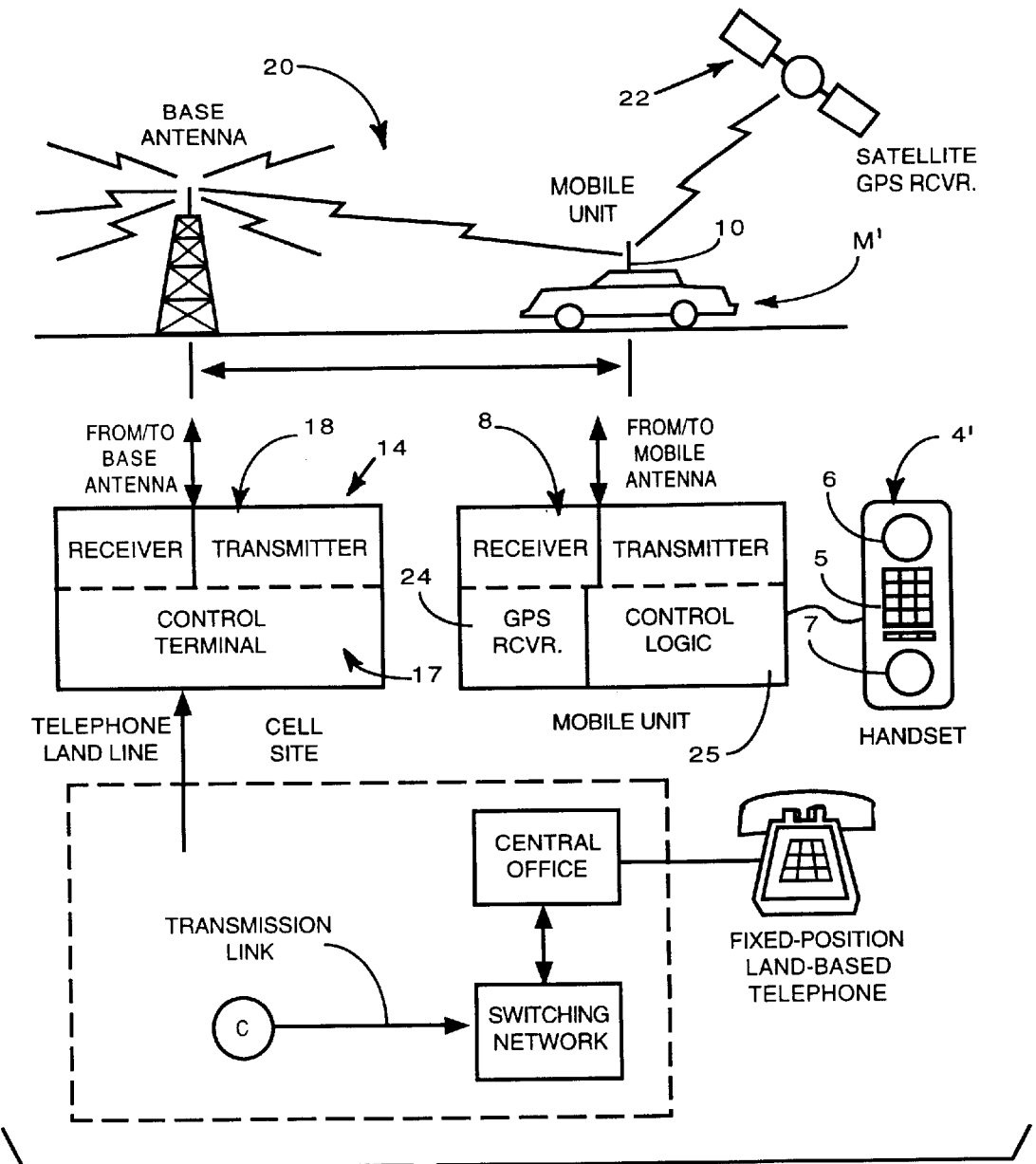
FIG. 7 illustrates a wireless over-the-air communications system incorporating a GPS position locating system for a mobile unit communicating with other units, such as the fixed-position unit shown.
Figure 7A:
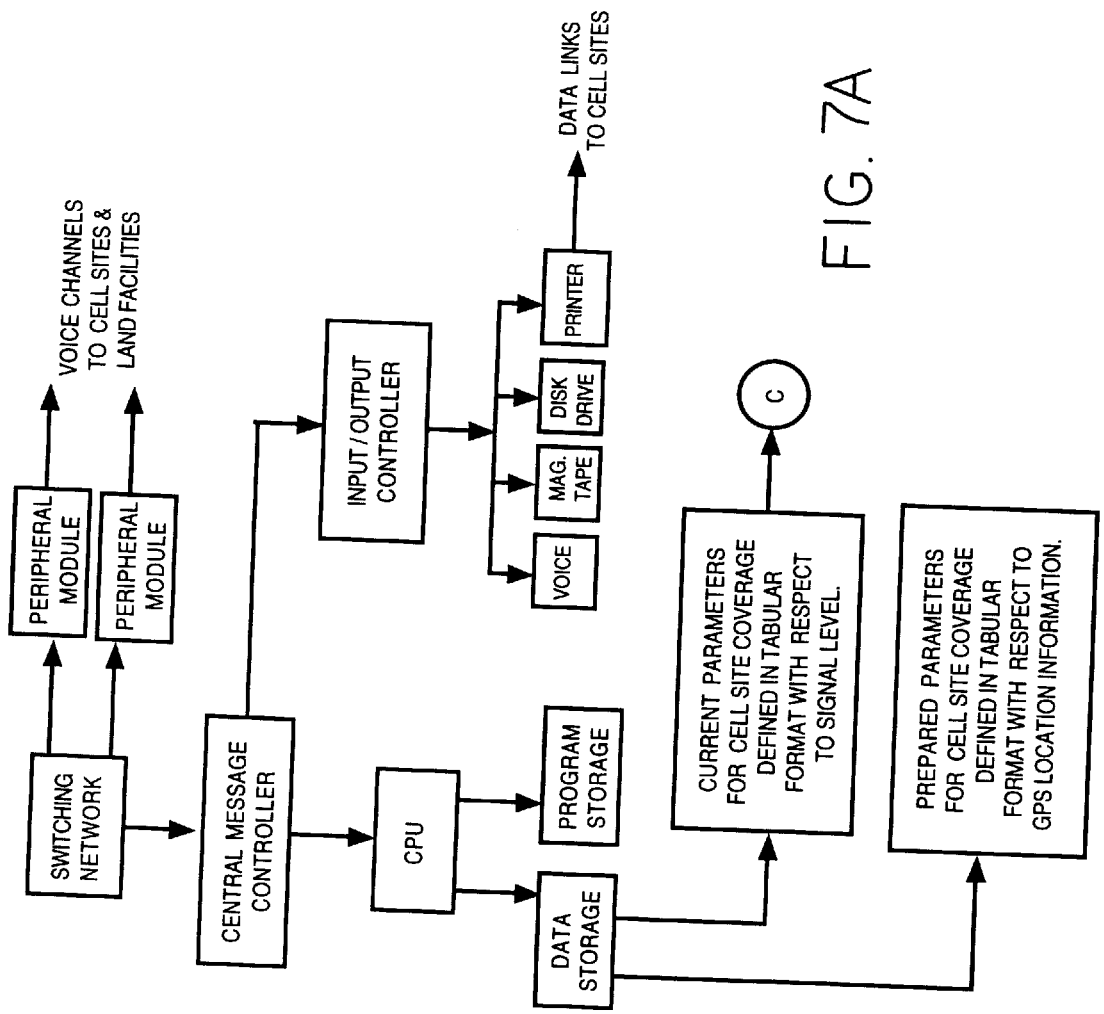
FIG. 7A is a block diagram showing systems included in an MTSO.
Figure 11:
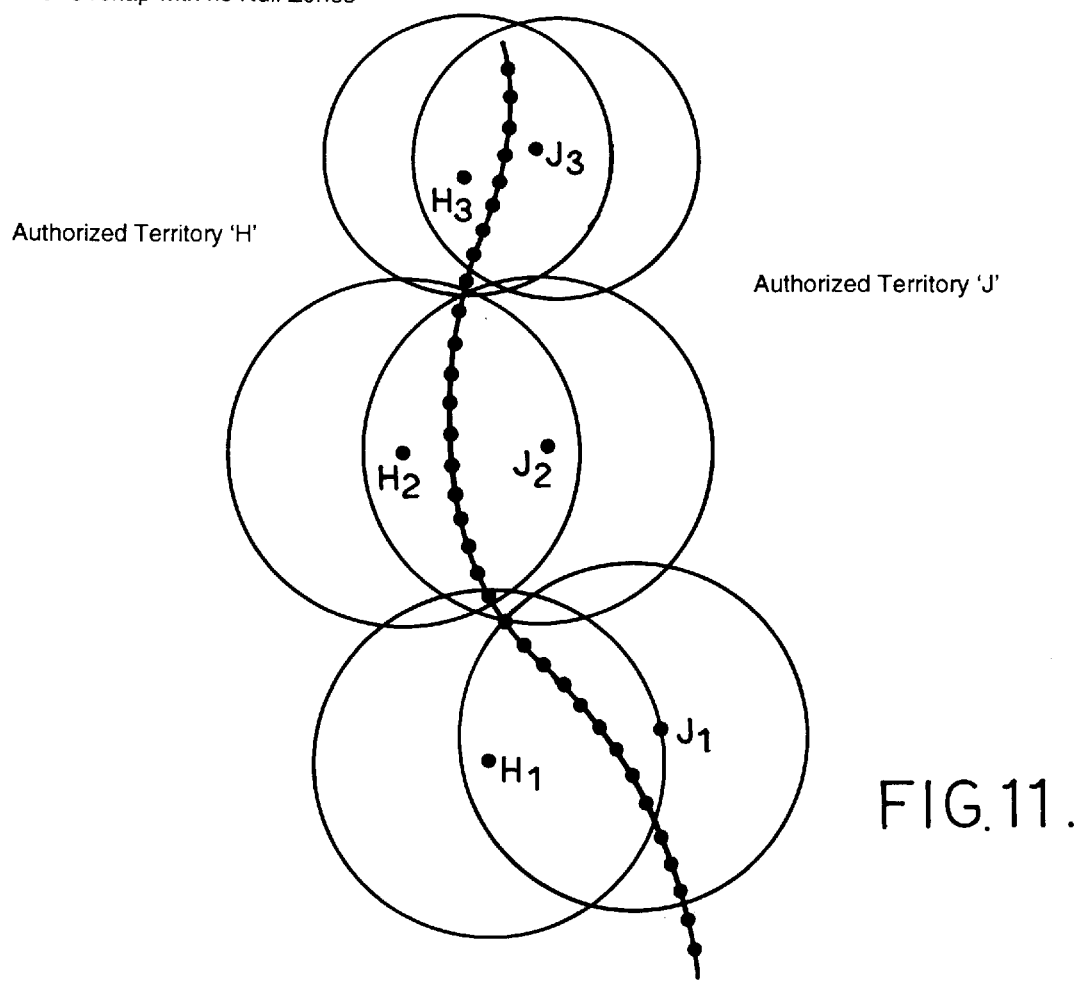
FIG. 11 illustrates the elimination of a null zone problem with a system embodying the present invention.
Figure 12:
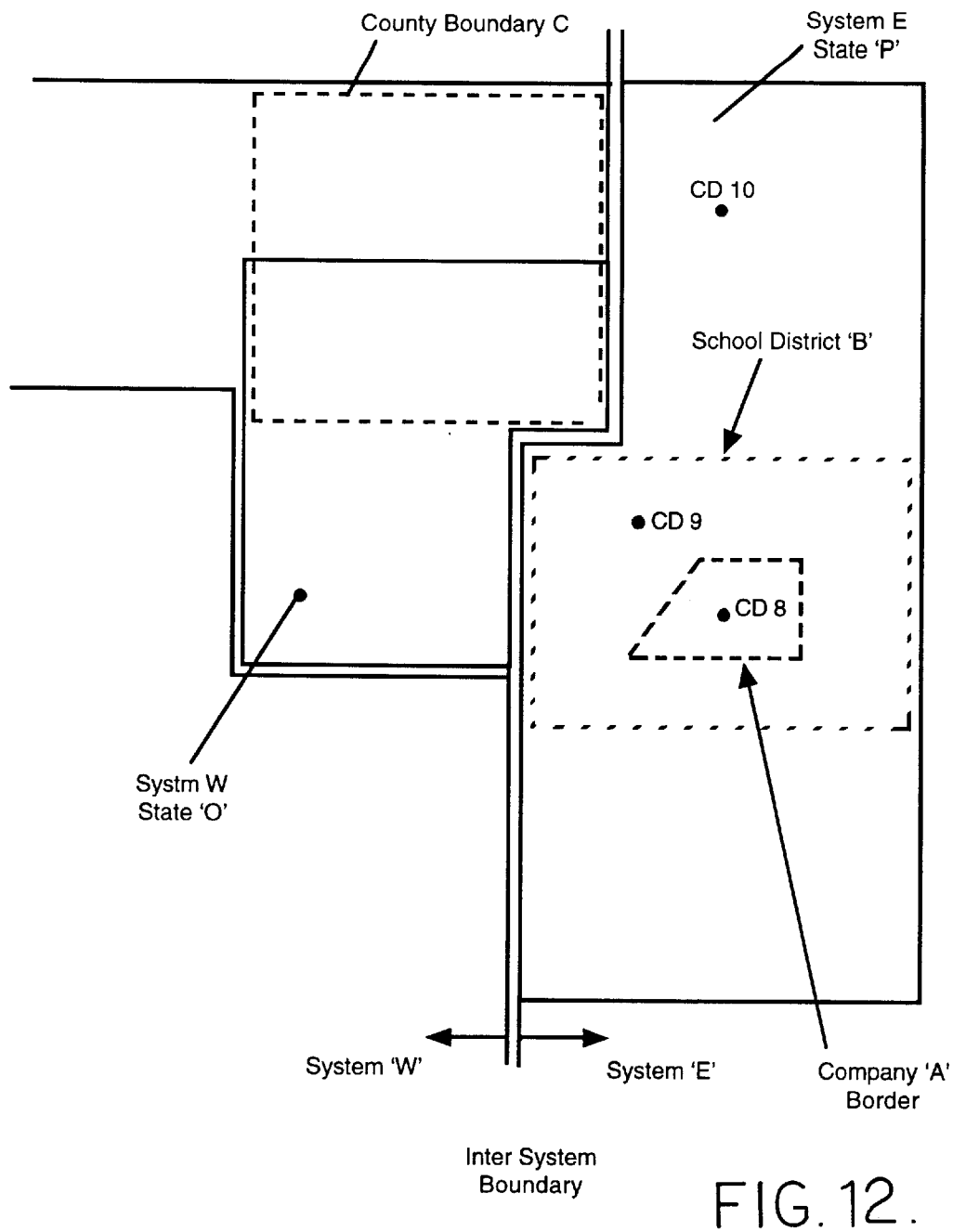
FIG. 12 illustrates variable billing and/or taxing for a mobile unit using the system of the present invention.

FIG. 11 shows the identical borders and cells as shown in FIG. 4. However, this time omnidirectional antennas are shown which improve coverage but can cause overlap into a neighboring system. This overlap can be handled as described above by each network having independent intersystem cells which map the exact geographic location (EGL) of the Communications Device (CD) to determine which system will service the CP.

Figure 13:
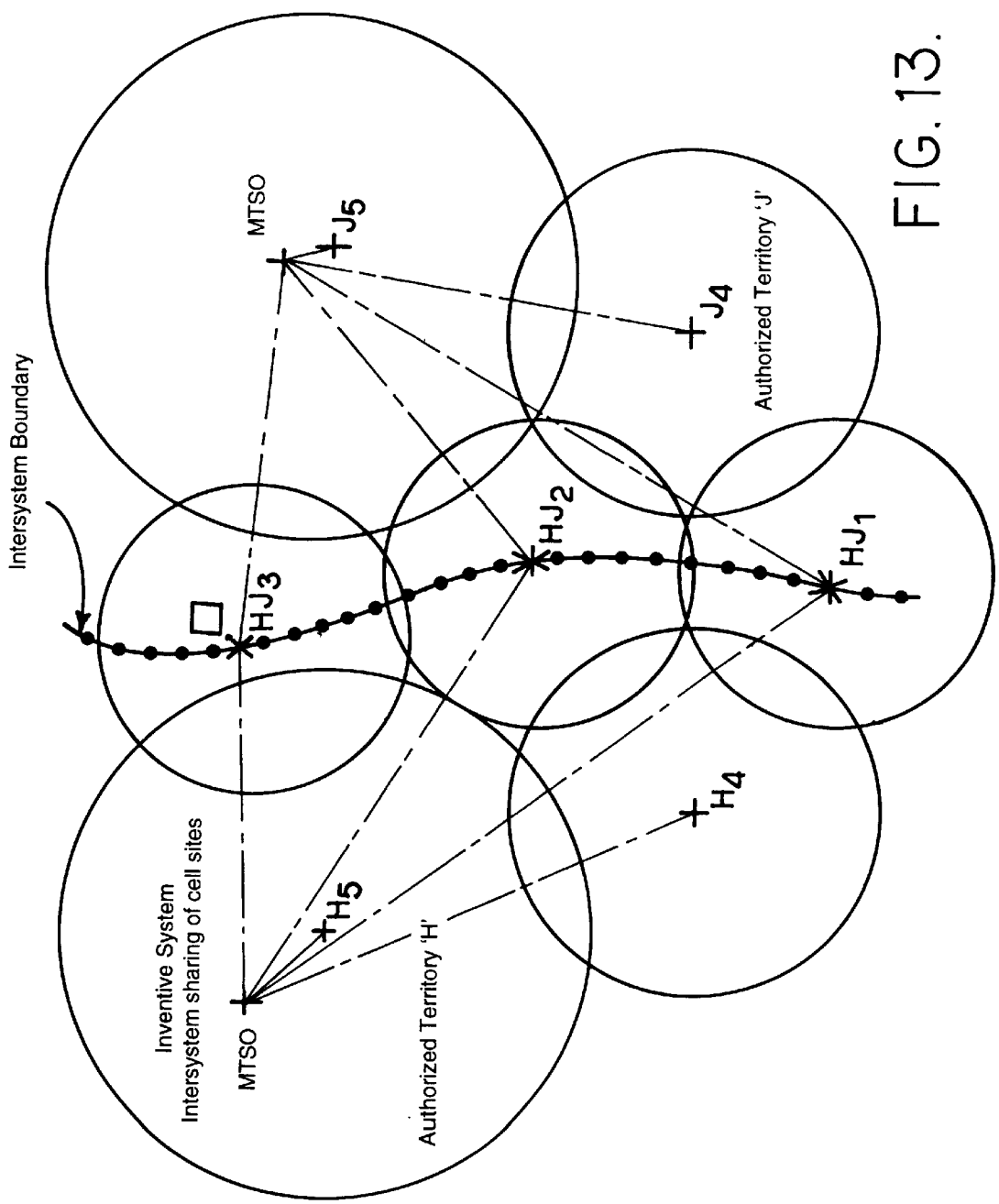
FIG. 13 illustrates how cell sites can be shared using the system of the present invention.

FIG. 13 shows still another configuration which could be utilized where borders are concerned. Two or more bordering service providers could erect single cells on or very near the border. Since the systems will track the exact geographic location (EGL) of each communications device (CD), it will know which service provider to connect the Communication Process (CP) to. This system uses a routing processor after the Communication Process (CP) has been accepted.

Figure 14:
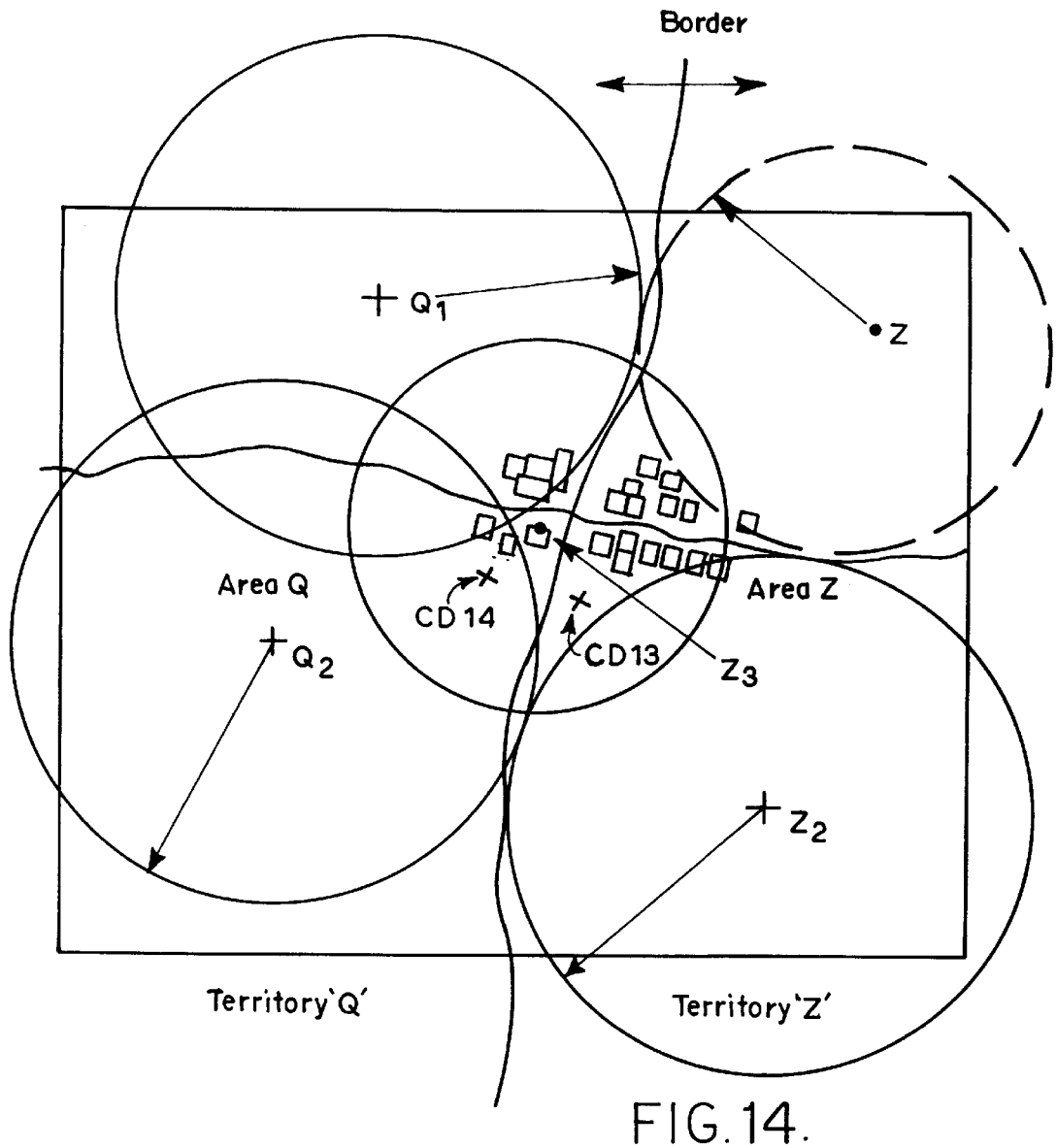
FIG. 14 illustrates how a cell site for one wireless over-the-air communication system can be located in the geographic boundary of another wireless communication system when the present invention is used to manage communication processes made by a mobile unit.

FIG. 14 shows a situation where the cell site from a competitive service provider is inside their borders. As shown, cell site Z3 is in place in service provider Q's territory. Communications Devices which are physically located inside territory Z which come up on cell site Z3 (communication device CD13) will be accepted. Communication device CD14 which will come up on cell site Z3 will be redirected to the control channel of cell site Q2 since it lies within territory Q.

Figure 1:
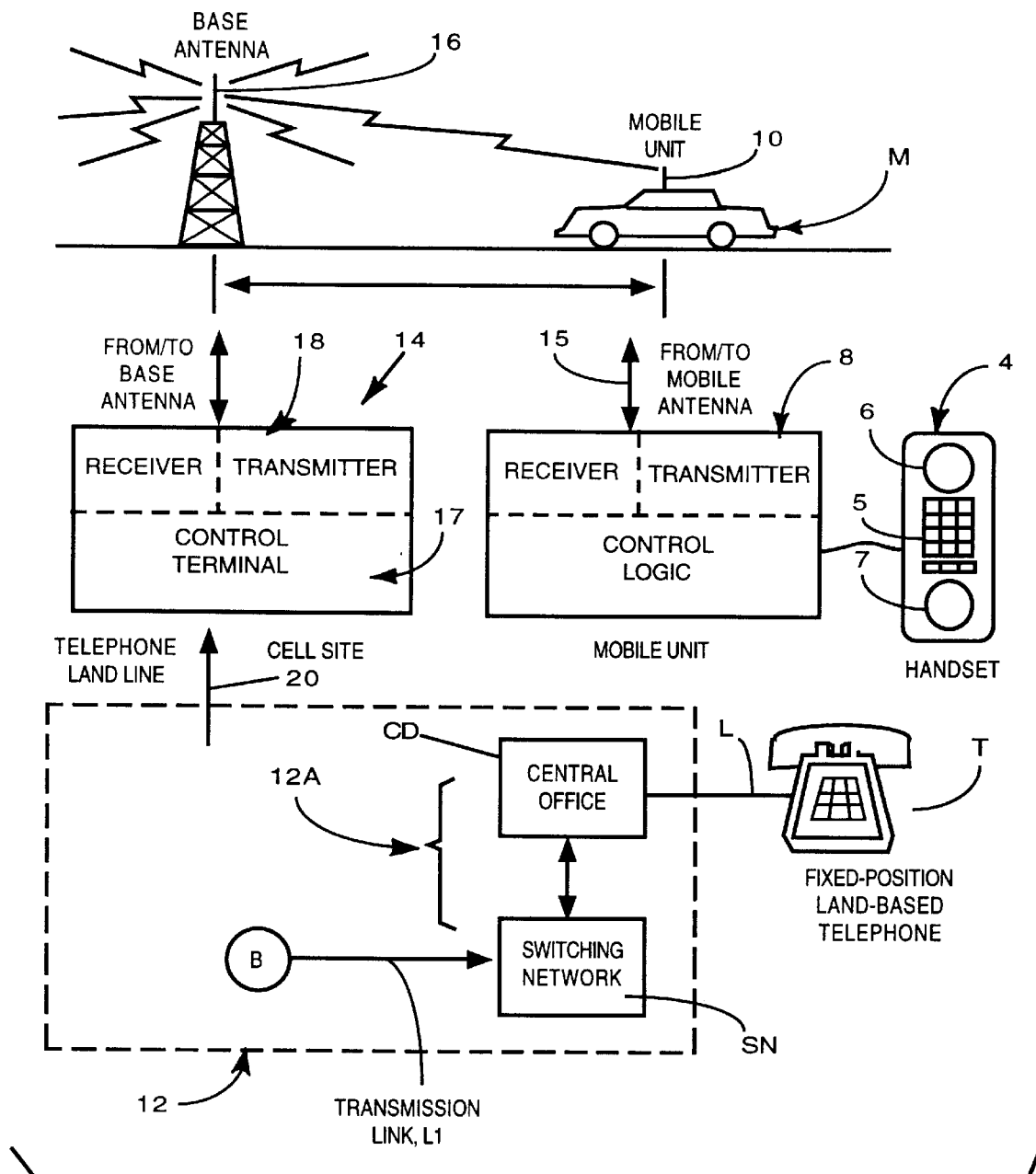
FIG. 1 illustrates a typical prior art mobile cellular telephone and its link with a fixed cell site and an MTSO.
Figure 2:
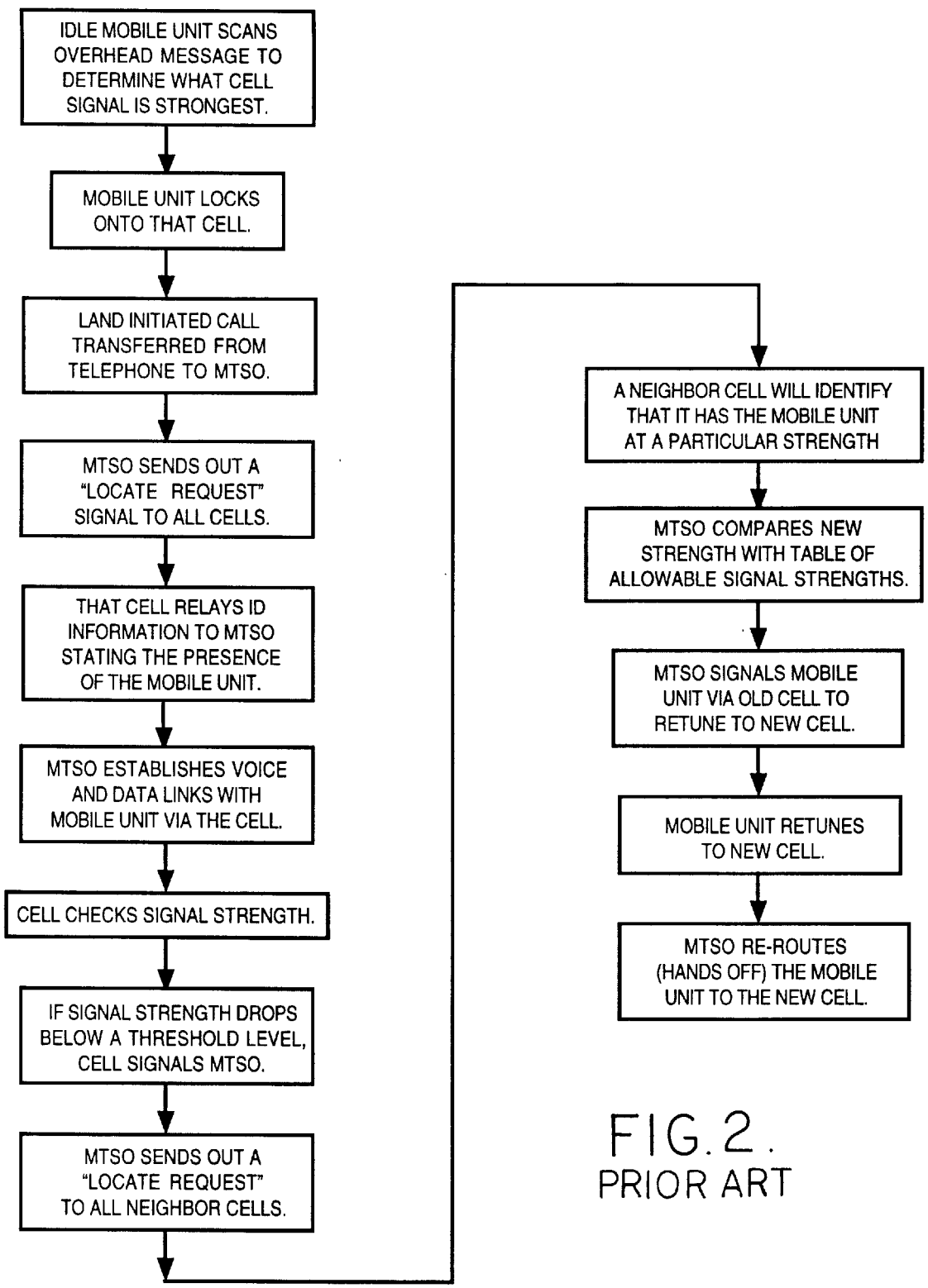
FIG. 2 illustrates a typical prior art cellular system in which a mobile unit can be connected with a fixed-position unit.
Figure 3:
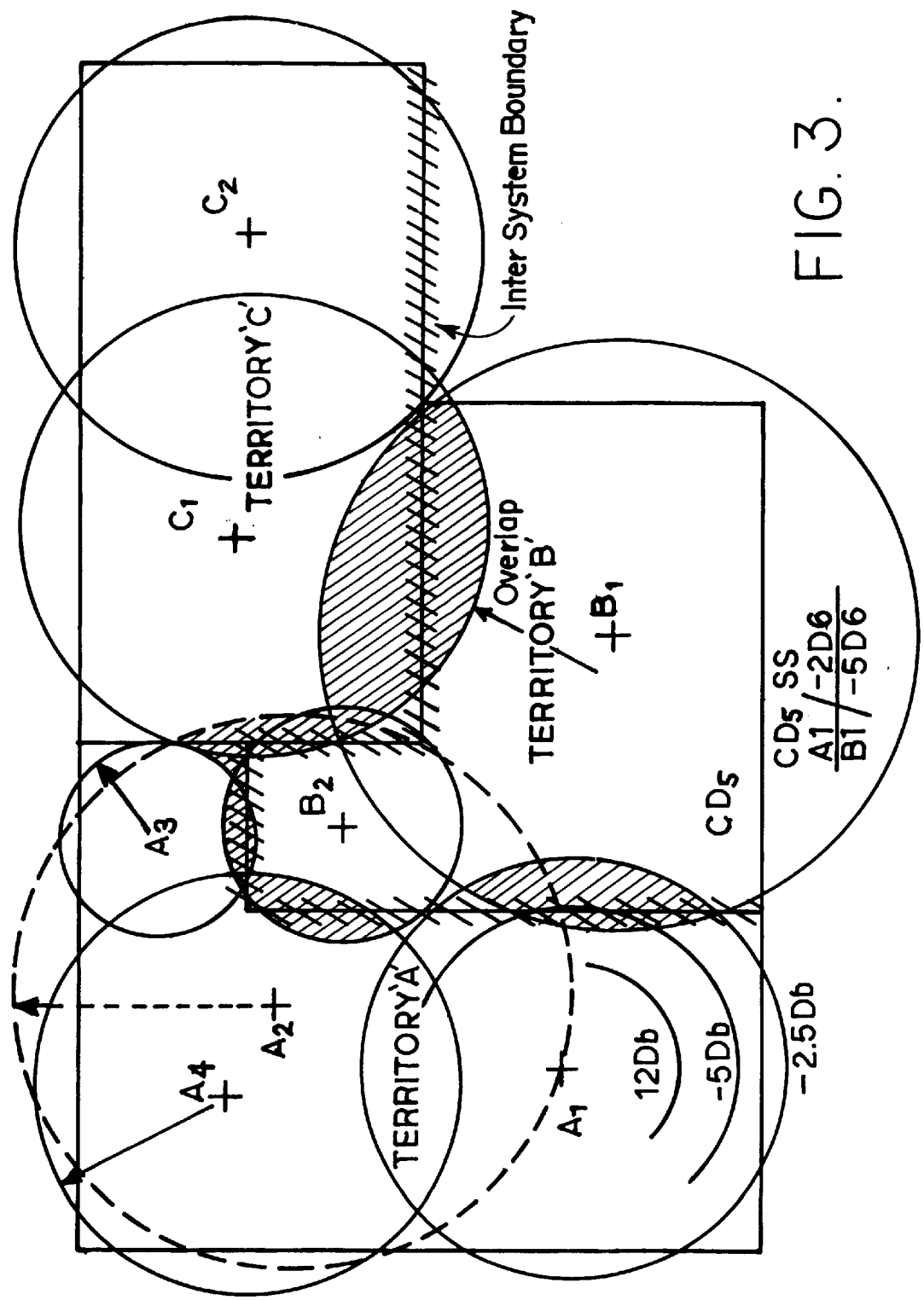
FIG. 3 illustrates an overlapping boundary problem with prior art systems as well as a fading signal at the borders.
Figure 15:
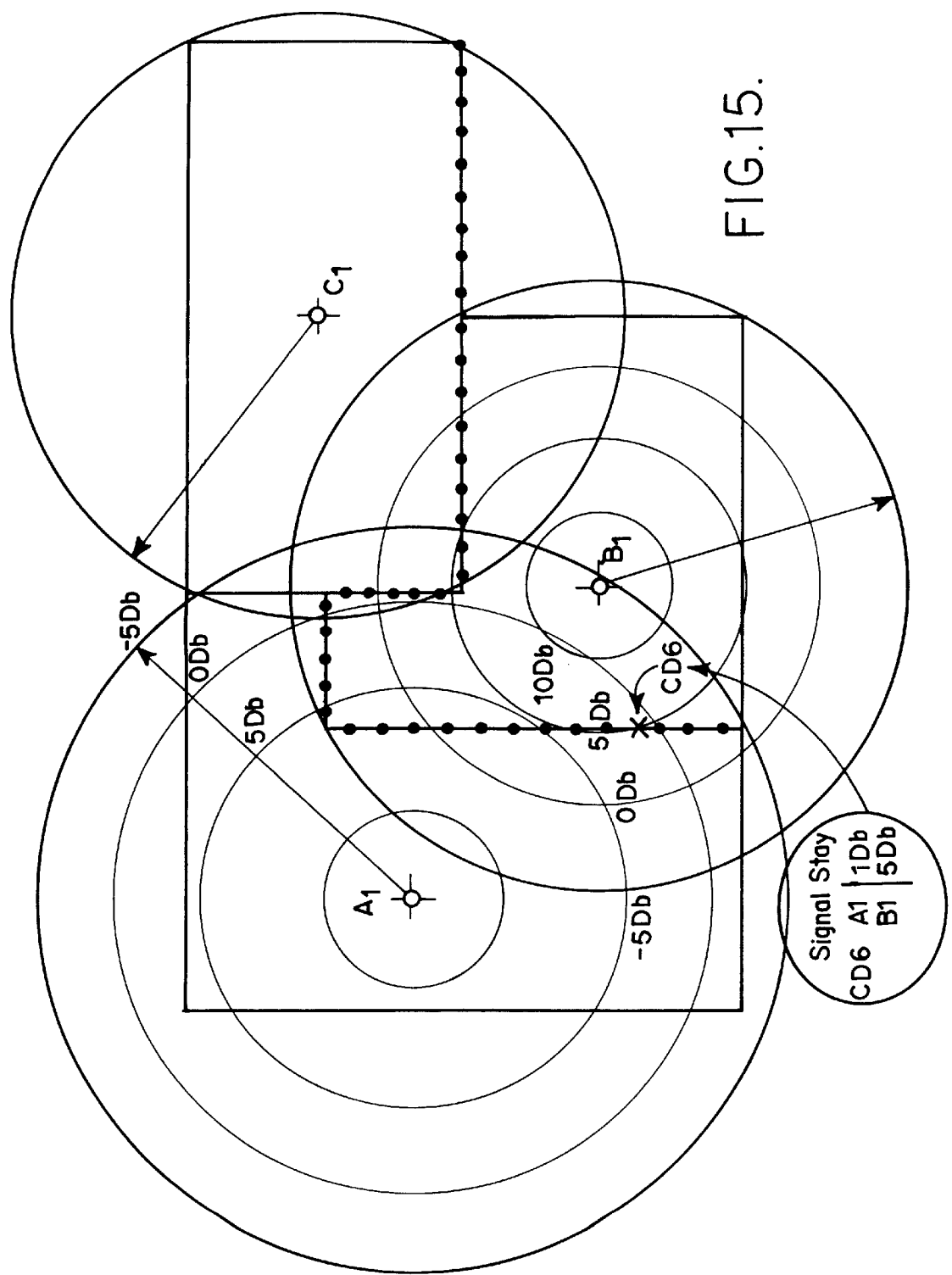
FIG. 15 illustrates the solution to overlapping boundary problems achieved by the present invention.

FIG. 15 shows the same territory depicted in FIG. 3 which in the prior art had many cells and many border overlap issues, which resulted, in prior art systems, in the service providers adding smaller cell sites to break up the coverage into smaller sells. FIG. 15 shows what can be done with the inventive system to reduce the number of cell sites. By having fewer cells, they will have to be of higher power which allows for better signal strength out at the borders. By using the inventive system to manage the Communication Process, the correct system will handle communication processes even under conditions of overlapping coverage into a neighbor's territory. To illustrate this, the signal values are shown in FIGS. 3 and 15 for cell site coverage of cell sites A1 and B1. In the prior art system (FIG. 3), each service provider will adjust its cell site to give some predetermined signal strength at the border. As an example, this value is shown as −5 dB. This value will be as close to the border as possible to invoke a hand-off to the neighboring service provider (Note, communication device CD5 is at signal strength levels, A1=−2 dB, B1=−5 dB). However, the weaker the signal, the poorer the service such as terminated communication processes. However, if a contrast is made with the signal strengths in the inventive system, it will be found that higher values at the borders can be maintained which results in better service. For example, communication device CD6 signal strength A1=1 dB, B1=5 dB. Since most borders are straight lines and wireless communication sometimes propagates in a radial fashion, prior art service providers cannot simply increase the cell site's power to provide higher signal strength values at the borders. Therefore, if a provider sets a cell site to hand off at a certain value, it will hand-off wherever the signal strength decreases to that level, which may be a radial curve, which most times may not follow the geographic service boundaries. Therefore, as can be seen from the figures, if the provider were to increase the signal strength in an area, it may result in more overlap. This overlap is not a problem with the inventive system since the service boundaries are mapped to the exact geographic location (EGL) of the communications device (CD).

Figure 16:
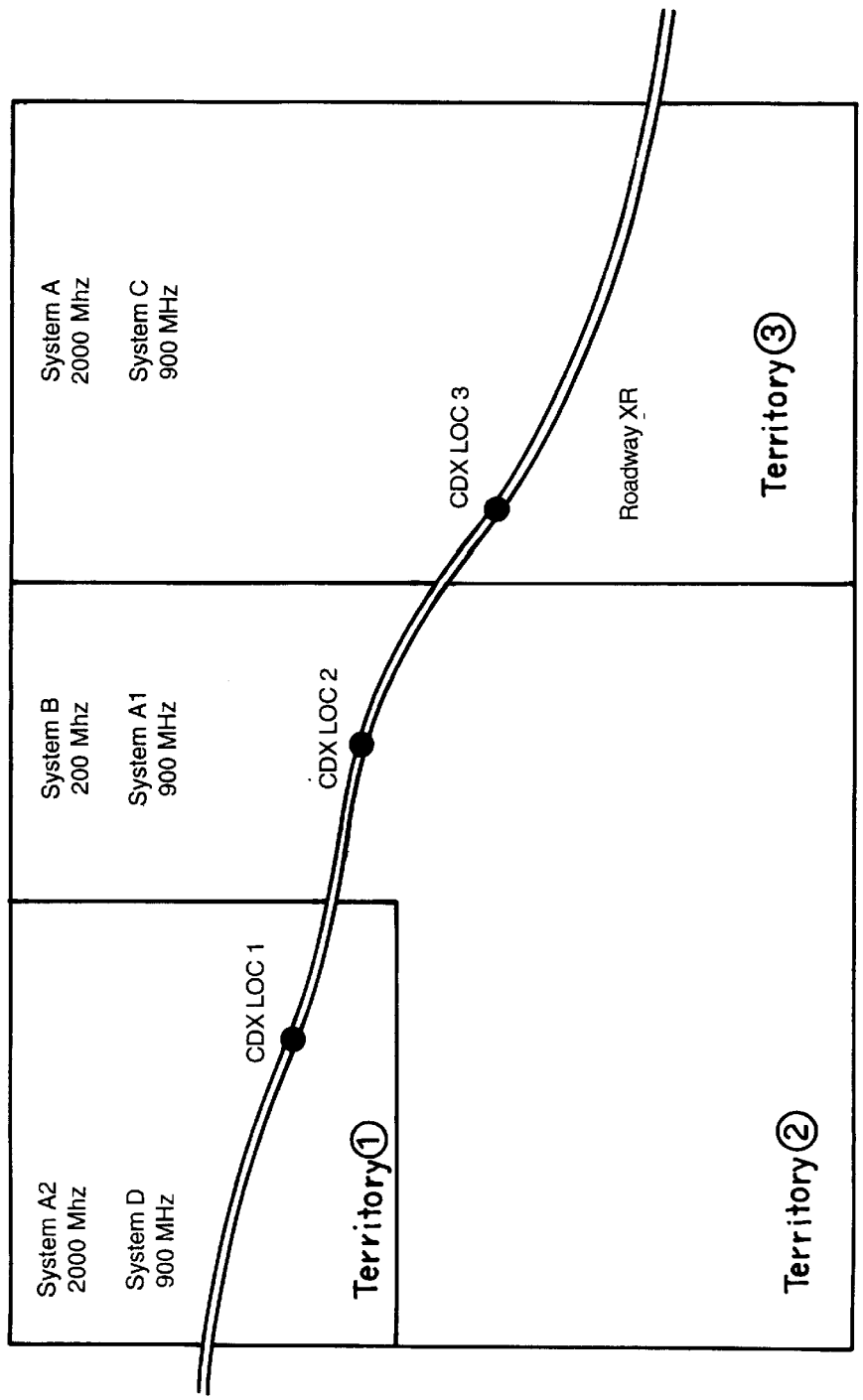
FIG. 16 illustrates how frequency of a communication process can be changed using the system of the present invention during a communication process and without the unit being aware that the frequency is being changed.

An example of another advantage realized with the present system is that all communication processes may be processed through the tax data base, but the wireless communication system may have a select group of subscribers that are identified to pay a certain billing rate in a specified geographic area which would constitute an additional loop through another look-up table. For example, as indicated in FIG. 16, company A has negotiated for an attractive airtime rate within its plant's boundaries. This plant also resides in school district B which has assessed it own tax. The company employees will therefore enjoy the attractive rates while inside the plant and must pay the school tax on those communication processes. But if those employees go beyond the plant, they will lose the lower rate. For instance, communication device CD8 may have a low pre-negotiated rate, but pay school district B and state P taxes. Communication device CD9 pays the school district B and state P taxes, and communication device CD10 pays only the state tax. Billing is continuously updated no matter where the communication process originated as the mobile unit moves.

Still another application for the technology of this invention could encompass the switching of a dual frequency phone to a second frequency based on exact geographic location (EGL) of the communication device (CD). An example of this would be switching from 800–900 MHz to 2 GHz frequencies used in the upcoming PCS system. This would be useful for the commuter who wants PCS for his Communications Device (CD) in the city and to be able to roam out of PCS territory into cellular territory. It may even come to the time when subscribers are given rate plans that correspond to different zones, such as a 2000 foot perimeter of their residence which would be billed at a residence rate, and be billed at a Home market rate beyond that. Still further, when the subscriber enters into the geographic zone of his or her employer, the MTSO will forward his business communication processes to his communication device (CD), all based on his present exact geographic location. This could be an important competitive advantage to a service provider that owned the 900 MHz in one area and the 2000 MHz rights in a second area. For example, FIG. 16 shows service provider A, which owns the license to 2000 MHz in territory 1, the 900 MHz license in territory 2 and the 2000 MHz license in territory 3. When mobile unit CDX travels on roadway XR, it will pass through all through all three territories. The service provider would like to handle all the billing revenue for its subscribers travelling through territory 2, but does not have the 2000 MHz license in that area. The communication device CDX is therefore instructed to retune to 900 MHz in territory 2 because System A does have rights to communication processes in territory 2 at the 900 MHz frequency. This allows System A to by pass System B even though the System B is a 2000 Mhz service provider adjacent to two System A territories.

The preferred means for establishing exact geographic location (EGL) is a satellite communication system such as discussed in the incorporated material. However, other means, including, but not limited to, triangulation and the like, can be used without departing from the scope of the present invention.

It is understood that while certain forms of the present invention have been illustrated and described herein, it is not to be limited to the specific forms or arrangements of parts described and shown.

What is claimed is:

1. A wireless over-the-air communications system that includes a plurality of CMR (cellular mobile radio) systems, one or more cell sites shared by the CMR systems, an MTSO in at least one of said plurality of CMR systems, locating means in the cellular communications system for determining the exact geographic location of a mobile unit involved in a call and for providing a position signal of said exact geographic location, means in the MTSO for recognizing the position signal and using that position signal to establish the exact geographic location of the mobile unit involved in the call, and data means in the MTSO responsive to the locating means for directing a communication process to a specific CMR system based on the exact geographic location of the mobile unit regardless of a location of a cell site handling the call, said data means including tables containing positional data for service boundaries associated with each CMR system and means for comparing the exact geographic location of said mobile unit to the tables and automatically selecting a specific CMR system to handle the communication process and bill said mobile unit for services provided by said specific CMR system based on said exact geographic location of the mobile unit regardless of which cell site handled the communications process and without further input from a user of the mobile unit.

2. The wireless over-the-air communications system defined in claim 1 wherein said data means includes means for generating a communication process record for each communication process.

3. The wireless over-the-air communications system defined in claim 1 wherein said data means includes means for redirecting a communication process to a second service provider.

4. The wireless over-the-air communications system defined in claim 1 wherein said data means further includes means for redirecting a communication process to another cellular system.

5. The wireless over-the-air communications system defined in claim 1 wherein said data means further includes means for altering the frequency of a communication process during the communication process.

6. The communication system defined in claim 1 wherein said locating means includes a satellite communication system for establishing an exact geographic location of said mobile unit.

7. The wireless over-the-air communications system defined in claim 1 wherein the cell sites include at least one wireless system communications satellite.

8. The wireless over-the-air communications system defined in claim 1 further including means for updating the location of the mobile unit at selected intervals.

9. A method of making communication process management decisions in a wireless over-the-air communications system having a plurality of service providers and an MTSO comprising:
   A) establishing an exact geographic location for a mobile unit;
   B) establishing override criteria from a group consisting of billing, taxing, CP (communications process) rating, service requested by a user of a mobile unit and CMR (cellular mobile radio) system; and
   C) directing the communication process to a specific service provider associated with the service requested by the user of the mobile unit based on the override criteria without further input from the user of the mobile unit.

10. The method defined in claim 9 further including a step of changing cell sites which handle the communication process from among cell sites owned by two different wireless over-the-air communications systems.

11. The method defined in claim 9 wherein the cell sites include at least one wireless system communications satellite.

12. The method defined in claim 9 further including a step of updating the exact geographic location of the mobile unit at selected intervals.

13. The method defined in claim 12 further including a step of updating the exact geographic location of the mobile unit at selected intervals.

14. A method of making communication process management decisions in two wireless over-the-air communications systems comprising:
   A) establishing an exact geographic location for a mobile unit;
   B) matching the geographic location of the mobile unit to service boundary information for each communications system, and selecting one of the communications systems based on such matching;
   C) using the selected communication system to handle communication processes associated with the mobile unit;
   D) using the geographic location of the mobile unit for billing;
   E) directing the billing to the selected wireless over-the-air communications system; and
   F) continuously updating the geographic location of the mobile unit during the communication process whereby each of the communications systems will bill for any portion of the communication process carried out in its territory regardless of where the communication process originated.

15. The method defined in claim 14 further including a step of using a satellite to determine the exact geographic location of the mobile unit.

16. The method defined in claim 14 wherein the cell sites include at least one wireless system communications satellite.

17. A method of making communication process management decisions in two wireless over-the-air communications systems service providers each of which has a plurality of cell sites at various locations and a service boundary, comprising:
   A) locating at least one cell site from one of the wireless over-the-air communications systems service providers in the geographic area of the service boundary of the other wireless over-the-air communications system service provider;
   B) establishing an exact geographic location for a mobile unit involved in a call;
   C) matching the geographic location of the mobile unit to service boundary information, and selecting a cell site based on such matching regardless of the ownership of the selected cell site;
   D) using the selected cell site to handle communication processes associated with the mobile unit;
   E) using the geographic location of the mobile unit for billing;
   F) directing the billing of the call to the wireless over-the-air communications system service provider which the service boundary matching has indicated is the provider for the call; and
   G) continuously updating the geographic location of the mobile unit during the communication process whereby each of the wireless over-the-air communications systems service providers will bill for any portion of the communication process carried out within its service boundaries regardless of where the communication process originated.

18. The method defined in claim 17 further including a step of using a satellite to determine the exact geographic location of the mobile unit.

19. The method defined in claim 17 wherein the cell sites include at least one wireless system communications satellite.

20. The method defined in claim 17 further including a step of updating the exact geographic location of the mobile unit at selected intervals.

21. A method of making communication process management decisions in two wireless over-the-air communications systems service providers each having a plurality of cell sites each of which has service boundary information associated therewith comprising:
   A) establishing at least one shared cell site;
   B) sharing the cell site by both of the wireless over-the-air communications systems service providers;
   C) establishing an exact geographic location for a mobile unit;

D) matching the geographic location of the mobile unit to service boundary information, and selecting a cell site based on such matching;

E) using the selected cell site to handle communication processes associated with the mobile unit regardless of which service provider owns the selected cell site;

F) using the geographic location of the mobile unit for billing regardless of which cell site was selected to handle the call;

G) directing the billing to the wireless over-the-air communications system authorized to handle communication processes in the particular geographic location of the mobile unit; and H) continuously updating the geographic location of the mobile unit during the communication process whereby each of the wireless over-the-air communications systems service providers will bill for any portion of the communication process carried out in its territory regardless of where the communication process originated even if the shared cell site is used.

22. The method defined in claim 21 wherein the cell sites include at least one wireless system communications satellite.

23. The method defined in claim 21 further including a step of updating the exact geographic location of the mobile unit at selected intervals.

24. A method of making communication process management decisions in two neighboring wireless over-the-air communications systems each having its own cell sites, comprising:

A) maintaining signal strength in cell sites at borders between two neighboring wireless over-the-air communications systems at a maximum level;

B) establishing an exact geographic location for a mobile unit;

C) matching the geographic location of the mobile unit to a wireless over-the-air communication system, and selecting a service provider based on such location matching; and D) using the selected service provider to handle communication processes associated with the mobile unit and automatically completing a call made by the mobile unit.

25. The method defined in claim 24 further including a step of using a satellite to determine the exact geographic location of the mobile unit.

26. The method defined in claim 24 wherein the cell sites include at least one wireless system communications satellite.

27. The method defined in claim 24 further including a step of updating the exact geographic location of the mobile unit at selected intervals.

28. A wireless over-the-air communications system that includes a plurality of CMR (cellular mobile radio) systems, one or more cell sites shared by the CMR systems, an MTSO in at least one of said plurality of CMR systems and a locating means for determining the exact geographic location of a mobile unit and for providing a position signal of the exact geographic location, and means responsive to said position signal to establish the exact geographic location of the mobile unit comprising:

geographic location data stored in the communications system MTSO;

means in the communications system MTSO for matching the exact geographic location of the mobile unit to said location data stored in the communications system MTSO;

means in the communications system MTSO for making call management decisions based on the matching of the exact geographic location of the mobile unit to the location data, said call management decisions being selected from the group consisting of billing rates, taxes, CP (communications process) rating, customer service requested, call routing, and CMR system selection and automatically setting one or more parameters selected from the group consisting of billing rates, taxes, CP rating, call routing and CMR system selection associated with the mobile unit based on the management decisions made in the MTSO and completing and maintaining the call based solely on said management decisions made in the MTSO regardless of the location of a cell site handling the call and without input from a user of the mobile unit.

29. The wireless over-the-air communications system defined in claim 28 wherein the means for making call management decisions includes means for updating billing information as the mobile unit moves during a communication process.

30. The wireless over-the-air communications system defined in claim 28 wherein the MTSO further includes means for changing the service provider during the communication process.

31. The improvement defined in claim 28 wherein said locating means includes a satellite communication system for establishing an exact geographic location of said mobile unit.

32. The improvement defined in claim 28 wherein the cell sites include at least one wireless system communications satellite.

33. The improvement defined in claim 27 further including means for updating the location of the mobile unit at selected intervals.

34. The wireless over-the-air communications system defined in claim 28 further including means for updating the location of the mobile unit at selected intervals.

35. The wireless over-the-air communications system defined in claim 28 in which said call management decision made by the means in the communications system are made exclusive of signal strength and hand-offs are made regardless of signal strength.

36. The wireless over-the-air communications system defined in claim 28 wherein said service provider includes a second wireless communications system.

37. The wireless over-the-air communications system defined in claim 28 wherein the billing rates include special rate plans specific to the mobile unit making the call.

38. A method of communicating using a wireless over-the-air communications system comprising:

A) establishing an exact geographic location for a mobile unit making a call;

B) communicating the geographic location to a call management control center in the communications system;

C) storing geographic location data in the control center;

D) matching the exact geographic location of the mobile unit to the geographic location data;

E) making call management decisions for the mobile unit based on the matching of the exact geographic location of the mobile unit to the geographic data, said call management decisions being selected from the group consisting of billing rates, taxes, CP (communications process) rating, call routing, customer service requested and CMR system selection used for the call being made by the mobile unit; and D) automatically selecting one or more parameters selected from the group consisting of billing rates, taxes, call routing, CMR system selection and CP (communications process) rating associated with the call being made by the mobile unit based on said call management decisions to complete or maintain the call based solely on the call management decisions made in the MTSO regardless of the location of a cell site handling the call and without input from a user of the mobile unit.

39. The wireless over-the-air communications system defined in claim 28 wherein said service provider includes an emergency service provider.

40. The method defined in claim 38 wherein the billing rates include special rate plans specific to the mobile unit making the call.

41. The method defined in claim 38 further including a step of recording post communication information.

* * * * *

(12) EX PARTE REEXAMINATION CERTIFICATE (7858th)
United States Patent
Dennison et al.

(10) Number: US 6,324,404 C1
(45) Certificate Issued: *Nov. 9, 2010

(54) CELLULAR TELEPHONE SYSTEM THAT USES POSITION OF A MOBILE UNIT TO MAKE CALL MANAGEMENT DECISIONS

(75) Inventors: Everett Dennison, Canfield, OH (US); Timothy J. Duffy, West Middlesex, PA (US); Gregory T Pauley, Canfield, OH (US); Scott L. Jones, Sharon, PA (US); Albert H. Pharis, Jr., Canfield, OH (US); Warren P. Williamson, IV, Loveland, OH (US)

(73) Assignee: EMSAT Advanced Geo-Location Technology, LLC, Loveland, OH (US)

Reexamination Request:
No. 90/010,476, Apr. 6, 2009

Reexamination Certificate for:
Patent No.: 6,324,404
Issued: Nov. 27, 2001
Appl. No.: 08/848,082
Filed: Mar. 21, 1996

( * ) Notice: This patent is subject to a terminal disclaimer.

Related U.S. Application Data

(63) Continuation-in-part of application No. 08/813,494, filed on Mar. 7, 1997, now Pat. No. 6,006,106, which is a continuation-in-part of application No. 08/555,884, filed on Oct. 23, 1995, now Pat. No. 5,546,445, which is a continuation-in-part of application No. 08/402,976, filed on Mar. 13, 1995, which is a continuation of application No. 08/057,833, filed on May 7, 1993, which is a continuation of application No. 07/813,494, filed on Dec. 26, 1991, now Pat. No. 5,235,633.

(51) Int. Cl.
*H04Q 7/22* (2006.01)
*H04Q 7/38* (2006.01)
*H04B 7/185* (2006.01)

(52) U.S. Cl. .................. 455/456.1; 455/406; 455/432.1
(58) Field of Classification Search ........................ None
See application file for complete search history.

(56) References Cited

U.S. PATENT DOCUMENTS

| 1,595,183 A | 8/1926 | Friess |
| 2,070,112 A | 2/1937 | Bowles |
| 2,348,393 A | 5/1944 | Krieger |
| 3,142,227 A | 7/1964 | Stringer |
| 3,199,108 A | 8/1965 | Munk |

(Continued)

FOREIGN PATENT DOCUMENTS

| AU | 0033784 A5 | 4/1994 |
| DE | 4321416 A1 | 1/1995 |
| DE | 19544158 A1 | 5/1997 |
| EP | 0219859 A2 | 4/1987 |
| EP | 0242099 A2 | 10/1987 |

(Continued)

OTHER PUBLICATIONS

First Amended Complaint for Patent Infringement, *EMSAT Advanced Geo–Location Technology, LLC and Location Based Services LLC v. Alltel Communications LLC*, Case No. 4:08CV00821 (N.D. Ohio), filed Jun. 5, 2008, 9 pages.

(Continued)

*Primary Examiner*—Charles Craver

(57) ABSTRACT

A cellular telephone system has call managment decisions made based on the exact geographic location of the mobile unit. These call management decisions include billing and taxing decisions, cell site selection, frequency selection and even cellular system selection. The decisions are continuously updated during a call whereby decisions can be made and changed regardless of where a call originated. Cell site location, and even cellular system selection, can be made in a specific manner to best serve the needs of the mobile user, the cellular system as well as the public. It is even possible for a cellular system to locate one or more of its cell sites in the geographic area served by another cellular system. In some cases, cellular systems might even share cell sites.

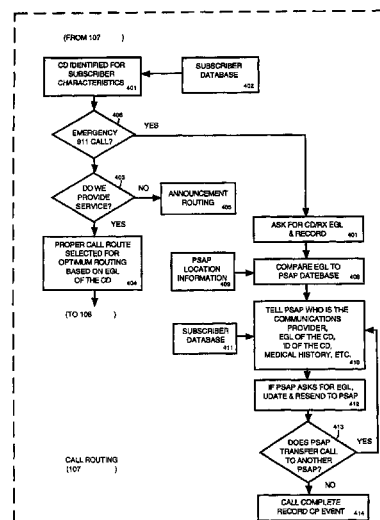

U.S. PATENT DOCUMENTS

| | | |
|---|---|---|
| 3,266,042 A | 8/1966 | Mahoney et al. |
| 3,317,698 A | 5/1967 | Mansfield |
| 3,568,161 A | 3/1971 | Knickel |
| 3,581,208 A | 5/1971 | Buehrle et al. |
| 3,646,580 A | 2/1972 | Fuller et al. |
| 3,662,267 A | 5/1972 | Reed |
| 3,666,901 A | 5/1972 | Weinhart |
| 3,723,876 A | 3/1973 | Seaborn, Jr. |
| 3,824,469 A | 7/1974 | Ristenbatt |
| 3,845,389 A | 10/1974 | Phillips et al. |
| 3,881,060 A | 4/1975 | Connell et al. |
| 3,889,190 A | 6/1975 | Palmer |
| 3,947,807 A | 3/1976 | Tyler et al. |
| 3,977,003 A | 8/1976 | Kershaw |
| 4,032,844 A | 6/1977 | Imazeki |
| 4,057,794 A | 11/1977 | Grossfield |
| 4,083,003 A | 4/1978 | Haemmig |
| 4,144,411 A | 3/1979 | Frenkiel |
| 4,161,734 A | 7/1979 | Anderson |
| 4,176,254 A | 11/1979 | Tuttle et al. |
| 4,177,456 A | 12/1979 | Fukinuki et al. |
| 4,177,466 A | 12/1979 | Reagan |
| 4,198,601 A | 4/1980 | Ono et al. |
| 4,209,787 A | 6/1980 | Freeny, Jr. |
| 4,217,588 A | 8/1980 | Freeny, Jr. |
| 4,220,946 A | 9/1980 | Henriot |
| 4,226,620 A | 10/1980 | Rothwarf et al. |
| 4,229,620 A | 10/1980 | Schaible |
| 4,232,317 A | 11/1980 | Freeny, Jr. |
| 4,232,390 A | 11/1980 | McEvilly, Jr. |
| 4,232,391 A | 11/1980 | Zanutti |
| 4,233,473 A | 11/1980 | Frost |
| 4,297,672 A | 10/1981 | Fruchey et al. |
| 4,310,726 A | 1/1982 | Asmuth |
| 4,313,035 A | 1/1982 | Jordan et al. |
| 4,325,057 A | 4/1982 | Bishop |
| 4,350,969 A | 9/1982 | Greer |
| 4,357,711 A | 11/1982 | Drefko et al. |
| 4,359,733 A | 11/1982 | O'Neill |
| 4,394,552 A | 7/1983 | Schlosser |
| 4,435,711 A | 3/1984 | Ho et al. |
| 4,455,551 A | 6/1984 | Lemelson |
| 4,468,656 A | 8/1984 | Clifford et al. |
| 4,475,010 A | 10/1984 | Huensch et al. |
| 4,494,119 A | 1/1985 | Wimbush |
| 4,517,410 A | 5/1985 | Williams et al. |
| 4,520,576 A | 6/1985 | Vander et al. |
| 4,524,461 A | 6/1985 | Kostanty et al. |
| 4,534,056 A | 8/1985 | Feilchenfeld et al. |
| 4,545,071 A | 10/1985 | Freeburg |
| 4,547,778 A | 10/1985 | Hinkle et al. |
| 4,560,978 A | 12/1985 | Lemelson et asl. |
| 4,589,132 A | 5/1986 | Botbol et al. |
| 4,590,569 A | 5/1986 | Rogoff et al. |
| 4,596,988 A | 6/1986 | Wanka |
| 4,606,073 A | 8/1986 | Moore |
| 4,607,395 A | 8/1986 | Sundahl |
| 4,622,557 A | 11/1986 | Westerfield |
| 4,651,156 A | 3/1987 | Martinez |
| 4,651,157 A | 3/1987 | Gray et al. |
| 4,652,884 A | 3/1987 | Starker |
| 4,653,100 A | 3/1987 | Barnett et al. |
| 4,656,656 A | 4/1987 | Mundy, Jr. et al. |
| 4,670,899 A | 6/1987 | Brody et al. |
| 4,680,787 A | 7/1987 | Marry |
| 4,689,626 A | 8/1987 | Hori et al. |
| 4,700,374 A | 10/1987 | Bini |
| 4,701,760 A | 10/1987 | Raoux |
| 4,713,661 A | 12/1987 | Boone et al. |
| 4,713,761 A | 12/1987 | Sharpe et al. |
| 4,724,538 A | 2/1988 | Farrell |
| 4,728,959 A | 3/1988 | Maloney et al. |
| 4,739,328 A | 4/1988 | Koelle et al. |
| 4,748,685 A | 5/1988 | Rozanskiet al. |
| 4,754,465 A | 6/1988 | Trimble |
| 4,774,664 A | 9/1988 | Campbell et al. |
| 4,788,711 A | 11/1988 | Nasco, Jr. |
| 4,791,571 A | 12/1988 | Takahashi et al. |
| 4,791,572 A | 12/1988 | Green, III et al. |
| 4,792,968 A | 12/1988 | Katz |
| 4,799,062 A | 1/1989 | Sanderford, Jr. et al. |
| 4,804,937 A | 2/1989 | Barbiaux et al. |
| 4,812,852 A | 3/1989 | Bent et al. |
| 4,814,711 A | 3/1989 | Olsen et al. |
| 4,818,998 A | 4/1989 | Apsell et al. |
| 4,819,053 A | 4/1989 | Halavais |
| 4,825,457 A | 4/1989 | Lebowitz |
| 4,831,438 A | 5/1989 | Bellman et al. |
| 4,831,539 A | 5/1989 | Hagenbuch |
| 4,833,477 A | 5/1989 | Tendler |
| 4,833,726 A | 5/1989 | Shinoda et al. |
| 4,839,656 A | 6/1989 | O'Neill |
| 4,845,739 A | 7/1989 | Katz |
| 4,856,048 A | 8/1989 | Yamamoto et al. |
| 4,876,659 A | 10/1989 | Devereux et al. |
| 4,876,738 A | 10/1989 | Selby |
| 4,888,593 A | 12/1989 | Friedman et al. |
| 4,891,650 A | 1/1990 | Sheffer |
| 4,891,761 A | 1/1990 | Gray et al. |
| 4,893,325 A | 1/1990 | Pankonen et al. |
| 4,894,649 A | 1/1990 | Davis |
| 4,897,642 A | 1/1990 | DiLullo et al. |
| 4,901,307 A | 2/1990 | Gilhousen et al. |
| 4,903,262 A | 2/1990 | Dissosway et al. |
| 4,905,289 A | 2/1990 | Micic et al. |
| 4,906,826 A | 3/1990 | Spencer |
| 4,907,290 A | 3/1990 | Crompton |
| 4,908,629 A | 3/1990 | Apsell et al. |
| 4,914,587 A | 4/1990 | Clouse |
| 4,914,651 A | 4/1990 | Lusignan |
| 4,924,491 A | 5/1990 | Compton et al. |
| 4,926,256 A | 5/1990 | Nanba |
| 4,928,107 A | 5/1990 | Kuroda et al. |
| 4,931,950 A | 6/1990 | Isle et al. |
| 4,939,522 A | 7/1990 | Newstead et al. |
| 4,958,368 A | 9/1990 | Parker |
| 4,965,850 A | 10/1990 | Schloemer |
| 4,972,456 A | 11/1990 | Kaczmarek et al. |
| 4,974,250 A | 11/1990 | Tomiyori |
| 4,977,399 A | 12/1990 | Price et al. |
| 5,003,317 A | 3/1991 | Gray et al. |
| 5,007,084 A | 4/1991 | Materna et al. |
| 5,014,298 A | 5/1991 | Katz |
| 5,016,269 A | 5/1991 | Rogers |
| 5,017,926 A | 5/1991 | Ames et al. |
| 5,019,828 A | 5/1991 | Schoolman |
| 5,020,090 A | 5/1991 | Morris |
| 5,027,352 A | 6/1991 | Goode |
| 5,027,409 A | 6/1991 | Sakamoto |
| 5,034,993 A | 7/1991 | Sasuta |
| 5,043,197 A | 8/1991 | Renalls |
| 5,043,736 A | 8/1991 | Darnell et al. |
| 5,043,738 A | 8/1991 | Shapiro |
| 5,047,953 A | 9/1991 | Smallwood et al. |
| 5,054,110 A | 10/1991 | Comroe et al. |
| 5,055,851 A | 10/1991 | Sheffer |
| 5,056,109 A | 10/1991 | Gilhousen et al. |
| 5,058,151 A | 10/1991 | Tanaka et al. |
| 5,058,201 A | 10/1991 | Ishii et al. |
| 5,068,656 A | 11/1991 | Sutherland |
| 5,073,929 A | 12/1991 | Katz |

| | | | | | | |
|---|---|---|---|---|---|---|
| 5,074,317 A | 12/1991 | Bondell et al. | | 5,355,140 A | 10/1994 | Slavin et al. |
| 5,081,667 A | 1/1992 | Drori et al. | | 5,359,645 A | 10/1994 | Katz |
| 5,081,703 A | 1/1992 | Lee | | 5,361,399 A | 11/1994 | Linquist et al. |
| 5,086,391 A | 2/1992 | Chambers | | 5,365,450 A | 11/1994 | Schuchman et al. |
| 5,086,452 A | 2/1992 | Ito et al. | | 5,365,451 A | 11/1994 | Wang et al. |
| 5,091,950 A | 2/1992 | Ahmed | | 5,365,516 A | 11/1994 | Jandrell |
| 5,093,925 A | 3/1992 | Chanroo | | 5,375,059 A | 12/1994 | Kyrtsos et al. |
| 5,095,509 A | 3/1992 | Volk | | 5,375,140 A | 12/1994 | Bustamante et al. |
| 5,097,429 A | 3/1992 | Wood | | 5,377,256 A | 12/1994 | Franklin et al. |
| 5,105,179 A | 4/1992 | Smith | | 5,379,337 A | 1/1995 | Castillo et al. |
| 5,109,399 A | 4/1992 | Thompson | | 5,382,958 A | 1/1995 | Fitzgerald |
| 5,109,401 A | 4/1992 | Hattori et al. | | 5,388,147 A | 2/1995 | Grimes |
| 5,109,405 A | 4/1992 | Morganstein | | 5,389,935 A | 2/1995 | Drouault et al. |
| 5,111,209 A | 5/1992 | Toriyama | | 5,390,124 A | 2/1995 | Kyrtsos |
| 5,113,481 A | 5/1992 | Smallwood et al. | | 5,390,125 A | 2/1995 | Sennott et al. |
| 5,119,504 A | 6/1992 | Durboraw, III | | 5,390,339 A | 2/1995 | Bruckert et al. |
| 5,119,505 A | 6/1992 | Tisseront et al. | | 5,392,287 A | 2/1995 | Tiedemann, Jr. et al. |
| 5,122,959 A | 6/1992 | Nathanson et al. | | 5,396,540 A | 3/1995 | Gooch |
| 5,142,700 A | 8/1992 | Reed | | 5,396,647 A | 3/1995 | Thompson |
| 5,144,323 A | 9/1992 | Yonkers | | 5,398,190 A | 3/1995 | Wortham |
| 5,148,002 A | 9/1992 | Kuo et al. | | 5,400,020 A | 3/1995 | Jones |
| 5,148,452 A | 9/1992 | Kennedy et al. | | 5,404,577 A | 4/1995 | Zuckerman et al. |
| 5,155,689 A | 10/1992 | Wortham | | 5,408,683 A | 4/1995 | Ablay et al. |
| 5,160,935 A | 11/1992 | Inamiya | | 5,410,728 A | 4/1995 | Bertiger et al. |
| 5,161,180 A | 11/1992 | Chavous | | 5,410,749 A | 4/1995 | Siwiak et al. |
| 5,168,451 A | 12/1992 | Bolger | | 5,414,432 A | 5/1995 | Penny et al. |
| 5,170,490 A | 12/1992 | Cannon et al. | | 5,414,756 A | 5/1995 | Levine |
| 5,173,935 A | 12/1992 | Meschi | | 5,416,706 A | 5/1995 | Hagenbuch |
| 5,187,805 A | 2/1993 | Bertiger et al. | | 5,418,537 A | 5/1995 | Bird |
| 5,193,215 A | 3/1993 | Olmer | | 5,422,816 A | 6/1995 | Sprague et al. |
| 5,198,831 A | 3/1993 | Burrell et al. | | 5,428,546 A | 6/1995 | Shah et al. |
| 5,202,829 A | 4/1993 | Geier | | 5,430,656 A | 7/1995 | Dekel et al. |
| 5,214,789 A | 5/1993 | George | | 5,432,841 A | 7/1995 | Rimer |
| 5,218,716 A | 6/1993 | Comroe et al. | | 5,434,904 A | 7/1995 | Tsuzuki et al. |
| 5,220,593 A | 6/1993 | Zicker et al. | | 5,438,517 A | 8/1995 | Sennott et al. |
| 5,222,249 A | 6/1993 | Carney | | 5,452,211 A | 9/1995 | Kyrtsos et al. |
| 5,223,844 A | 6/1993 | Mansell et al. | | 5,465,289 A | 11/1995 | Kennedy, Jr. et al. |
| 5,223,884 A | 6/1993 | Katoh et al. | | 5,465,388 A | 11/1995 | Zicker |
| 5,224,153 A | 6/1993 | Katz | | 5,479,482 A | 12/1995 | Grimes |
| 5,225,842 A | 7/1993 | Brown et al. | | 5,483,664 A | 1/1996 | Moritz et al. |
| 5,225,843 A | 7/1993 | Thompson | | 5,495,416 A | 2/1996 | Buchwitz et al. |
| 5,227,802 A | 7/1993 | Pullman et al. | | 5,504,491 A | 4/1996 | Chapman |
| 5,235,633 A | 8/1993 | Dennison et al. | | 5,515,043 A | 5/1996 | Berard et al. |
| 5,239,669 A | 8/1993 | Mason | | 5,519,403 A | 5/1996 | Bickley et al. |
| 5,249,223 A | 9/1993 | Vanacore | | 5,519,760 A | 5/1996 | Borkowski et al. |
| 5,260,968 A | 11/1993 | Gardner et al. | | 5,543,789 A | 8/1996 | Behr |
| 5,266,958 A | 11/1993 | Durboraw et al. | | 5,546,445 A | 8/1996 | Dennison et al. |
| 5,271,484 A | 12/1993 | Bahjat et al. | | 5,548,801 A | 8/1996 | Araki et al. |
| 5,272,748 A | 12/1993 | Davis | | 5,551,058 A | 8/1996 | Hutcheson et al. |
| 5,278,892 A | 1/1994 | Bolliger et al. | | 5,552,993 A | 9/1996 | Buchwitz et al. |
| 5,299,132 A | 3/1994 | Wortham | | 5,553,125 A | 9/1996 | Martensson |
| 5,303,297 A | 4/1994 | Hillis | | 5,555,286 A | 9/1996 | Tendler |
| 5,307,400 A | 4/1994 | Sawyer et al. | | 5,557,254 A | 9/1996 | Johnson et al. |
| 5,309,474 A | 5/1994 | Gilhousen et al. | | 5,559,864 A | 9/1996 | Kennedy et al. |
| 5,309,546 A | 5/1994 | Baker et al. | | 5,561,704 A | 10/1996 | Salimando |
| 5,311,197 A | 5/1994 | Sorden et al. | | 5,561,840 A | 10/1996 | Alvesalo et al. |
| 5,311,434 A | 5/1994 | Tamai | | 5,568,119 A | 10/1996 | Schipper et al. |
| 5,315,636 A | 5/1994 | Patel | | 5,568,153 A | 10/1996 | Beliveau |
| 5,317,323 A | 5/1994 | Kennedy et al. | | 5,570,412 A | 10/1996 | LeBlanc |
| 5,319,374 A | 6/1994 | Desai et al. | | 5,572,204 A | 11/1996 | Timm et al. |
| 5,321,514 A | 6/1994 | Martinez | | 5,579,535 A | 11/1996 | Orlen et al. |
| 5,323,444 A | 6/1994 | Ertz et al. | | 5,583,914 A | 12/1996 | Chang et al. |
| 5,327,144 A | 7/1994 | Stilp et al. | | 5,587,715 A | 12/1996 | Lewis |
| 5,334,974 A | 8/1994 | Simms et al. | | 5,594,425 A | 1/1997 | Ladner et al. |
| 5,335,278 A | 8/1994 | Matchett | | 5,594,453 A | 1/1997 | Rodal et al. |
| 5,343,393 A | 8/1994 | Hirano et al. | | 5,596,625 A | 1/1997 | LeBlanc |
| 5,343,493 A | 8/1994 | Karimullah | | 5,598,460 A | 1/1997 | Tendler |
| 5,343,512 A | 8/1994 | Wang et al. | | 5,602,901 A | 2/1997 | Redden et al. |
| 5,345,244 A | 9/1994 | Gildea et al. | | 5,602,903 A | 2/1997 | LeBlanc et al. |
| 5,347,286 A | 9/1994 | Babitch et al. | | 5,604,765 A | 2/1997 | Bruno et al. |
| 5,351,302 A | 9/1994 | Leighton | | 5,604,790 A | 2/1997 | Grimes |

| | | | | | | |
|---|---|---|---|---|---|---|
| 5,604,794 | A | 2/1997 | Vogel et al. | 5,983,108 A | 11/1999 | Kennedy, III et al. |
| 5,625,668 | A | 4/1997 | Loomis et al. | 5,999,808 A | 12/1999 | LaDue |
| 5,629,693 | A | 5/1997 | Janky | 6,006,106 A | 12/1999 | Cook |
| 5,630,206 | A | 5/1997 | Urban et al. | 6,009,330 A | 12/1999 | Kennedy, III |
| 5,640,146 | A | 6/1997 | Campana, Jr. et al. | 6,018,652 A | 1/2000 | Frager et al. |
| 5,646,632 | A | 7/1997 | Khan et al. | 6,038,437 A | 3/2000 | Zicker |
| 5,648,770 | A | 7/1997 | Ross | 6,049,711 A | 4/2000 | Ben-Yehezkel et al. |
| 5,649,059 | A | 7/1997 | Tendler et al. | 6,061,558 A | 5/2000 | Kennedy, III et al. |
| 5,650,769 | A | 7/1997 | Campana et al. | 6,070,076 A | 5/2000 | Valentine |
| 5,650,770 | A | 7/1997 | Schlager et al. | 6,073,075 A | 6/2000 | Kondou et al. |
| 5,652,570 | A | 7/1997 | Lepkofker | 6,078,804 A | 6/2000 | Alperovich et al. |
| 5,657,010 | A | 8/1997 | Jones | 6,088,586 A | 7/2000 | Haverty |
| 5,661,652 | A | 8/1997 | Sprague et al. | 6,094,149 A | 7/2000 | Wilson |
| 5,668,543 | A | 9/1997 | Jones | 6,097,317 A | 8/2000 | Lewiner et al. |
| 5,669,061 | A | 9/1997 | Schipper | 6,111,539 A | 8/2000 | Mannings et al. |
| 5,671,436 | A | 9/1997 | Morris et al. | 6,233,523 B1 | 5/2001 | Sood |
| 5,673,305 | A | 9/1997 | Ross | 6,240,295 B1 | 5/2001 | Kennedy, III et al. |
| 5,675,371 | A | 10/1997 | Barringer | 6,324,404 B1 | 11/2001 | Dennison et al. |
| 5,676,788 | A | 10/1997 | Natarajan et al. | 6,397,057 B1 | 5/2002 | Malackowski et al. |
| 5,678,194 | A | 10/1997 | Grube et al. | 6,519,463 B2 | 2/2003 | Tendler |
| 5,680,119 | A | 10/1997 | Magliari et al. | 6,539,800 B2 | 4/2003 | Yamashita |
| 5,686,910 | A | 11/1997 | Timm et al. | 6,553,217 B1 | 4/2003 | Kundorf |
| 5,689,270 | A | 11/1997 | Kelley et al. | 6,560,459 B1 | 5/2003 | Wong |
| 5,694,322 | A | 12/1997 | Westerlage et al. | 6,847,822 B1 | 1/2005 | Dennison et al. |
| 5,705,980 | A | 1/1998 | Shapiro | 6,990,335 B1 | 1/2006 | Shamoon et al. |
| 5,706,014 | A | 1/1998 | Abbasi | 7,050,818 B2 | 5/2006 | Tendler |
| 5,714,948 | A | 2/1998 | Farmakis et al. | 7,289,763 B2 | 10/2007 | Dennison et al. |
| 5,721,678 | A | 2/1998 | Widl | 2002/0069017 A1 | 6/2002 | Schmier et al. |
| 5,724,660 | A | 3/1998 | Kauser et al. | 2002/0070882 A1 | 6/2002 | Jones et al. |
| 5,727,057 | A | 3/1998 | Emery et al. | 2002/0082770 A1 | 6/2002 | Jones |
| 5,729,196 | A | 3/1998 | Aljadeff et al. | 2002/0099500 A1 | 7/2002 | Schmier et al. |
| 5,729,457 | A | 3/1998 | Seymour et al. | 2003/0093218 A1 | 5/2003 | Jones |
| 5,731,785 | A | 3/1998 | Lemelson | 2003/0146854 A1 | 8/2003 | Jones |
| 5,734,981 | A | 3/1998 | Kennedy, III et al. | 2008/0014965 A1 | 1/2008 | Dennison et al. |
| 5,736,940 | A | 4/1998 | Burgener | 2009/0247117 A1 | 10/2009 | Dennison et al. |
| 5,736,962 | A | 4/1998 | Tendler | | | |
| 5,737,731 | A | 4/1998 | Lester et al. | FOREIGN PATENT DOCUMENTS | | |
| 5,739,774 | A | 4/1998 | Olandesi et al. | EP | 0347357 A1 | 12/1989 |
| 5,740,538 | A | 4/1998 | Joyce et al. | EP | 0199266 B1 | 7/1990 |
| 5,742,233 | A | 4/1998 | Hoffman et al. | EP | 0379198 A2 | 7/1990 |
| 5,742,509 | A | 4/1998 | Goldberg et al. | EP | 0381178 A1 | 8/1990 |
| 5,748,147 | A | 5/1998 | Bickley et al. | EP | 0404007 A2 | 12/1990 |
| 5,748,148 | A | 5/1998 | Heiser et al. | EP | 0494499 A2 | 7/1992 |
| 5,751,246 | A | 5/1998 | Hertel | EP | 0509777 A2 | 10/1992 |
| 5,752,186 | A | 5/1998 | Malackowski et al. | EP | 0554633 A2 | 8/1993 |
| 5,754,955 | A | 5/1998 | Ekbatani | EP | 0556400 A1 | 8/1993 |
| 5,768,382 | A | 6/1998 | Schneier et al. | EP | 0219859 B1 | 10/1993 |
| 5,771,455 | A | 6/1998 | Kennedy, III | EP | 0576121 A1 | 12/1993 |
| 5,774,802 | A | 6/1998 | Tell | EP | 0735380 A1 | 10/1996 |
| 5,774,825 | A | 6/1998 | Reynolds | EP | 0805427 | 5/1997 |
| 5,778,315 | A | 7/1998 | Proietti | EP | 0379198 B2 | 3/1999 |
| 5,786,789 | A | 7/1998 | Janky | FR | 398773 | 6/1909 |
| 5,787,354 | A | 7/1998 | Gray et al. | FR | 1595183 A | 7/1970 |
| 5,794,151 | A | 8/1998 | McDonald et al. | GB | 292182 | 6/1928 |
| 5,799,061 | A | 8/1998 | Melcher et al. | GB | 2025185 A | 1/1980 |
| 5,799,249 | A | 8/1998 | Kennedy, III | GB | 2261977 A | 6/1993 |
| 5,802,454 | A | 9/1998 | Goshay et al. | GB | 2282936 A1 | 4/1995 |
| 5,808,565 | A | 9/1998 | Matta | GB | 2300324 A1 | 10/1996 |
| 5,815,814 | A | 9/1998 | Dennison et al. | GB | 2271486 B2 | 4/1997 |
| 5,835,061 | A | 11/1998 | Stewart | JP | 59104840 | 6/1984 |
| 5,835,907 | A | 11/1998 | Newman | JP | 63253736 | 10/1988 |
| 5,844,522 | A | 12/1998 | Sheffer et al. | JP | 63299532 | 12/1988 |
| 5,848,373 | A | 12/1998 | DeLorme et al. | JP | 01194724 A2 | 8/1989 |
| RE36,111 | E | 2/1999 | Neville | JP | 02171039 A2 | 7/1990 |
| 5,904,728 | A | 5/1999 | Tamai et al. | JP | 022-10923 A2 | 8/1990 |
| 5,922,040 | A | 7/1999 | Prabhakaran | JP | 03029428 | 2/1991 |
| 5,949,611 | A | 9/1999 | Stephens et al. | JP | 03054987 | 3/1991 |
| 5,959,580 | A | 9/1999 | Maloney et al. | JP | 04035326 | 2/1992 |
| 5,960,337 | A | 9/1999 | Brewster et al. | JP | 04042626 | 2/1992 |
| 5,963,861 | A | 10/1999 | Hanson | JP | 04132491 A2 | 5/1992 |
| 5,969,678 | A | 10/1999 | Stewart et al. | JP | 04217125 A2 | 8/1992 |

| | | |
|---|---|---|
| JP | 04255122 A2 | 9/1992 |
| JP | 04295995 A2 | 10/1992 |
| JP | 04339284 A2 | 11/1992 |
| JP | 05259972 A2 | 8/1993 |
| JP | 05244074 A2 | 9/1993 |
| JP | 05249220 | 9/1993 |
| JP | 05327605 A2 | 12/1993 |
| JP | 06098367 | 4/1994 |
| JP | 06244782 A2 | 9/1994 |
| JP | 06315005 A2 | 11/1994 |
| JP | 07006295 | 1/1995 |
| JP | 07030945 | 1/1995 |
| JP | 09186645 | 7/1997 |
| JP | 09200855 | 7/1997 |
| WO | WO-90/01236 A1 | 2/1990 |
| WO | WO-92/02105 A1 | 2/1992 |
| WO | WO-93/13503 A1 | 7/1993 |
| WO | WO-93/13618 A1 | 7/1993 |
| WO | WO-94/02922 A1 | 2/1994 |
| WO | WO-94/23404 A1 | 10/1994 |
| WO | WO-94/27264 A1 | 11/1994 |
| WO | WO-94/27398 A1 | 11/1994 |
| WO | WO-94/29995 A1 | 12/1994 |
| WO | WO-95/03665 A1 | 2/1995 |
| WO | WO-96/16386 A1 | 5/1996 |
| WO | WO-96/20464 A1 | 7/1996 |
| WO | WO-98/07128 A1 | 2/1998 |
| WO | WO-98/08206 A2 | 2/1998 |
| WO | WO-00/01242 A1 | 1/2000 |

OTHER PUBLICATIONS

Plaintiffs' Answer to Alltel Communications LLC's Counterclaims, *EMSAT Advanced Geo–Location Technology, LLC and Location Based Services LLC v. Alltel Communications LLC*, Case No. 4:08CV00821 (N.D. Ohio), filed Jul. 16, 2008, 4 pages.

Complaint for Patent Infringement, *EMSAT Advanced Geo–Location Technology, LLC and Location Based Services LLC v. Cellco Partnership d/b/a Verizon Wireless*, Case No. 4:08CV00816 (N.D. Ohio), filed Mar. 31, 2008, 8 pages.

Defendant Cellco Partnership's Answer to Plaintiffs' Complaint for Patent Infringement, *EMSAT Advanced Geo–Location Technology, LLC and Location Based Services LLC v. Cellco Partnership d/b/a Verizon Wireless*, Case No. 4:08CV00816 (N.D. Ohio), filed Jun. 2, 10 pages.

Complaint for Patent Infringement, *EMSAT Advanced Geo–Location Technology, LLC and Location Based Services LLC v. T–Mobile USA, Inc.*, Case. No. 4:08CV00817 (N.D. Ohio), filed Mar. 31, 2008, 8 pages.

Answer and Counterclaims to Plaintiffs' First Amended Complaint for Patent Infringement, *EMSAT Advanced Geo–Location Technology, LLC and Location Based Services, LLC v. T–Mobile USA, Inc.*, Case No. 4:08CV00817 (N.D. Ohio), filed Jul. 24, 2008, 10 pages.

Plaintiffs' Answer to T–Mobile USA, Inc.'s Counterclaims, *EMSAT Advanced Geo–Location Technology, LLC and Location Based Services LLC v. T–Mobile USA, Inc.*, Case No. 4:08CV00817 (N.D. Ohio), filed Aug. 13, 2008, 3 pages.

Complaint for Patent Infringment, *EMSAT Advanced Geo–Location Technology, LLC and Location Based Services LLC v. Sprint Spectrum LP et al.*, Case No. 4:08CV00818 (N.D. Ohio), filed Mar. 31, 2008, 9 pages.

Answer Affirmative Defenses and Counterclaims, *EMSAT Advanced Geo–Location Technology, LLC and Location Based Services LLC v. Sprint Spectrum LP et al.*, Case No. 4:08CV00818 (N.D. Ohio), filed Jun. 26, 2008, 10 pages.

Plaintiffs' Answer to the Sprint Nextel Defendants' Counterclaims, *EMSAT Advanced Geo–Location Technology, LLC and Location Based Services LLC v. Sprint Spectrum LP et al.*, Case No. 4:08CV00818 (N.D. Ohio), filed Jul. 16, 2008, 4 pages.

Complaint for Patent Infringement, *EMSAT Advanced Geo–Location Technology, LLC and Location Based Services LLC v. AT&T Mobility LLC f/k/a Cingular Wireless LLC*Case No. 4:08CV00822 (N.D. Ohio), filed Mar. 31, 2008, 8 pages.

Answer and Counterclaim, *EMSAT Advanced Geo–Location Technology, LLC and Location Based Services LLC v. AT&T Mobility LLC f/k/a Cingular Wireless LLC*, Case. No. 4:08CV00822 (N.D. Ohio), filed Jul. 25, 2008, 12 pages.

Plaintiffs' answer to AT&T LLC's Counterclaims, *EMSAT Advanced Geo–Location Technology, LLC and Location Based Services LLC v. AT&T Mobility LLC f/k/a/ Cingular Wireless LLC*, Case No. 4:08CV00822 (N.D. Ohio), filed Aug. 13, 2008, 4 pages.

*New Jersey Bell Network Proposal for Statewide Enhanced 9–1–1 Service*, New Jersey Bell, Trenton, New Jersey, Nov. 20, 1989), 34 pages.

Paton, I. J., et al., "Terminal Self–Location in Mobile Radio Systems", *Sixth International Conference on Mobile Radio and Personal Communications*, Coventry, UK, Dec. 9–11, 1991, (Dec. 9, 1991), pp. 203–207.

Answer, Affirmative Defenses and Counterclaims, *EMSAT Advanced Geo–Location Technology, LLC and Location Based Services LLC v. Alltell Communicatons LLC*, Case No. 4:08CV00821 (N.D. Ohio), filed Jun. 26, 2008, 9 pages.

Defendants' Invalidity Contentions, *EMSAT Advanced Geo–Location Technology, LLC and Location Based Services LLC v. Sprint Specturm LP and Others*, Civil Action Nos. 08–00816, 08–00818, 08–00821 (N.D. Ohio), filed Feb. 18, 2009, 545 pages.

Hunter, Paul., "The Source of Innovation in New Jersey Bell Switching Services", Thesis submitted to the Massachusetts Institute of Technology, (Jun. 27, 1991), 106 pages.

C.J. Driscoll & Associates, "Survey of Location Technologies to Support Mobile 9–1–1", *Survey Conducted for State of California Department of General Services Telecommunications Division, Sacramento, California and for the Association of Public Safety Communications Officials*, (Jul. 1994),59 pages.

Federal Communicatons Commission (FCC) Notice of Proposed Rule Making In the Matter of Revision of the Commission's Rules to Ensure Compatiblity with Enhanced 911 Emergency Calling Systems, CC Docket No. 94–102, (Sep. 10, 1996), 77 pages.

Request for Ex Parte Reexamination of U.S. Patent No. 5,946,611, filed Mar. 30, 2009 at the U.S. Patent and Trademark Office, 181 pages.

Response to Notice of Failure to Comply with Ex Parte Reexamination Request filing Requirements and Corrected Request for Ex Parte Reexamination of U.S. Patent No. 5,946,611, filed Apr. 6, 2009 at the U.S. Patent and Trademark Office, 22 pages.

Request for Ex Parte Reexamination of U.S. Patent No. 6,324,404, filed Mar. 30, 2009 at the U.S. Patent and Trademark Office, 314 pages.

Response to Notice of Failure to Comply with Ex Parte Reexamination Request filing Requirements and Corrected Request for Ex Parte Reexamination of U.S. Patent No. 6,324,404, filed Apr. 6, 2009 at the U.S. Patent and Trademark Office, 28 pages.

Request for Ex Parte Reexamination of U.S. Patent No. 6,847,822, filed Mar. 30, 2009 at the U.S. Patent and Trademark Office, 462 pages.

Response to Notice of Failure to Comply with Ex Parte Reexamination Request filing Requirements and Corrected Request for Ex Parte Reexamination of U.S. Patent No. 6,847,822, filed Apr. 6, 2009 at the U.S. Patent and Trademark Office, 72 pages.

Request for Ex Parte Reexamination of U.S. Patent No. 7,289,763, filed Mar. 30, 2009 at the U.S. Patent and Trademark Office, 438 pages.

Response to Notice of Failure to Comply with Ex Parte Reexamination Request filing Requirements and Corrected Request for Ex Parte Reexamination of U.S. Patent No. 7,289,763, filed Apr. 6, 2009 at the U.S. Patent and Trademark Office, 90 pages.

"Preliminary Response dated Jun. 21, 1996 for related U.S. Appl. No. 08/670,281, filed Jun. 21, 1996;" Inventor Everett Dennison, 4 pages.

"Office Action dated Mar. 25, 1996 for related U.S. Appl. No. 08,555,884, filed Oct. 23, 1995;", Inventor Everett Dennison, 11 pages.

"Office Action dated Feb. 7, 2007 for related U.S. Appl. No. 10/993,477, filed Nov. 22, 2004;", Inventor Everett Dennison, 12 pages.

"Supplemental Preliminary Amendment dated May 16, 2007 for related U.S. Appl. No. 10/993,477, filed Nov. 22, 2004;", Inventor Everett Dennison, 12 pages.

"Second Supplemental Preliminary Amendment dated Jun. 27, 2007 for related U.S. Appl. No. 10/993,477, filed Nov. 22, 2004; Inventor Everett Dennison", 12 pages.

Cortland, Laurence J., "Loran–C Vehicle Tracking in Detroit's Public Safety Dispatch System", *Navigation Land, Sea, Air & Space, IEEE Press*, (1989),90–100.

"Federal Radio navigation Plan", *Radio navigation System Research, Engineering and Development Summary*, Department of Defense and Department of Transportation,Springfield,(1994), 15.

Brown, Alison "Tidget–Plus Urban Navigation with stand–Alone GPS", *ION Satellite Division 6th International Technical Meeting*, Salt Lake City,(1993),8.

Zavoli, Walter B., "Navigation and Digital Maps Interface for Fleet Management and Driver Information Systems", Menlo Park,7.

Zavoli, Walter B., et al., "A System View of Digital Road Map Databases in a IVHS with Emphasis on Subsystem Interface Requirements", *Vehicle Navigation & Information Systems*, IEEE Press, Menlo Park,(1992),8.

Zavoli, Walter B., et al., "Customer Location Services", *Vehicle Navigation & Information Systems Conference Proceedings*, IEEE Press,Menlo Park,(1994),6.

Yang, Toneluh A., et al., "Path Planning and Evaluation in IVHS Databases", *Computer Science Dept. and Human Factors Research Lab—University of Minnesota*, Minneapolis, 8.

Yang, Thomas T., et al., "Use of Mobitex Wireless Wide Area Networks as a Solution to Land–Based Positioning and Navigation", IEEE Press,(1994),7.

Wilson, Geoffrey D., "Automatic Vehicle Location System Selection", The Aerospace Corporation, 10 pages.

"Westinghouse Vehicle Management Systems", *Bringing Advanced Technology to Transportation*, Westinghouse Electronic Systems, Baltimore,4.

"Future Mobile Radio Trunking and Data Systems", *The Institution of Electrical Engineers*, IEEE Press, Savoy Place, (1991),8.

"Vehicle Tracking System, How the System Works . . . It's Easy to Learn and Use", II Morrow Inc., 5.

"Trimble Navigation", *Fleet Vision*, Integrated Fleet Management System,9.

Corbley, Kevin P., "Chicago Uses Innovative Methods to Build Enterprise–Wide Urban GIS", *Earth Observation Magazine*, (Jul. 1995),3 pages.

Tomasula, Dean "Tracking Gear Shipped Despite Tight Market", *Automotive Electronic News*, (1989),1.

"The Cassiope/Eirobus Approach", *IEEE Vehicle Navigation & Information Systems Conference*, IEEE Press, Ottawa,(1993),4.

Taylor, Kent B., "TravTek Information and Services Center", 12.

Tatterson, Kathleen G., "Car Alarm System Includes Tracking Device, Engine Shut–Off", *Automotive Electronic Journal*, (1990),2.

Sweeney, Lawrence E., et al., "Travinfo: A Progress Report", *IEEE Vehicle Navigation & Information Systems Conference, IEEE Press*, Yokohama, (1994),7.

Sumner, Roy "Data Fusion in Pathfinder and Travtek", 5.

Sterling, David E., et al., "The Iridium System—A Revolutionary Satellite Communicatons System Developed With Innovative Applications of Technology", IEEE Press, McLean, (1991),5.

Soults, Don "A Tool for the Times", *Beverage World Distribution*, (1993),2.

Sommerville, Fraser et al., "The Promise of Increased Patronage", *The Institution of Electrical Engineers*, IEEE Press, Savoy Place,(1993),4.

Scapinakis, Dimitris A., et al., "California Partners for Advanced Transit and Highways (PATH)", *Studies of the Adoption and Use of Location and Communication Technologies by the Trucking Industry*,University of California, Berkeley, (1991),23.

Ratcliff, Robert et al., "Transportation Resources Information Processing System (TRIPS)", 5.

Shekhar, Shashi et al., "Genesis and Advanced Traveler Information Systems (ATIS): Killer Applications for Mobile Computing?", Department of Computer Services, University of Minnesota, (1994),20.

Allen, Gary "The Latest System Beams Down From Satellites", *911 Dispatch Services, Inc.*, (1990–1994),4.

Ramaswamy, Ashok B., et al., "Telepath An IVHS Concept System", *IEEE Vehicle Navigation & Information Systems Conference, IEEE Press*, (1993),6.

"PSC–200 Intelligent Data Controller", *Trimble, Vehicle Tracking Products*, 2.

"Breakthrough at the Borders", *Satellite Technology for Transport*, Satellite Technology for Transport,(1990),2.

Preiss, George et al., "The Satref and GPS Information Projects", *Vehicle Navigation& Information Systems*, IEEE Press,(1992),4 pages.

Powell, R. et al., "Real Time Passenger Information System for the Romanse Project", *Computing and Control Division: Colloquium on "Public Transport Informaton and Management Systems"*, IEEE Press,London,(1993),5.

Pierce, Gerald "Smaller E 9–1–1 Applications", (1991),2.

Peters, Joseph I., et el., "TravTek Evaluation Overview and Recruitment Statistics", *IEEE Vehicle Navigation & Information Systems Conference, IEEE Press*, (1993),6.

"Enhanced Routing Services", *Patriot Communicatons LLC*, 1.

"General System Description and Objectives", 4 pages.

Omer, Steve "The Independent", London,(1993),3 pages.

"Intelligent Vehicle Highway Systems Review of Fields Trials", *Road Transport Research*, Organizaton for Economic Co–Operation and Development,36 pages.

"Efficient Network Communication Management for AVL Application", *NCManager AVL Network Communication Management Software*, Trimble Navigation Europe Limited, Vehicle Tracking Products Division,2 pages.

"Data Products Overview Mobile Data", *Motorola*, 18 pages.

"Automatic Vehicle Location System", *Motorola*, 6 pages.

Morris, Michelle "High–Tech White Knights on the Freeway", *GPS World*, (1994),9 pages.

"Advanced Vehicle Monitoring and Communicaton Systems for Bus Transit", *Federal Transit Administration*, (1991),33 pages.

Montgomery, Glenn E., et al., "GIS Data Conversion Handbook", *GIS World Books*, Fort Collins,(1993),22 pages.

Mishkoff, Hank "Information & Billing Systems", *Cellular Business*, Cellular Business,(1992),6 pages.

"Mets, Inc. Automatic Vehicle Location Vehicle Management System", *Mets, Inc.*, 5 pages.

"The Mets System", *Trucking National & Regional Fleet Control*, Mets, Inc.,4 pages.

McLaughlin, Meg et al., "Automatic Vehicle Location for Law Enforcement", *The National Consortium for Justice Information and Statistics*, Sacramento,(1994),6 pages.

Lessard, Robert "The Use of Computer for Urban Transit Operations", *IEEE Vehicle Navigation & Informaton Systems Conference*, IEEE Press , Ottawa,(1993),5 pages.

Mattos, Philip G., "Integrated GPS and Dead Reckoning For Low Cost Vehicle Navigation and Tracking", *IEEE Vehicle Navigation & Information Systems Conference, IEEE Press*, (1994),6 pages.

Leong, Robert P., "An Unconventional Approach to Automatic Vehicle Location and Control for Urban Transit", *Vehicle Navigation & Information Systems*, IEEE Press, (1989),6 pages.

Lee, A.J. "Navigation and Relocation on Land the Needs of the Private Motorist the Rac's Views and Objectives", *Land Navigation and Location for Mobile Applications*, The Royal Institute of Navigation, London,(1985),6 pages.

Larson, Gilbert C., "Evaluation of an AVM System Implemented City–Wide in St. Louis", 6 pages.

"Advanced Public Transportation Systems: The State of the Art Update '92", U.S. Department of Transportation Federal Transit Administration,(1992),103 pages.

Kwan, Robert K., et al., "Globalstar: Linking the World via Mobile Connections", *IEEE International Symposium on Personal, Indoor and Mobile Radio Communications*, IEEE Press, London,(1991),8 pages.

Krensavage, Mike "Communications: It Sounds Primitive, but Bicycle Messengers are Back. Why? Try Driving in Downtown Los Angeles.", *Los Angeles Times, Los Angeles* (1990),2 pages.

Krakiwsky, Edward J., "The Diversity Among IVHS Navigation Systems Worldwide", *IEEE Vehicle Navigation & Information Systems Conference, IEEE Press*, (1993),4 pages.

Koncz, Nicholas et al.,"GIS–Based Transit Information Bolsters Travel Options", *GIS World*, (1995),5 pages.

Kihl, Mary "Advanced Vehicle Location System for Partransit in Iowa", *IEEE Vehicle Navigation & Information Systems Conference*, IEEE Press , Ottawa,(1993),5 pages.

Keyser, Donald A., "Geostar: Navigation Location System", *IEEE Press*, (1989),9 pages.

Kerihuel, J. B., et al., "How the Intelligent Network Will Federate Services Related to Mobility", *Third IEE Conference on Telecommunications*, IEEE Press, London,(1991),7 pages.

"Mobile Data News No1.", Ericsson Mobile Communications AB,2 pages.

Juneja, Bindu et al., "Location Services Using Cellular Digital Packet Data", IEEE Press , Gurgaon, India,(1996),5 pages.

Jeffery, D. J., et al., "Advanced Traveler Information Systems In the UK: Experienced From The Pleiades and Romanse Projects", *Vehicle Navigation & Information Systems*, IEEE Press, Yokohama,(1994),6 pages.

Jacobs, Irwin M., et al., "A Second Anniversary Operational Review of the OmniTRACS—The First Two–way Mobile Ku–band Satellite Communications System", *International Mobile Satellite Conference*, The British Library , Ottawa(1990),6 pages.

"Integrated Distributed Logistics Management", *U.S. Department of Commerce, National Technical Information Service*, (1991),26 pages.

"Implementing 9–1–1 Systems in Texas: Legal and Institutional Background", Texas Advisory Commission on Intergovernmental Relations,(1987),3pages.

"Implementation Planning for Enhanced 911 Services", GTE Data Services , Tampa,(1987),24 pages.

"UPS Tests On–Board Data Radio", *RoundUPS, II Morrow,* Minnesota, (1990),3 pages.

"II Morrow's Technology is here Today For", *CompanyWide Big Idea*, (1987), 1 pages.

Hunter, Tom et al., "Land Navigation and Fleet Management With GPS, LORAN, and Dead Reckoning Sensors", IEEE Press,(1988),7 pages.

Hunter, Paul P., "The Sources of Innovation in New Jersey Bell Switching Services", *Massachusetts Institute of Technology*, (1991),91 pages.

Huber, Paul "Public Transport Information Systems in Munich", *Intelligent Transport Systems World Congress*, (1995),6 pages.

Howie, Donald J., et al., "IVHS Applications in Australia", *Vehicle Navigation & Information Systems Conference Proceedings, Society of Automotive Engineers, Inc., Warrendale*, (1991),5 pages.

Honing, William L., et al., "The Realities of Service Creation on Switching Systems Through Attached Processors", *Proceedings*, 4 pages.

Head, Charles S., "Intelligent Network: A Distributed System", *IEEE Communications Magazine*, (1988),6 pages.

Hamlen, Mark D., "Fleet Management with Automatic Vehicle Location", *IEEE Press*, (1986),9 pages.

"Implementation Planning for Enhanced 911 Services", *GTE Data Services*, (1987),28 pages.

"Vehicle Tracking", *World Showcase—Technology and Product Innovation for the Global Positioning System*, (1992),4 pages.

Gomes, Lamberto et al., "Taxi Emergency and Location System for Metropolitan Toronto", *Vehicle Navigation & Information Systems Conference Proceedings*, IEEE Press, (1994),5 pages.

Gerland, Horst E., "Intelligent on Board Modern Approach To Transit Fleet Management", *Vehicle Navigation & Information Systems Conference Proceedings, IEEE Press*, (1994),6 pages.

French, Robet L., "Paving the Way for GPS in Vehicle Tracking", *World Showcase—Technology and Product Innovation for the Global Positioning System*, (1992),2 pages.

Fleishman, Rebecca N., et al., "A Preliminary Account of TravTek Route Guidance Use by Rental and Local Drivers", *Vehicle Navigation & Information Systems Conference Proceedings, IEEE Press*, Ottawa, (1993),6 pages.

Farkas, Donald R. "GPS–based GIS Prepares Newark for the Future", *Geo Info Systems*, (1990),7 pages.

Eylert, Bernhard "Emergency Service in the CEC Project "Storm"", *Vehicle Navigation & Information Systems*, IEEE Press,(1992),8 pages.

"The World's First Automotive Navigation System The Etak Navigator", 6 pages.

"The Etak Navigator", *Etak, Inc., Menlo Park*, 6 pages.

"Dispatch Manager", Etak, Inc.,7 pages.

Eckerson, Wayne "Users Test Toll–Free Net Access Options", *Management Strategies*, (1992),2 pages.

Driscoll, Clement "Technology Developments Allow Wireless 911 Calls to Be Traced", *RCR*, (1959),4 pages.

Janc, R. V., "Commercial Automatic Vehicle Location in the U.S.A.—Current Status and Future Evolution", *Land Navigation and Location for Mobile Applications*, The Royal Institute of Navigation, Kensington Gore,(1985),9 pages.

Wallace, Bob "Domino's Delivers Using New Call Routing Service", Network World, Inc. , Ann Arbor,91991),2 pages.

Dittloff, H. J., et al., "V E L O C—A New Kind of Information System", *IEEE Press*, Hamburg, Germany, (1992),7 pges.

Dial, Robert B., "Autonomous Dial–A–Ride Transit Introductory Overview", *Transportation Resarch, Elsevier Science Ltd., Great Britain*, (1995), 16 pages.

Denigris, Ernest G., et al., "Enhanced 911Emergency Calling With a Plus", *Bell Laboratories*, (1980),6 pages.

Delong, Jr., Edgard S., "Making 911 even better", *Telephony*, (1987),4 pages.

Dayharsh, Thomas I., et al., "Update on the National Emergency Number 911", *IEEE Transactons on Vehicular Technology, IEEE Press*, (Nov. 4, 1979),6 pages.

Dailey, D. J., et al., "Demonstration of an advanced public transportation system in the context of an IVHS Regional Architecture", *Towards an Intelligent Transport System— Proceedings of the First World Congress on Applications of Transport Telematics and Intelligent Vehicle–Highway Systems*, University of Washington, Seattle, Washington, (1994),9 pages.

Cunningham, Ketih W., "GIS Solutions for 9–1–1 Databases and Rural Addressing", (1989),4 pages.

"Phase 1 Final Report Logistics Workstaton", *Computer Aided Planning & Scheduling, Inc.*, (1986),97 pages.

Collura, John et al., "Experience with an Advanced Traveler Information System Trial Test in the Metropolitan New York City Area", (1994), 10 pages.

Collier, Clay "Traveler Information—An Evolutionary Perspective", *Vehicle Navigation & Information Systems*, IEEE Press,(1992),7 pages.

Claussen, Hinrich et al., "Status and Directions of Digital Map Databases in Europe", *Vehicle Navigation & Information Systems*, IEEE Press,(1993),4 pages.

Catling, Ian et al., "Socrates: System of Cellular Radio for Traffic Efficiently and Safety", 4 pages.

Badillo, Ann S., et al., "Transportation and Navigation", *Profiting from a Geographic Information System, GIS World Book* , Fort Collins, Colorado, (1993),6 pages.

Casey, Robert F., et al., "Advanced Public Transportation Systems: The State of the Art", (1991),91 pages.

Burton, Robert et al., "Bus Priority and UTC Systems: The PROMPT Project", *Vehicle Navigation & Information Systems*, IEEE Press,Ottawa Ontario,(1993),5 pages.

Burgener, E.C. "A Personal Transit Arrival Time Receiver", *Vehicle Navigation & Information Systems*, IEEE Press, Ottawa Ontario,(1993),3 pages.

Buccafurno, Mary E., "The Philadelphia Story: An E911 installation marks a series of milestones that improve the effectiveness of this important service", *TE&M Telephone Engineer & Management*, (1987),4 pages.

Bruzek, Frank J., "Class Calling Service—A Consumer and Service Perspective", *Global Communications Conference, IEEE Press* , New Orleans, Louisiana, (1985),5 pages.

Brown, Allison "An Operational Test of a Vehicle Emergency Location Service in Colorado", *Partnerships for Technology Conversion*, The Institute of Navigation , Alexandria, Virginia,(1994),12 pages.

Brown, Alison "A Low Cost Vehicle Location and Tracking System", IEEE Press,(1992),8 pages.

Briskman, Robert D., "Radio Determination Satellite Service", IEEE Press,(1990), 11 pages.

Boyce, David E., et al., "Design and Implementation of ADVANCE: The Illinois Dynamic Navigation and Route Guidance Demonstration Program", Chicago Sun Times, (Jan. 24, 1991),12 pages.

Borelli, A. et al., "An Integrated Approach to Automatic Vehicle Monitoring and Mobile Digital Communication", 18 pages.

Blumentritt, Charles W., et al., "TravTek System Architecture Evaluation: Preliminary Analysis of selected Elements", IEEE Press,(1993),5 pages.

Bjorndahl, Per "CME 20—A Total Solution for GSM Networks", *Ericsson Review*, Gosta Lindberg,(Nov. 3, 1991),9 pages.

"Roadnet delivers first UPS product", *Companywide Big Idea*, (1988),2 pages.

Berrada, Jalil et al., "Bus Operatons and Management Systems: Development and Operational Experience", *Public Transport Information and Management Systems*, IEEE Press, Savoy Place, London,(May 25, 1993),3 pages.

Beerens, J. A. J. "Fleet Monitoring with GPS and Satellite Communications", *GPS World, Advanstar Publication*, (1993),5 pages.

Banks, K. M., "Datatrak Automatic Vehicle Location System in Operational Use in the UK", *Vehicle Navigation & Information Systems, Society of Automotive Engineers, Inc.*, Warrendale, PA, (1991),9 pages.

Balogh, Stephen et al., "London Transport's Countdown System—A Leader in the Bus Transport Revolution", *Public Transport Information and Management Systems*, IEEE Press, Savoy Place, London,(May 25, 1993),4 pages.

Payne, Harold J., "Ball Systems Engineering Division—Description of Automatic Vehicle Location (AVL) Related Services and Products", *Ball Corporation*, (1993),4 pages.

Payne, Harold J., "Ball Systems Engineering Capabilities for Communications and Automatic Vehicle Locations Systems", *Ball Corporation*, (1994), 18 pages.

Balke, Kevin N., et al., "Collection and Dissemination of Real–Time Travel Time and Incident Information with Invehicle Communication Technologies", 6 pages.

"Terminal management, display, and platform integration software for AVL and status information", *AVLManager AVL Display and Terminal Management Software—TRIMBLE*, 2 pages.

Antonio, Franklin P., et al., "OmniTRACS: A Commercial Ku–Band Mobile Satellite Terminal and its applicablity to military mobile terminals", (1988),4 pages.

Andersson, Per G., "Fleet Management in Public Transport", *The 3rd International Conference on Vehicle Navigation & Information Systems (VNIS)*, IEEE Press, Sweden, (1992),4 pages.

Abelleyro, R. J., "Simulcast Voice and Data Mobile Communications System", IEEE Press , Vancouver, B.C., (1992),4 pages.

"Addressing Handbook for Local Governments", (1991),112.

"Radionavigation System Research, Engineering and Devleopment Summary", *Federal Radionavigation Plan*, Department of Defense and Department of Transportation,(1994), 15 pages.

Caffery, J. J., et al., "Vehicle Locaton and Tracking for IVHS in CDMA Microcells", 5 pages.

Sommerville, Fraser et al., "Reliable Information in Everyone's Pocket—A Pilot Test", IEEE Press,(1994),4 pages.

Scorer, A. G., "The Devleopment of Datatrak", *The Journal of Navigation*, (1991),12 pages.

"Cities and Telecommunications", *The New Urban Infrastructure*, Praeger Publishers , New York, NY,(1990),9 pages.

Rupert, R. L., "The TravTek Traffic Management Center and Traffic Information Network", 5 pages.

Rucker, R. A., et al., "The Future of Aeromobile Digital Communications", *American Institute of Aeronautics and Astronautics, Inc.*, (1998),7 pages.

Harvey, E. E., et al., "Call Center Solutions", *AT&T Technical Journal*, (1991), 10 pages.

Rodin, C. "EUTELTRACS: An innovative system for changing industry", *Vehicle Location and Fleet Management Systems*, IEEE Press , Savoy Place, London,(1993), 12 pages.

Jenks, A. "Bursting into Bloom After Desert Storm—Commercial Markets Sprout Everywhere", (Oct. 8, 1992),2 pages.

"Roadshow—The World–Class Routing Solution", *Roadshow*, 6 pages.

"Roadshow P&D System Overview", *Roadshow*, 3 pages.

"A Powerful New Approach to Dynamic Route Planning and Real–Time Dispatch for LTL Carriers", *Roadshow*, 13 pages.

"System Overview", *Roadshow*, (1993),31 pages.

"Trimble Endorses DGPS with Announcement of Base Station Products/ROADSHOW: Real–Time Route Adjustments for Distribution Efficiency", Roadshow, 2 pages.

Sue, M. K., "A High–Capacity Aeronautical Mobile Satellite System", IEEE Press,(1987), 10 pages.

Tiedemann, E. G., et al., "The OmniTRACS Mobile Satellite Communications and Positioning System", *Vehicle Electronics in the 90's: Proceedings of the International Congress on Transportation Electronics*, Society of Automotive Engineers, Inc. , Warrendale, PA,(1990)7 pages.

Pearlman, R. et al., "IVHS Map Database Transfer Standards: Current Status", IEEE Press,(1995),6 pages.

Ohnishi, H. et al., "Map Database Generation System for In–Vehicle Navigation System", *Vehicle Navigation & Information Systems*, (1994),6 pages.

"Have an Unfair Advantage Over Car Thieves—Teletrac. The Revolutionary Stolen Vehicle Locator System for Law Enforcement", International Teletrac Systems,(1990), 3 pages.

Reynolds, J. C., et al., "GPS–Based Vessel Position Monitoring and Display System", IEEE Press,(1990),7 pages.

Sullivan, E. et al., "INRAD: A Demonstration of Two–Way Roadway to Vehicle Communication for Use in Traffic Operations", *1992 Compendium of Technical Papers*, (1992),6 pages.

Workman, A. M., et al., "International Applications of AT&T's Intelligent Network Platforms", *AT&T Technical Journal*, (1991),14 pages.

Sagers, R. C., "A Loran–C Based Receiver for Automatic Vehicle Location", IEEE Press,(1986),5 pages.

Shaw, J. et al., "Cellular Communications—A Changing Environment from Basic Analog to Integrated Digital", *Vehicle Electronics in the 90's: Proceedings of the International Congress on Transportation Electronics*, Society of Automotive Engineers, Inc. , Warrendale, PA (1990), 12 pages.

Wiksten, C. I., et al., "Monitor—An Automatic Bus Location and Communicatons System for Chicago", IEEE Press, (1980),6 pages.

Scapinakis, D. A., et al., "Communications and Positioning Systems in the Motor Carrier Industry", *California Partners for Advanced Transit and Highways (PATH)*, (1992),84 pages.

"Real–time map display software for efficient fleet management", *Trimble—StarView Real–Time Map Display*, 2 pages.

"QDSS The Qualcomm Decision Support System", *OmniTRACS*, (1992),3 pages.

Shimamura, Y. et al., "Combined Position Detection System for Pedestrian/Train Mode", *Vehicle Navigation & Information Systems*, IEEE Press,(1994),5 pages.

Scapinakis, D. A., et al., "Studies of the Adoption and Use of Location and Communication Technologies by the Trucking Industry", *California Partners for Advanced Transit and Highways (PATH)*, (1991),23 pages.

"Explore the Advantages of the roadshow Routing and Scheduling System", *Roadshow*, (1994),8 pages.

McLellan, J. F., et al., "The NavTrax Fleet Management System", IEEE Press,(1992),7 pages.

Hyman, W. A., et al., "Improvements in Data Acquisition Technology for Maintenance Management Systems", *National Cooperative Highway Research Program Report*, (1990), 18 pages.

Ferrentino, M. "Code Red: GPS and Emergency Medical Response", *GPS World*, (1994),7 pages.

"Zip Code Software Catalog", *Melissa Data Corporation* Raymond Melissa (1991),35 pages.

"Easy–to–read terminal for vehicle tracking status and message applications", *Trimble—Echo XL Status/Message Terminal*, 2 pages.

Hellaker, J. et al., "Real–time Traveler Information—in everyone's pocket?!—a pilot test using hand–portable GSM terminals", *Vehicle Navigation & Information Systems*, IEEE Press, Ottawa,(1993),5 pages.

Coltrin, D. et al., "Office without walls: Fleet Management and Customer Service", *GPS World*, (1994),6 pages.

Green, P. et al., "The Development of Socrates in Europe and the Tango Field Trial in Gothenburg", IEEE Press, (1994),5 pages.

Johannessen, A. B., "Fleet Management Using Inmarsat–C and GPS—A Norwegian pilot project", *IEEE Press*, (1992),6 pages.

"Calvin User's Guide", *ETG Incorporated*, ETG Incorporated,(1991),112 pages.

Gray, Tonly "The application of Automataic Vehicle Location in UK ambulance services", *Vehicle Location and Fleet Management Systems, IEE*. Savoy Place, London, (1993),9 pages.

Collesei, S. "Short Message Service Based Applications in the GSM Network", *ICCC Regional Meetings on Wireless Computer Networks (WCN)*, IEEE, (1994), 7 pages.

Kikuchi, Shinya et al., "Advanced Traveler Aide Systems for Public Transportation—The Intelligent Transit Mobility System (ITMS)", *Federal Transit Administration*, (1994), 131 pages.

McDonald, M. et al., "Romanse (Road Management System for Europe) Project", *Vehicle Navigation & Information Systems*, IEEE,(1994),5 pages.

"Vehicle Tracking Products", *GPS World*, (1992),4 pages.

"Vehicle Tracking", *GPS World*, (1992),4 pages.

Jacobs, I. M., et al., "The Application of a Novel Two–Way Mobile Satellite Communications and Vehicle Tracking System to the Transportation Industry", *Transactions on Vehicular Technology*, IEEE,(1991),7 pages.

McLellan, J. F., et al., "Application of GPS Positioning to Management of Mobile Operaton", *Journal of Surveying Engineering*, (1993),13 pages.

Gault, Helen et al., "Automatic Vehicle Location and Control at OC Transpo", *Vehicle Navigation & Information Systems*, IEEE,(1993),6 pages.

Heti, G. "Travelguide: Ontario's Route Guidance System Demonstration", *Vehicle Navigation & Information Systems*, IEEE, (1993), 7 pages.

Kent, P.E., "The Global Maritime Distress and Safety System", *Marine Control, Communications and Safety, IEE*, Savoy Place, London,(1990),6 pages.

"The 911 Emergency Response System—an Overview of its Effectiveness", *California Legislature, Senate Committee on Energy and Public Utilities, Los Angeles, California*, (1990),7 pages.

Karimi, H. A., et al., "GPS–Based Tracking Systems for Taxi Cab Fleet Operations", *Vehicle Navigation & Information Systems*, IEEE,(1993),4 pages.

Nelson, J. R., et al., "Experiences Gained in Implementing an Economical, Universal Motorist Information System", *Vehicle Navigation & Information Systems*, IEEE,(1993),6 pages.

Judd, T. D., "Automatic Dependant Surveillance Data Transfer", 7 pages.

"Ladies and Navigators First at Finningley", *Navigation News*, Navigation News,(1992),4 pages.

Larranga, G. A., "High Capacity Positioning and Mobile Phone System Locator", *1990 IEEE Workshop on Electronic Applications in Transportation*, IEEE,(1990), 12 pages.

Caffery, J. J., et al., "Radio Location in Urban CDMA Microcells", *GTE Laboratories, Inc.*, Atlanta, 5 pages.

Cook, P. L., "The Use of Advanced Mapping Techniques to Improve Driver and Fleet Control Efficiency", *Marconi Systems Technology , Waterlooville*, (1993),3 pages.

Dailey, Daniel J., et al., "Automatic Transit Location System", *Washington State Transportation Commission*, (1996), 54 pages.

"Danish Truckers Go Roaming, Roaming, Roaming with GSM", 2 pages.

Symes, D. J., "The U.S. Department of Transportation's Automatic Vehicle Monitoring Program", *Urban Mass Transportaton Administration, Washington, D.C.*, 2 pages.

Swenney, Jr., L. E., "An Overview of Intelligent Vehicle Highway Systems (IVHS)", 5 pages.

"GPS Plus An Alarm Transmitter—The lone Worker's Friend in need", *Mobile Data News No. 1.*, Ericson Mobile Communications AB, Mobile Data Division, Stockholm,2 pages.

Ragsdale, B. et al., *9–1–1 Tutorial*, 68 pages.

Inman, V. et al., "TravTek Evaluation Orlando Test Network Study", U.S. Department of Transportation Federal Transit Administration , McLean,(1996),89 pages.

Ojala, T. et al., "Promise Personal Mobile Traveler and Traffic Information Service", *Telematics Application Programme A2, Transport*, (1996),96 pages.

Green, P. et al., "Promise Personal Mobile Traveler and Traffic Information Service", *Telematics Application Programme A2, Transport*, (1996),27 pages.

Ratcliffe, S. "Air Traffic Control and Mid–air Collisions", *Electronics & Communication Engineering Journal*, (1990),7 pages.

Huber, P. "Advanced Public Transport Information in Munich", *International Conference on Public Transport Electronic Systems*, IEEE Press,(1996),4 pages.

Green, P. et al., "What Functons and Features Should be in Driver Information Systems of the year 2000", The University of Michigan Transportation Research Institute,16 pages.

Weiland, R. J., "Standards for Navigable Database: A Progress Report", SEI Information Technology, Chicago,8 pages.

"Ask a Satellite For Directions", (1991),1 page.

Wiegner, K. K., "Down to Earth" *Forbes*, (1991),3 pages.

Mouly, M. et al., "The Pseudo–Synchronization, A Costless Feature to Obtain the Gains of a Synchronized Cellular Network", *Matra Communication*, (1991),5 pages.

*Cellular Industry Report*, (1991),24 pages.

"Cellular Industry Sets Record Pace", *Signals*, (1992),6 pages.

Pierce, G. J., "Calling for a PCN Emergency Service Standard", *Telephony*, (1992),2 pages.

"New Products", (1993),1 page.

"Tops in Pops: Before & After", Paul Kegan Associates, Inc., Camel, CA, (1995),50 pages.

"ARC/Info Improves 9–1–1 Services", *ARC News* vol. 15 No. 3, (1993),4 pages.

Calian, S. "Wireless Cable Stocks are Flying High", *The Wall Street Journal*, (1993),2 pages.

"Knowing where you are is only the beginning", 2 pages.

Halvorsen, D. "Putting Piezo Polymer Film to Work", *Machine Design*, Valley Forge,(1994),5 pages.

Whitmer, D. "SCC Communications Corp. is a Telecommunications Company Engaged in Developing and Marketing a Comprehensive Suite of Applications to the Public Safety, Telco, and Emergency Services Markets", *SCC Corporate Brief*, SCC Communications Corp.,(1994),3 pages.

"Wireless Industry Grapples with Concerns about 911 Incompatibility", *Communications Daily* v. 14, n59, Warren Publishing Inc., (1994),2 pages.

Josifovska, Svetlana "Global Positioning System Struggles for Supremacy in Europe", *Electronics Weekly* n1672, p. 12(2), Reed Travel Group, (1994),4 pages.

"Wireless World: Motorola Announces Cellular Positioning & Emergency Messaging Product. (Cellular Positioning & Emergency Message Unit Cellular Transmission Equipment)", *EDGE, On & About AT&T, Edge Publishing*, (1994), 1 Page.

"Land Mobile Radio News: Weekly New Common Carrier Filings", *Land Mobile Radio News*, Phillips Business Information , Potomac,(1995),6 pages.

"Land Mobile Radio News", *Phillips Business Information, Potomac*, (1995),8 pages.

"Land Mobile Radio News—Weekly New Common Carrier Filings" *Phillips Business Information*, (Oct. 6, 1995),2 Pages.

"Land Mobile Radio News—Filings", *Land Mobile Radio News*, Phillips Business Information , Potomac,(1995), 10 pages.

"Reference File", *Global Positioning & Navigation News*, Phillips Business Information , Potomac,(1996), 10 pages.

"TRW's GPS/Cellular System Hits Market", *Global Positioning & Navigation News*, Phillips Business Information , Potomac,(1996),10 Pages.

"Monthly Business Market Forecast", *Global Positioning & Navigation News, No. 2, Phillips Business Information*, (Mar. 7, 1996),2.

"Launch Update", *Global Positioning & Navigation News*, Phillips Business Information , Potomac,(1996),10 pages.

"White House Plans Phase Out of SA, Says GPS to Remain Free", *Global Positioning & Navigation News*, Phillips Business Information , Potomac,(1996), 10 pages.

"POS/NAV Technologies at Trade Show", *Global Positioning & Navigation News*, Phillips Business Information , Potomac,(1996),8 pages.

"FAA Dumps Wilcox as Was Contractor, Names Hughes as Successor", *Global Positioning & Navigation News*, Phillips Business Information , Potomac,(1996),8 pages.

"Ashtech Rolls Out New GPS/Glonass Receiver", *Global Positioning & Navigation News*, Phillips Business Information , Potomac,(1996), 10 pages.

"Dot Seeks Answers on Civil Signal Benefits", *Global Positioning & Navigation News*, Phillips Business Information , Potomac,(1996),8 pages.

"Waas Costs Scrutinized at Ion Annual Meeting", *Global Positioning & Navigation News*, vol. 6, No. 13, Phillips Business Information, (Jun. 27, 1996),8 pages.

"Japan to Develop its Own GPS Satellite Fleet", *Global Positioning & Navigation News*, Phillips Business Information , Potomac,(1996),8 pages.

"GM's Onstar GPS/Cellular System to be Option in Cadillacs", *Global Positioning & Navigation News*, Phillips Business Information , Potomac,(1996),8 pages.

"Sony Buys ETAK, Other Deals Made", *Global Positioning & Navigation News*, Phillips Business Information,Potomac,(1996),16.

"Wilcox Finally Grabs $475 Million FAA Was Contract", *Global Positioning & Navigation News*, Phillips Business Information , Potomac,(1995),8 pages.

"Trimble Grabs $30 Million Credit Facility", *Global Positioning & Navigation News*, Phillips Business Information, Potomac,(1995),8.

"Trimble Stock Plunges, Low Earnings Cited", *Global Positioning & Navigation News*, Phillips Business Information, Potomac,(1995),8.

"Litton Buys Hughes' Inertial System Business", *Global Positioning & Navigation News*, Phillips Business Information, Potomac,(1995),8.

"Rockwell Develops New GPS Chip Set", *Global Positioning & Navigation News*, Phillips Business Information, Potomac,(1995),8.

"Rockwell Grabs Potential $250 Million Avionics Contract", *Global Positioning & Navigation News*, Phillips Business Information, Potomac,(1995),8.

"Its Funding Set for 1996", *Global Positioning & Navigation News*, Phillips Business Information, Potomac,(1995), 8.

"Trimble–Honeywell Team Grabs American Contract", *Global Positioning & Navigation News*, Phillips Business Information, Potomac,(1995),8.

"Novatel to Provide GPS Receivers for Waas", *Global Positioning & Navigation News*, Phillips Business Information, Potomac,(1995),8.

"Hughes Buys Magnavox Electronics Systems" *Global Positioning & Navigation News*, Phillips Business Information, Potomac,(1995),8.

"Rescued U.S. Pilot had GPS", *Global Positioning & Navigation News*, Phillips Business Information, Potomac, (1995),8.

"Pentagon Approves $10 Million to Find GPS Jamming Cure", *Global Positioning & Navigation News*, Phillips Business Information, Potomac,(1995),8.

"Bells to End Ownership of Bellcore", *Advanced Intelligent Network News*, Phillips Business Information, Potomac, (1995),8.

"220 MHz, 800 MHz or 900MHz: What Should a New Player Choose?", *Land Mobile Radio News*, Phillips Business Information, Potomac,(1995),2.

"Colorado Company Develops User–Friendly Mobile Internet System; Fleet Management, Emergency Service are Potential Applications", *Wireless Data News*, Phillips Business Information, Potomac,(1996),8.

"GTE Closer to Installing Circuit Switched–CDPD Gateway; Plans to Offer National "CDPD Access" VIA "800" Number Service", *Wireless Data News*, Phillips Business Information, Potomac,(1996),8.

*Satellite News*, Phillips Business Information, Potomac, (1996),8.

*Satellite News*, Phillips Business Information, Potomac, (1996),10.

"Wireless Technologies Could be Catalysts Leading to Change in the Internet", *Wireless Data News, Phillips Business Information*, Potomac, (1996),12.
"Smart Look Wide Area Location System: The Intelligent Solution for Locating Unmodified Cellular Phones", Lockhead Sanders, 1.
"Briefs", *Global Positioning & Navigation News*, Phillips Business Information, Potomac,(1995),1.
Carlson, Donna "Wireless E911: Achieving Compliance", *Cellular Integration*, (1995), 10 pages.
Naik, Gautam "U.S. Using E–mail Tap, Charges Three With Operating Cellular–Fraud Ring", *Technology*, 1 .
Meth, Clifford "With GPS, You can get There From Here", *Electronics Design*, Phillips Business Information, Potomac, (1995),9.
Naik, Gautam "Lowly Beeper May Finally Get Respect as Two–Way Paging Services Emerge", 1.
Hardy, Quentin "SkyTel Is Set to Launch Two–Way Paging", *Technology and Communications*, 1.
Bryant, Jane "GPS Rolling Down the Highway to Success", *Wireless Product News*, (1995),1.
Dennehy, Kevin "The Burgeoning GPS Mobile Market", *Wireless Product News*, (1995),3.
Padgett, Jay E. et al., "Overview of Wireless Personal Communications", *IEEE Communications Magazine*, IEEE, (1995),14.
Crollick, Jeffrey L. "Mapping the Future of Wireless 9–1–1 Emergency Services", *Cellular Integration*, (1995),2.
Langreth, Robert "Recall", *Popular Science*, (1995),2.
Lucas, Jerry "Twenty Predictions for 1995 and Beyond", *TeleStrategies*, TeleStrategies, Inc., McLean,(1995),12.
"Army Speed GPS Installation in Korea", *Global Positioning & Navigation News*, Phillips Business Information, Potomac,(1995),10.
"Reference File", *Global Positioning & Navigation News, No. 7, Phillips Business Information*, Jul. 13, 1995),2 pages.
"Norad Selected to Provide Mobile Computers to Interface with Rockwell Tripmaster System", *Trade & Industry Database*, (1994),2.
"PCS: The Revolution Begins", 1.
"Select Paging Software Providers", *Land Mobile Radio News*, (1996),2.
Crowe, David "Enhanced Emergency Service for Wireless", *Networking Perspectives*, (1995),1.
"Cellular One Installs Emergency Call Boxes", *Cellular Business*, (1995),1.
Battista, Cristina "Calspan, Cellular One Trial Wireless 911 in N.Y.", *Business & Finance*(1995),1 page.
Pearl, Daniel "Cell Phones: Perfect in Emergencies? Try Again", *The Wall Street Journal*, (1995),1.
Yang, Xuguang et al., "A Computer/GPS Guidance System for Emergency Rescue Vehicle Location", *Biomedical Instrumentation & Technology*, (1995),5.
Taylor II, Alex "Cars that beat traffic. (smart vehicles and highway)", *Fortune*, v131, n3 (1995),7.
Pate, Kelly "AMSC launches new industry with satellite lift–off", *Radio Communications Report*, (1995),3.
Sweeney, Dan "Talk & Backtalk",*Cellular Business*, (1995), 9.
"There's only one way to fully appreciate the 12 parallel channel performances of this engine", (1995),2.
Frezza, Bill "Road Trip:Riding Shotgun with G.O.D.", *Network Computing*, (1995),2.
"Auto–Trac Provides the Information you Need"*Auto–Trac*, Auto–Trac Transportation Management Solutions, Dallas,4.
"As seen in Security Management", *Auto–Trac*, Auto–Trac Transportation Management Solutions, Dallas,(1995),2.
"Auto–Trac Transportation Management Solutions", *Dallas*, 2.
"Motorola Wins Interdigital Suit", *Wireless Strategies*, (1995),10.
"Lockheed Sanders Unveils Location Technology at CTIA Conference.", *Trade & Industry Database, Knight–Ridder Information*, (1995),2.
"Cellular/Vehicle Navigation Tests Portend New European Markets", *Trade & Industry Database*, Knight–Ridder Information,(1995),2.
O'Donnell, Jayne "Car Phone of Future Does Everything But Drive", (1996),1.
Markoff, John "Finding Profit in Aiding the Lost", *The New York Times*, (1996),2.
Ajluni, Cheryl J., "Sensors Make Medical News, Electronic Design", (1996),1.
"Mosel Vitelic Makes it Dramatic", Mosel Vitelic,(1996),1.
Alfred, Vollmer "Euro Watch", *Electronic Design*, (1996),1.
Lee, Rikki "The Vaults of Wireless Legacy", *Wireless Week*, (1996),2.
Mason, Charles "Wireless Locator Soon A Reality", *Cellular*, (1996),2.
Meyers, Jason "Xypoint Seeks Role In Cellular 911 Area", (1996),2 pages.
Snyder, Beth et al., "Pressure Is On For ADSL Development", *Telephony*, (1996),1.
Emmett, Arielle "911 Enhanced For Cellular", *America's Network*, (1996),2.
Bryant, Jane et al., "Visions", *WB&T*, (1996),9.
"Associated Group", (1996),4.
"Wireless Communications Ventures", 2.
Tell, Daniel et al., "Meeting the Wireless 911 Mandate", *Telephony*, 4.
"Tax Implications of the Telecommunications Act of 1996", *Billing World*, (1996),4.
Hamilton, Elliott et al., "A Regulatory Burden or Hidden Opportunity", *WB&T*, (1996),4 pages.
"Cellular Location System Trial to be Conducted this Summer", (1996),1.
"Potential Location Technology Services Including Location–Sensitive Billing, Fleet Management and Mobile Yellow Pages", *Telephony*, (1996),1.
"Consortium gets Grant for Intelligent Antennas", *RCR.Newsfax*, (1994),1.
Saunders, Renee "911 Rules Adopted, Carrier Issues Remain", *Wireless Week*, (1996),2.
Tolar, Fred, "On the Road to a Major New Market", *Microwave Product Digest*, (1996),4.
Sakelaris, Linda K., "Location, wireless technologies merge for business and safety", (1996),2.
Richter, Allen "Smart Phones May Face Slow Sales", *Wireless Week*, (1996),2.
Flanagan, Patrick "Personal Communications Services: The Long Road Ahead", (1996),2.
"GPS Plugging into the Space–time Grid", *R&D Magazine*, (1996),4.
Sakelaris, Linda Kay "GPS could help 911 problems", (1996),1.
Battista, Christina "Viewpoint", (1996),1.
"Onstar on Trac", *Autoweek*, (1996),1.

Kevin, "Positioning Location Technologies in the Wireless", (1996),4.
"Tandem Provides Hardware Info structure for Wireless 911 Services", *Business Wire, Inc.*, Lexis,(1996),4 pages.
O'Shea, Dan "Calling on Wireless 911", *Telephony*, (1996), 3.
"Third Quarter Investments in Telecom Companies", *Business Wire, Inc.*, Lexis,(1996),3.
"Companies Develop Applications for Location Technology", *Phillips Business Information, Inc.*, Lexis,(1996),2.
"FCC Adopts Rules to Implement Enhanced 911 for Wireless Services", *Federal Communications Commission*, Washington, D.C.,(1996),3.
"Technical news", www.csdmag.com, (1996),1.
Menezes, Bill "Houston E911 Trial A Success", *Cellular*, (1996),1.
Menezes, Bill "AT&T Shares Airtime", *Wireless Week*, (1996),1.
Sakelaris, Linda Kay "Xypoint Offers Model Legislation for State Managed E–911 Fund", (1996),2.
Menezes, Bill "E911 Funding Seen Separate From Indemnity", *Wireless Week*, (1996),1.
Torassa, Ulysses "The Mind Game: Who Controls a Discovery?", (1997),3.
Stilp, Louis A., "Time Difference of Arrival Technology for Locating Narrowband Cellular Signals", *SPIE*, (1996),12.
"News In Brief", *RCR Publications, Inc.*, (1996),1.
Cole, Jeff "Loral Corp.'s Schwartz to Get Bonus of $18 Million for Planning Units' Sale", *The Wall Street Journal*, (1996),2.
Lee, Rikki "Wireless E911 Sets NENA Backdrop", 1.
"Wave of Wireless Location Services Start with Enhanced 911", *Phillips Business Information, Inc.*, Lexis,(1996),2.
"SCC Communications Corporation Responds to FCC Report and Order 94–102 for Wireless 9–1–1 Service; Plays Key Role in First Wireless 9–1–1 Demonstration", (1996),2.
"Network Level Enhanced 911 Solution for Cellular", *Phillips Business Information, Inc.*, Lexis,(1996),2.
"US West NewVector and Qualcomm Reach Definitive Agreement on Strategic Relationship", *Qualcomm, Inc.*, 3.
"Matsushita Signs CDMA License Agreement with Qualcomm", *Qualcomm*, Qualcomm Inc.,2.
"People's Republic of China to Evaluate Qualcomm's CDMA Technology for Nationwide Standard", *Qualcomm Inc.*, 2.
"Qualcomm Signs Test Equipment License Agreements with Three Vendors", *Qualcomm Inc.*, 2.
"Qualcomm Signs License Agreements with Four Korean Manufacturers", *Qualcomm Inc.*, 4.
"Northern Telcom Extends Qualcomm CDMA License to World Wide Status", *Qualcomm Inc.*, 2.
"Adoption of Cellular Industry CDMA Standard Based on Qualcomm's Specifications", *Qualcomm Inc.*, 3.
"Communications Test Instruments", (1995),1.
"Pactel Cellular Announces Plans for Introducing Digital Cellular Service", (1994),5.
"Customer Trials Confirm New Digital Cellular Technology Outperforms Analog Service", (1994),3.
"Motorola Announced E911 Solution to Help Ensure Safety of Cellular Phone Users", *Cellular Infrastructure Group*, 2.
"PCS Technology Advocacy Group Recommends Adoption of a PCS Standard Based on Qualcomm's CDMA Technology", San Diego,(1994),3.
"TMS Wins Automatic Vehicle Location Contract for Des Moines Metro", *Transportation Management Solutions*, Dallas,(1995),1.
"8 Channel Combiners Feature Easy Channel Addition Without Co–Channel Disruption", *Wireless Product News*, (1995),9.
Schatz, Amy "Millions Resist Shift to Mobiles Fit for 911 Calls", 2.
Chen, Kathy "Microsoft Defends", *Wall Street Journal*, (2006),2.
"Alcatel, Motorola in CDMA Supply Pact", 3.
Kanellos, Michael "After Years of Struggle, GPS is Taking Off", *Cnet news*, 4.
"SiRF, Motorola Team", *GPS World*, (2007),1.
"SiRF Supply Technology for Motorola's First 3G Devices", *3gnewsroom.com*, (2002),3.
O'Shea, Dan "Associated Group targets cellular location issues", *Telephony*, (1996),1.
"Enhanced Wireless Services Opportunities", *EIS Wireless Engineering & Software Engineering*, (1997),1.
Heinzl, Mark "RIM Takes Setback in Patent Tiff", 1.
Myhrvold, Nathan "Inventors Have Rights, Too!", 1.
Amcoff, Erik "Mobile Phones are Packing More GPS Features", 1.
"Pinpointing Cell phone 911 Calls Remains Problematic", *Technology Jounral*, (2005),1.
"If Only it were this easy to Acquire and Develop Sites for your wireless network", *Popular Science*, (1995),3.
*Popular Science*, (1995),4.
"Best of What's New", *Popular Science*, (1994),6.
"Go–Anywhere Data", *Popular Science*, (1994),2.
"Its: The Bridge to an Intermodal Society", *Electronic Design*, (1995),12.
Pizzi, Skip "On the Horizon", *Broadcast Engineering*, (1993),2.
"A Navigation Signal Isn't the Only thing Telepath 100 brings down to earth.", *Popular Science*, (1994),3.
"Cellular Accessories", *Cellular Business*, (1995),2.
Carlson, Caron "FCC Allows Handset–based E911 with Stricter Standards", *Wireless Week*, (1999),2.
Smith, Brad "Implementing E911: A Technical KO?", *Wireless Week*, (1999),2 pages.
Galatowitsch, Sheila "Carriers Cautious On E911 Decisions", *Wireless Week*, (2000,2.
Warner, Edward "Safety Wars, Part 911", (1999),4.
Alleven, Monica et al., "Wrestling With Phase I E911 Cost Recovery in Disarray", (1998),3.
Bassuener, Kristy "III Snags Carriers with E–mail", (1999), 1.
Somerson, Paul "A Turn for the Worse: Life in the Slow Lane", (2000),4.
Grossman, Lev "The City Clickers", *Time*, (2000),2.
Whelan, Carolyn "Smoke and Mirrors Are Parents Really a Virtue", *Fortune*, (2000),4.
Null, Christopher "Hot Seat Clarence Kwan", Smartbusinessmag.com, (2000),3.
"Give me a PC and the Net: Consumers aren't wild about the idea of wireless shopping.", *Fortune*, (2000),1.
"Want to make your business more productive? Make it more portable", 1.
Rothfeder, Jeffery "MP3.COM Ignored One Tiny Detail: It's Illegal", Smargbusinessmag.com, (2000),6.

"Even Bold New Steps Need to Move Forward, So We Listened to the Experts—Our Users", *Environmental Systems Research Institute, Inc.*, (1995),7.

"GIS Technology for Environmental Management", *Environmental Systems Research Institute, Inc.*, 8.

"Cellular/PCS", *Wireless Week*, (1999),1.

Robinson, James R., et al., "Capital IVHS Operational Test", 5.

*Billing World*, (1996),2.

"RESCU Me", *Autoweek*, (1995),2.

Kridel, Tim "The E911 Mandate will cost wireless the pump for what could be a new", *Wireless Review*, (1998),6.

Warner, Edward "States Move on E911 Bills", *Wireless Week*, (1998),3.

Menezes, Bill "CEO Leaves Transcrypt", *Wireless Week*, (1998),1.

Warner, Edward "Demystifying E911's 'Mystery Group'", *Wireless Week*, (1998),2.

Carlson, Caron "Prospects for 3G Best in Large, Medium Markets", *Wireless Week*, (1998),1.

Albright, Peggy "California Strips Liability for Carriers from 911 Bill", *Wireless Week*, (1998),1.

Smith, Brad "SCC May Lead E911 In West", *Wireless Week*, (1998),1.

Warner, Edward "Group Resolves E911 Differences", *Wireless Week*, (1998),1.

Alleven, Monica "Centennial Cellular Begins E911 Service", *Wireless Week*, (1998),1.

Carlson, Caron "Privatization", *Wireless Week*, (1998),1.

Warner, Edward "States Delaying Cost Recovery Plans", *Wireless Week*, (1998),2.

Carlson, Caron "Iridium Loss Echoes Throughout Industry", *Wireless Week*, (1998),1.

Smith, Brad "US West Launches E911 Service", *Wireless Week*, (1998),1.

"Cellular—PCS", *Wireless Week*, (1999),1.

"Location–Sensitive Billing: Undiscovered Territories of Profit", 2.

Carlson, Caron "E911 Bill Awaits Signature", 2.

Vaughan, Allyson "Group Attempts To Rescue Public–Safety Systems", *Wireless Week*, (2000),1.

Vaughan, Allyson "Enhanced 911 In Need Of Its Own Emergency Care", *Wireless Week*, 2000,1.

Carlson, Caron "FCC Moves Toward Universal 911", 1.

Vaughan, Allyson "Picking Up The Check For Enhanced 911 Services", *Wireless Week*, (2000),1.

"Streaming Sells Products", *Broadbank Week*, (2000),1.

Vaughan, Allyson "E911 On Track For Further Delays", 1.

"Audiovox Communications Corp.", 1.

Swasey, Laurence "Subscribers Will Pay for E911", *Wireless Week*, 1997),1.

Ross, Paul "Omnipoint Scores Agreement With New Jersey Nets", *Wireless Week*, (1997),1.

Warner, Edward "Only Limited E911 Compliance Expected", *Wireless Week*, (1998),2.

Warner, Edward "Comcare Streamlines 911", *Wireless Week*, (1998),2.

Warner, Edward "Commercial Aspects Key to E911 Service", *Wireless Week*, (1998),2.

"To Us, It's Duck Soup", 1.

Alleven, Monica "Standards Group Works On E911", *Wireless Week*, (1998),1.

Menezes, Bill "Comcast Likes Bundle Strategy", *Wireless Week*, (1998),1.

"Westinghouse Vehicle Emergency Messaging System for Lincoln RESCU", Westinghouse Electronic Systems, Baltimore,4.

"Incon A Command and Control System for all Risk Incident Management", *SRI International*, Helena,2.

"The AVeL–NET System The Eye In The Sky", 4.

"Datumtech & Raymart Pioneering a New Era In Communications Technology", 8.

"Auto–Trac: Fleetservice System Overview", *Auto–Trac*, Dallas,7.

"Auto–Trac Provides The Information You Need", *Auto–Trac*, 6.

"E–Caps Geolocation System", *Engineering Research Associates*, 2.

"The Ultimate Vehicle Tracking Security System", *Auto–Trac*, 2.

Blakeslee, Ken "An Intelligent Network Architecture for GSM and PCN", (Nov. 1991),31–36.

Cameron, Max et al., "Use of Commercial GIS and GPS for Emergency Location and Dispatch", (Jun. 5–7, 1995),659–667.

"GTE 9–1–1 Enhanced Emergency System", 28 Pages.

"Emergency services", *Joint Experts meeting report*, (Aug. 24, 1994),30 pgs.

Zografos, K. G., et al., "Integrating Geographic Information System (GIS) and Automatic Vehicle Location (AVL) Technologies for Improving the Emergency Response Capabilities of Electric Utilities", *Vehicle Navigation and Information Systems Conference, 1991*, vol. 2,(Oct. 20–23, 1991), 91–95.

Hiromisa, M. "Call Channel Handoff Device", Application No. S63–326737, Application Date: Dec. 23, 1988, (Jul. 2, 1990),8 pages.

Kennedy, J et al., "Direction Finding and "Smart Antennas" Using Software Radio Architectures", *IEEE Communications Magazine*, (May 1995),62–68.

"ROLM announces new addition to PhoneMail family; introduces new emergency 911 capability, business partners", *Business Wire*, (Jun. 3, 1991),6 pages.

Rothblatt, Martin "The First GPS Satellite Radio Optimized For Automatic Vehicle Location", *IEEE*, (Mar. 1992),524–527.

Silventoinen, Marko I., et al., "Mobile Station Emergency Locating in GSM", *IEEE*, (1996),232–238.

Stewart, John M., "Vehicle Location And Position Monitoring System Using Satellite Navigation And Cellular Telephone", *UTEF*, 15 pages.

"Proceedings of the 1994 National Technical Meeting "Navigating the Earth and Beyond"", *The Institute of Navigation*, Vehicle GPS Positioning Over Cellular Networks, (Jan. 1994),17 pages.

"Enhanced Wireless SP–3–3890–RV2 9–1–1 Phase II", *TR–45*, (2006),304 pages.

"Assessment of the Denver Regional Transportation District's Automatic Vehicle Location System", *U.S. Department of Transportation*, 109 pages.

Plassman, D. "Location management strategies for mobile cellular networks of 3rd generation", *Aachen University of Technology*, (1994),5 pages.

Song, Han–Lee "Automatic Vehicle Location In Cellular Communications Systems", *IEEE Transactions on Vehicular Technology*, vol. 43, No. 4, (Nov. 1994),7 pages.

"Proceedings of the 52nd Annual Meeting "Navigational Technology For The 3rd Millennium"" *The Institute of Navigaton*, (Jun. 21, 1996),8 pages.

Lee, Ying–Kit et al., "Location Update by Binary Cutting of ID's", 963–967.

Krizman, Kevin J., et al., "Wireless Position Location: Fundamentals, Implementation Strategies, and Sources of Error", *IEEE*, (1997),919–923.

Navas, Julio C., et al., "GeoCast—Geographic Addressing and Routing", *Computer Science Department, Rutgers, The State University*, (1997),66–76.

Ott, Gary D., "Vehicle Location in Cellular Mobile Radio Systems", *IEEE Transactions on Vehicular Technology*, vol. VT•26, No. 1,(Feb. 1977),43–46.

Riter, Stephen et al., "Automatic Vehicle Location—An Overview", *IEEE Transactions on Vehicular Technology*, Vol. VT–26, No. 1,(Feb. 1977),7–11.

Zagami, J. M., et al., "Providing Universal Location Services Using a wireless E911 Location Network", *IEEE Communications Magazine*, (Apr. 1998),66–71.

Garner, John "What to do until FCC sets new 911 regs—Managing 911 Systems", (1995),2 pages.

Nicolas, C. et al., "Polarized illumination liquid crystal projector", *Supplied by The British Library—"The world's knowledge"*, (1991),239–251.

Giordano, A. et al., "A Novel Location–Based Service and Architecture", *IEEE*, (1995).

Imielinski, Tomasz et al., "GPS–Based Addressing and Routing", (Mar. 7, 1996),35 pages.

"E911 Public Safety Answering Point Interface Between a 1/1 AESS(TM) switch and customer premises Equipment", *Telcordia Technologies Generic Requirements GR–350–CORE*, (Jun. 2003),43 Pages.

"Report of the Joint Industry—DOD Task Force on Computer Aided Logistic Support (CALS).vol. 5. Report of Technical Issues Subgroup", *Institute For Defense Analyses Alexandria, VA*, (Jun. 1985),256 Pages.

"Automatic Vehicle Location System", *Motorola*, 6 pages.

Krage, Mark K., "The TravTek Driver Information System", *General Motors Research Labs*, 14 pages.

Steinhauser, R. et al., "Euteltracs: The European Land Mobile Satellite Service", *The Institution of Electrical Engineers*, Savoy Place, London (Jun. 26, 1992),9 pages.

"Good Form", (Jul. 1995),1 page.

"Land Mobile Radio News—Refarming", *Land Mobile Radio News*, vol. 49 ; No. 42,(Oct. 20, 1995),8 pages.

"Land Mobile Radio News: Weekly New Common Carrier Filings", *Phillips Business Information*, (Oct. 20, 1995) 2 Pages.

"Land Mobile Radio News: Weekly New Common Carrier Filings", *Phillips Business Information*, (Oct. 27, 1995),2 pages.

*Satellite News*, vol. 19, No. 4, (Jan. 22, 1996), 10 pages.
*Satellite News*, vol. 19, No. 6, (Feb. 5, 1996), 10 pages.
*Satellite news*, vol. 19, No. 8, (Feb. 19, 1996), 10 pages.
*Satellite News*, vol. 19, No. 7, (Feb. 12, 1996), 10 pages.

"Monthly Business Market Forecast", *Global Positioning & Navigation News*, No. 2, (Feb. 8, 1996),2 pages.

"Reference File", *Global Positioning & Navigation News*, Phillips Business Information, Potomac,(Oct. 5, 1995),2 pages.

"Reference File", *Global Positioning & Navigation News*, Phillips Business Information, Potomac,(Nov. 2, 1995),2 pages.

"Reference File", *Global Positioning & Navigation News*, No. 11, Phillips Business Information, (Nov. 30, 1995),2 pages.

Martin, B. W., "Watch IT. A fully supervised identification, location and tracking system", *Institute of Electrical and Electronics Engineers*, (Oct. 1995),3 pages.

"Washington——People make more 911 calls from cellular telephones than landlines these days", 2 pages.

Albright, Peggy "California To Introduce 911 Bill", 1.

"Cell–Loc Inc. and Times Three Inc. say they will give U.S. wireless carriers free location to data derived from cellular 911 calls.", 1.

"Fast Forward", *Barbed Wire(less)*, 1.

*Federal Communications Commission, Notice of Proposed Rule Making. In the Matter of Revision of the Commission's Rules to Ensure Compatibility with Enhanced 911 Emergency Calling Systems*, CC Docket No. 94–102, Oct. 19, 1994,55 pages.

"Reference File", *Global Positioning & Navigation News*, No. 8 (Aug. 10, 1995),2 pages.

"Monthly Business Market Forecast", *Global Positioning & Navigation News*, No. 4, (Apr. 4, 1996),2 pages.

Gojanovich, B.K. et al., *New Jersey Bell Network Proposal*, (Nov. 20, 1989).

Paton, I.J. et al., *Terminal Self–Location*, Mobile Radio and Personal Communications, (Dec. 10, 1991).

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claim 38 is cancelled.

Claims 1-37 and 39-41 were not reexamined.

\* \* \* \* \*

(12) EX PARTE REEXAMINATION CERTIFICATE (8785th)
United States Patent
Dennison et al.

(10) Number: US 6,324,404 C2
(45) Certificate Issued: *Jan. 3, 2012

(54) CELLULAR TELEPHONE SYSTEM THAT USES POSITION OF A MOBILE UNIT TO MAKE CALL MANAGEMENT DECISIONS

(75) Inventors: Everett Dennison, Canfield, OH (US); Timothy J. Duffy, West Middlesex, PA (US); Gregory T Pauley, Canfield, OH (US); Scott L. Jones, Sharon, PA (US); Albert H. Pharis, Jr., Canfield, OH (US); Warren P. Williamson, IV, Loveland, OH (US)

(73) Assignee: Emsat Advanced Geo-Location Technology, LLC, Loveland, OH (US)

Reexamination Request:
No. 90/011,165, Aug. 18, 2010

Reexamination Certificate for:
Patent No.: 6,324,404
Issued: Nov. 27, 2001
Appl. No.: 08/848,082
Filed: Mar. 21, 1996

Reexamination Certificate C1 6,324,404 issued Nov. 9, 2010

( * ) Notice: This patent is subject to a terminal disclaimer.

Related U.S. Application Data

(63) Continuation-in-part of application No. 08/555,884, filed on Oct. 23, 1995, now Pat. No. 5,546,443, which is a continuation-in-part of application No. 08/402,976, filed on Mar. 13, 1995, now abandoned, which is a continuation-in-part of application No. 07/813,495, filed on Dec. 26, 1991, now Pat. No. 5,377,038.

(51) Int. Cl.
*H04B 7/185* (2006.01)
*H04Q 7/22* (2006.01)
*H04Q 7/38* (2006.01)

(52) U.S. Cl. .................... 455/456.1; 455/406; 455/432.1
(58) Field of Classification Search .......................... None
See application file for complete search history.

(56) References Cited

To view the complete listing of prior art documents cited during the proceeding for Reexamination Control Number 90/011,165, please refer to the USPTO's public Patent Application Information Retrieval (PAIR) system under the Display References tab.

*Primary Examiner* — Charles Craver

(57) ABSTRACT

A cellular telephone system has call management decisions made based on the exact geographic location of the mobile unit. These call management decisions include billing and taxing decisions, cell site selection, frequency selection and even cellular system selection. The decisions are continuously updated during a call whereby decisions can be made and changed regardless of where a call originated. Cell site location, and even cellular system selection, can be made in a specific manner to best serve the needs of the mobile user, the cellular system as well as the public. It is even possible for a cellular system to locate one or more of its cell sites in the geographic area served by another cellular system. In some cases, cellular systems might even share cell sites.

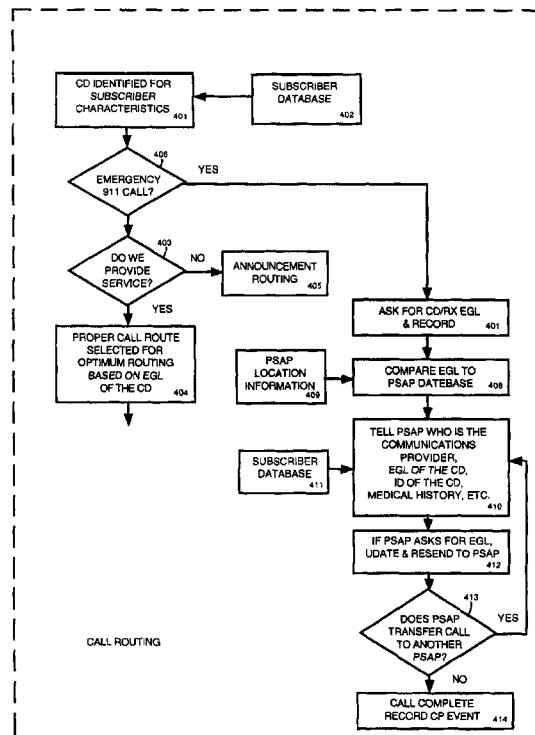

**EX PARTE
REEXAMINATION CERTIFICATE
ISSUED UNDER 35 U.S.C. 307**

THE PATENT IS HEREBY AMENDED AS
INDICATED BELOW.

AS A RESULT OF REEXAMINATION, IT HAS BEEN DETERMINED THAT:

Claim 38 was previously cancelled.
Claims 9, 12 and 13 are cancelled.
Claims 1-8, 10, 11, 14-37 and 39-41 were not reexamined.

\* \* \* \* \*